(12) United States Patent
Brady et al.

(10) Patent No.: US 10,573,106 B1
(45) Date of Patent: Feb. 25, 2020

(54) PERSONAL INTERMEDIARY ACCESS DEVICE

(71) Applicant: Amazon Technologies, Inc., Seattle, WA (US)

(72) Inventors: Tye Michael Brady, Southborough, MA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 158 days.

(21) Appl. No.: 15/466,723

(22) Filed: Mar. 22, 2017

(51) Int. Cl.
*G07C 9/00* (2006.01)
*G06Q 10/08* (2012.01)
*G05B 19/048* (2006.01)
*G06K 9/00* (2006.01)
*G10L 17/22* (2013.01)
*G10L 17/00* (2013.01)
*B25J 19/02* (2006.01)
*H04W 4/14* (2009.01)
*H04W 84/12* (2009.01)
*H04W 4/80* (2018.01)

(52) U.S. Cl.
CPC ........ *G07C 9/00309* (2013.01); *B25J 19/021* (2013.01); *B25J 19/023* (2013.01); *G05B 19/048* (2013.01); *G06K 9/00087* (2013.01); *G06K 9/00255* (2013.01); *G06K 9/00288* (2013.01); *G06Q 10/083* (2013.01); *G07C 9/00007* (2013.01); *G07C 9/00563* (2013.01); *G07C 9/00571* (2013.01); *G10L 17/005* (2013.01); *G10L 17/22* (2013.01); *G05B 2219/2642* (2013.01); *H04W 4/14* (2013.01); *H04W 4/80* (2018.02); *H04W 84/12* (2013.01)

(58) Field of Classification Search
CPC .................. G07C 9/00007; G07C 9/00015
USPC .......................................... 348/156
See application file for complete search history.

(56) References Cited

U.S. PATENT DOCUMENTS 4,865,248 A  9/1989  Barth
4,954,962 A  9/1990  Evans et al.
(Continued)

OTHER PUBLICATIONS

Mike Murphy, "Google wants to deliver packages from self-driving trucks," published Feb. 9, 2016, URL: https://qz.com/613277/google-wants-to-deliver-packages-from-self-driving-trucks/, 4 pages.
(Continued)

*Primary Examiner* — Jeffery A Williams
(74) *Attorney, Agent, or Firm* — Athorus, PLLC

(57) ABSTRACT

An intermediary device may be configured to allow an authorized visitor to access a secure facility (such as a home) on behalf of an owner. The intermediary device may generate an authenticator and provide the authenticator to a service provider, who may then present the authenticator to the intermediary device upon arriving at the facility. The intermediary device may unlock or open, or lock and close, any doors within the facility as necessary in order to grant access to a specific portion of the facility and restrict access to other portions of the facility. The intermediary device may also capture, or cause the capture of, images or other data regarding actions taken by the service provider, and establish a communications channel with the owner for the exchange of information or data regarding such actions, or any events or conditions of the facility.

25 Claims, 30 Drawing Sheets

(56) References Cited

U.S. PATENT DOCUMENTS

| | | |
|---|---|---|
| 5,040,116 A | 8/1991 | Evans et al. |
| 5,386,462 A | 1/1995 | Schlamp |
| 5,452,374 A | 9/1995 | Cullen et al. |
| 5,497,236 A | 3/1996 | Wolff et al. |
| 5,731,884 A | 3/1998 | Inoue |
| 5,901,253 A | 5/1999 | Tretter |
| 5,995,898 A | 11/1999 | Tuttle |
| 6,031,612 A | 2/2000 | Shirley |
| 6,344,796 B1 | 2/2002 | Ogilvie et al. |
| 6,426,699 B1 | 7/2002 | Porter |
| 6,507,670 B1 | 1/2003 | Moed |
| 6,690,997 B2 | 2/2004 | Rivalto |
| 6,694,217 B2 | 2/2004 | Bloom |
| 6,919,803 B2 | 7/2005 | Breed |
| 6,954,290 B1 | 10/2005 | Braudaway et al. |
| 6,961,711 B1 | 11/2005 | Chee |
| 6,965,440 B1 | 11/2005 | Nakagiri et al. |
| 6,970,838 B1 | 11/2005 | Kamath et al. |
| 7,006,952 B1 | 2/2006 | Matsumoto et al. |
| 7,016,536 B1 | 3/2006 | Ling et al. |
| 7,031,519 B2 | 4/2006 | Elmenhurst |
| 7,129,817 B2 | 10/2006 | Yamagishi |
| 7,133,743 B2 | 11/2006 | Tilles et al. |
| 7,145,699 B2 | 12/2006 | Dolan |
| 7,188,513 B2 | 3/2007 | Wilson |
| 7,337,686 B2 | 3/2008 | Sagi-Dolev |
| 7,337,944 B2 | 3/2008 | Devar |
| 7,639,386 B1 | 12/2009 | Siegel et al. |
| 7,668,404 B2 | 2/2010 | Adams et al. |
| 7,693,745 B1 | 4/2010 | Pomerantz et al. |
| 7,925,375 B2 | 4/2011 | Schininger et al. |
| 7,946,530 B1 | 5/2011 | Talmage |
| 8,015,023 B1 | 9/2011 | Lee et al. |
| 8,078,317 B2 | 12/2011 | Allinson et al. |
| 8,126,642 B2 | 2/2012 | Trepagnier et al. |
| 8,131,607 B2 | 3/2012 | Park et al. |
| 8,145,351 B2 | 3/2012 | Schininger et al. |
| 8,195,328 B2 | 6/2012 | Mallett et al. |
| 8,286,236 B2 | 10/2012 | Jung et al. |
| 8,412,588 B1 | 4/2013 | Bodell et al. |
| 8,429,754 B2 | 4/2013 | Jung et al. |
| 8,511,606 B1 | 8/2013 | Lutke et al. |
| 8,752,166 B2 | 6/2014 | Jung et al. |
| 8,791,790 B2 | 7/2014 | Robertson et al. |
| 8,899,903 B1 | 12/2014 | Saad et al. |
| 8,956,100 B2 | 2/2015 | Davi et al. |
| 8,989,053 B1 | 3/2015 | Skaaksrud et al. |
| 9,033,285 B2 | 5/2015 | Iden et al. |
| 9,139,310 B1 | 9/2015 | Wang |
| 9,163,909 B2 | 10/2015 | Chengalva |
| 9,195,959 B1 | 11/2015 | Lopez et al. |
| 9,216,857 B1 | 12/2015 | Kalyan et al. |
| 9,235,213 B2 | 1/2016 | Villamar |
| 9,244,147 B1 | 1/2016 | Soundararajan et al. |
| 9,256,852 B1 | 2/2016 | Myllymaki |
| 9,336,506 B2 | 5/2016 | Shucker et al. |
| 9,336,635 B2 | 5/2016 | Robertson et al. |
| 9,510,316 B2 | 11/2016 | Skaaksrud |
| 9,545,852 B2 | 1/2017 | Streett |
| 9,600,645 B2 | 3/2017 | Fadell et al. |
| 9,652,912 B2 | 5/2017 | Fadell et al. |
| 9,718,564 B1 | 8/2017 | Beckman et al. |
| 9,858,604 B2 | 1/2018 | Apsley et al. |
| 2001/0045449 A1 | 11/2001 | Shannon |
| 2002/0016726 A1 | 2/2002 | Ross |
| 2002/0035450 A1 | 3/2002 | Thackston |
| 2002/0072979 A1 | 6/2002 | Sinha et al. |
| 2002/0087375 A1 | 7/2002 | Griffin et al. |
| 2002/0107751 A1 | 8/2002 | Rajagopalan et al. |
| 2002/0111914 A1 | 8/2002 | Terada et al. |
| 2002/0116289 A1 | 8/2002 | Yang |
| 2002/0123930 A1 | 9/2002 | Boyd et al. |
| 2003/0040980 A1 | 2/2003 | Nakajima et al. |
| 2003/0072031 A1 | 4/2003 | Kuwata et al. |
| 2003/0121968 A1 | 7/2003 | Miller et al. |
| 2003/0141411 A1 | 7/2003 | Pandya et al. |
| 2004/0002898 A1 | 1/2004 | Kuhlmann et al. |
| 2004/0160335 A1* | 8/2004 | Reitmeier ............ A47J 31/4407 340/4.12 |
| 2004/0257199 A1* | 12/2004 | Fitzgibbon ......... G07C 9/00103 340/5.71 |
| 2005/0068178 A1 | 3/2005 | Lee et al. |
| 2005/0093865 A1 | 5/2005 | Jia |
| 2005/0102240 A1 | 5/2005 | Misra et al. |
| 2005/0244060 A1 | 11/2005 | Nagarajan et al. |
| 2005/0285934 A1 | 12/2005 | Carter |
| 2006/0136237 A1 | 6/2006 | Spiegel et al. |
| 2007/0016496 A1 | 1/2007 | Bar et al. |
| 2007/0073552 A1 | 3/2007 | Hileman |
| 2007/0150375 A1 | 6/2007 | Yang |
| 2007/0170237 A1 | 7/2007 | Neff |
| 2007/0244763 A1 | 10/2007 | Williams et al. |
| 2007/0293978 A1 | 12/2007 | Wurman et al. |
| 2008/0111816 A1 | 5/2008 | Abraham et al. |
| 2008/0150679 A1 | 6/2008 | Bloomfield |
| 2008/0154659 A1 | 6/2008 | Bettes et al. |
| 2008/0167817 A1 | 7/2008 | Hessler et al. |
| 2008/0301009 A1 | 12/2008 | Plaster et al. |
| 2009/0062974 A1 | 3/2009 | Tamamoto et al. |
| 2009/0063166 A1 | 3/2009 | Palmer |
| 2009/0086275 A1 | 4/2009 | Liang et al. |
| 2009/0106124 A1 | 4/2009 | Yang |
| 2009/0149985 A1 | 6/2009 | Chirnomas |
| 2009/0164379 A1 | 6/2009 | Jung et al. |
| 2009/0165127 A1 | 6/2009 | Jung et al. |
| 2009/0236470 A1 | 9/2009 | Goossen et al. |
| 2009/0254457 A1 | 10/2009 | Folsom |
| 2009/0254482 A1 | 10/2009 | Vadlamani et al. |
| 2009/0299903 A1 | 12/2009 | Hung et al. |
| 2009/0303507 A1 | 12/2009 | Abeloe |
| 2009/0314883 A1 | 12/2009 | Arlton et al. |
| 2010/0030608 A1 | 2/2010 | Kaminsky et al. |
| 2010/0031351 A1 | 2/2010 | Jung et al. |
| 2010/0088175 A1 | 4/2010 | Lundquist |
| 2010/0169185 A1 | 7/2010 | Cottingham |
| 2010/0287065 A1 | 11/2010 | Alivandi |
| 2010/0299222 A1 | 11/2010 | Hamilton et al. |
| 2011/0035149 A1 | 2/2011 | McAndrew et al. |
| 2011/0074570 A1 | 3/2011 | Feldstein et al. |
| 2011/0087350 A1 | 4/2011 | Fogel et al. |
| 2011/0153052 A1 | 6/2011 | Pettibone et al. |
| 2011/0246331 A1 | 10/2011 | Luther et al. |
| 2011/0264311 A1 | 10/2011 | Lee et al. |
| 2011/0282476 A1 | 11/2011 | Hegemier et al. |
| 2011/0313878 A1 | 12/2011 | Norman |
| 2012/0039694 A1 | 2/2012 | Suzanne |
| 2012/0078592 A1 | 3/2012 | Sims |
| 2012/0109419 A1 | 5/2012 | Mercado |
| 2012/0219397 A1 | 8/2012 | Baker |
| 2012/0221438 A1 | 8/2012 | Cook et al. |
| 2013/0006739 A1 | 1/2013 | Horvitz et al. |
| 2013/0073477 A1 | 3/2013 | Grinberg |
| 2013/0081245 A1 | 4/2013 | Vavrina et al. |
| 2013/0148123 A1 | 6/2013 | Hayashi |
| 2013/0218446 A1 | 8/2013 | Bradley et al. |
| 2013/0218799 A1 | 8/2013 | Lehmann et al. |
| 2013/0261792 A1 | 10/2013 | Gupta et al. |
| 2013/0262251 A1 | 10/2013 | Wan et al. |
| 2013/0262252 A1 | 10/2013 | Lakshman et al. |
| 2013/0262276 A1 | 10/2013 | Wan et al. |
| 2013/0262336 A1 | 10/2013 | Wan et al. |
| 2013/0264381 A1 | 10/2013 | Kim et al. |
| 2014/0022055 A1 | 1/2014 | Levien et al. |
| 2014/0030444 A1 | 1/2014 | Swaminathan et al. |
| 2014/0031964 A1 | 1/2014 | Sidhu et al. |
| 2014/0032034 A1 | 1/2014 | Raptopoulos et al. |
| 2014/0040065 A1 | 2/2014 | DuBois |
| 2014/0052661 A1 | 2/2014 | Shakes et al. |
| 2014/0058959 A1 | 2/2014 | Isbjornssund et al. |
| 2014/0089073 A1 | 3/2014 | Jacobs et al. |
| 2014/0136282 A1 | 5/2014 | Fedele |
| 2014/0156053 A1 | 6/2014 | Mahdavi et al. |
| 2014/0200697 A1 | 7/2014 | Cheng |
| 2014/0214684 A1 | 7/2014 | Pell |

(56) References Cited

U.S. PATENT DOCUMENTS

| | | |
|---|---|---|
| 2014/0244433 A1 | 8/2014 | Cruz |
| 2014/0254896 A1 | 9/2014 | Zhou et al. |
| 2014/0283104 A1 | 9/2014 | Nilsson |
| 2015/0006005 A1 | 1/2015 | Yu et al. |
| 2015/0066178 A1 | 3/2015 | Stava |
| 2015/0069968 A1 | 3/2015 | Pounds |
| 2015/0102154 A1 | 4/2015 | Duncan et al. |
| 2015/0112837 A1 | 4/2015 | O'Dea |
| 2015/0112885 A1 | 4/2015 | Fadell et al. |
| 2015/0120602 A1 | 4/2015 | Huffman et al. |
| 2015/0127712 A1 | 5/2015 | Fadell et al. |
| 2015/0129716 A1 | 5/2015 | Yoffe |
| 2015/0153175 A1 | 6/2015 | Skaaksrud |
| 2015/0158599 A1 | 6/2015 | Sisko |
| 2015/0175276 A1 | 6/2015 | Koster |
| 2015/0183528 A1 | 7/2015 | Walsh et al. |
| 2015/0185034 A1 | 7/2015 | Abhyanker |
| 2015/0227882 A1 | 8/2015 | Bhatt |
| 2015/0246727 A1 | 9/2015 | Masticola et al. |
| 2015/0259078 A1 | 9/2015 | Filipovic et al. |
| 2015/0317597 A1 | 11/2015 | Shucker et al. |
| 2015/0332206 A1 | 11/2015 | Trew et al. |
| 2015/0370251 A1 | 12/2015 | Siegel et al. |
| 2016/0009413 A1 | 1/2016 | Lee et al. |
| 2016/0033966 A1 | 2/2016 | Farris et al. |
| 2016/0058181 A1* | 3/2016 | Han .................. A47B 81/00 312/236 |
| 2016/0104099 A1 | 4/2016 | Villamar |
| 2016/0114488 A1 | 4/2016 | Medina et al. |
| 2016/0144734 A1 | 5/2016 | Wang et al. |
| 2016/0144982 A1 | 5/2016 | Sugumaran |
| 2016/0180618 A1* | 6/2016 | Ho .................. G07C 9/00563 340/5.52 |
| 2016/0207627 A1 | 7/2016 | Hoareau et al. |
| 2016/0257401 A1 | 9/2016 | Buchmueller et al. |
| 2016/0266578 A1 | 9/2016 | Douglas et al. |
| 2016/0299233 A1 | 10/2016 | Levien et al. |
| 2016/0334229 A1 | 11/2016 | Ross et al. |
| 2016/0364989 A1 | 12/2016 | Speasl et al. |
| 2017/0032315 A1 | 2/2017 | Gupta et al. |
| 2017/0096222 A1 | 4/2017 | Spinelli et al. |
| 2017/0098378 A1 | 4/2017 | Soundararajan et al. |
| 2017/0101017 A1 | 4/2017 | Streett |
| 2017/0164319 A1 | 6/2017 | Skaaksrud et al. |
| 2017/0167881 A1 | 6/2017 | Rander et al. |
| 2017/0199522 A1* | 7/2017 | Li .................. G05D 1/0033 |
| 2017/0330145 A1* | 11/2017 | Studnicka .......... G06Q 10/0836 |

OTHER PUBLICATIONS

Sandoval, "Google patents secure rolling box to receive packages from drones," Geekwire.com, Jan. 27, 2016, URL: http://www.geekwire.com/2016/google-pondering-drone-delivery-even-about-boxes-it-flies-to-front-doors/, 11 pages.

URL: https://web.archive.org/web/20160804001046/https://www.starship.xyz/, download date: Aug. 4, 2016, 21 pages.

* cited by examiner

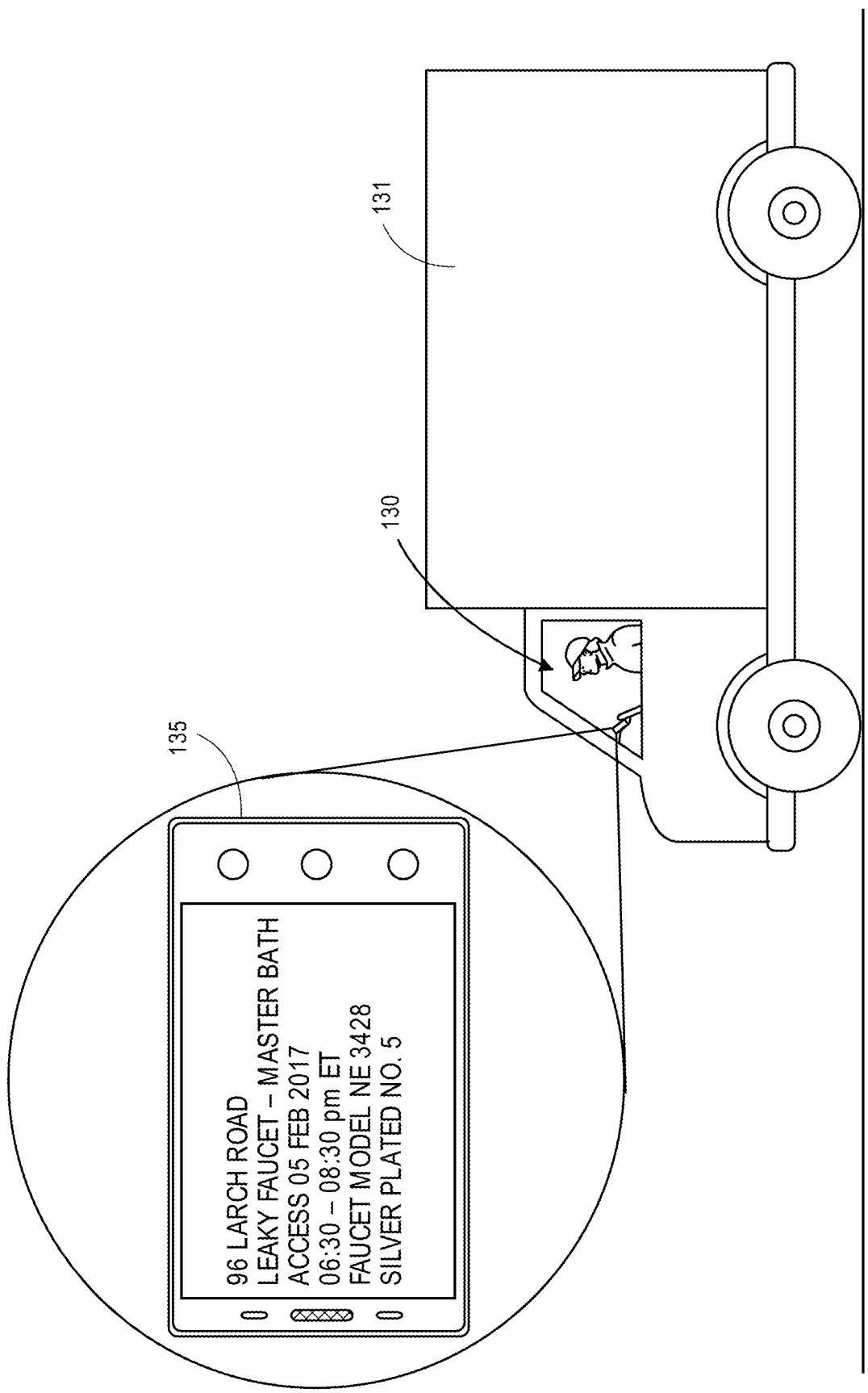

PERSONAL INTERMEDIARY ACCESS DEVICE

BACKGROUND

With each passing year, the Internet becomes a greater and more permanent fixture in our daily lives. Once limited to communication between massive servers or other large machines associated with military or other government organizations, Internet connectivity eventually expanded to include academic institutions, home computers, mobile computers and telephones, e.g., "smartphones," over time, in progressively faster connections having increased speed and reliability. Today, the number and types of machines that may access the Internet continue to increase, as a wide array of devices including but not limited to televisions, refrigerators, automobiles, home security systems and even wristwatches may now access the Internet through various wired or wireless means.

While the advancement of Internet technologies, and their expansion to more and more devices, systems or sensors, have enabled humans to efficiently and effectively receive, access, transmit and store information or data to and from a wider variety of platforms, the use of that information or data has remained the same. For example, a browser or an E-mail client operating on a smartphone or a wristwatch typically functions in the same manner as a browser or an E-mail client operating on a desktop computer or a laptop computer, i.e., by rendering interactive pages and receiving interactions with such pages from a user, albeit on a smaller screen.

Moreover, by its very nature, the proliferation of Internet-enabled devices has naturally increased the risk that sensitive information or data may be accessed by unauthorized users, either intentionally or inadvertently. Because information or data may pass between and among multiple computing devices, and along multiple connections, any of which may be subject to hacking or theft via one or more surreptitious means, protective measures must be taken when access to a network or one or more Internet-enabled devices is desired on a temporary basis.

BRIEF DESCRIPTION OF THE DRAWINGS

FIGS. 1A through 1I are views of aspects of one system including an intermediary device in accordance with embodiments of the present disclosure.

DETAILED DESCRIPTION

As is set forth in greater detail below, the present disclosure is directed to intermediary devices that may grant temporary access to a home, an office or another secure facility on behalf of an owner or another designated individual associated with the secure facility, or engage in secure communications between the owner and an authorized visitor to whom access has been granted. In particular, the intermediary devices of the present disclosure may be configured to automatically authenticate a visitor (e.g., a worker such as a deliveryman, a repairman or another service provider) to a secure facility, to grant the visitor temporary access to specific aspects of the secure facility for a limited purpose and for a limited period of time, and to automatically monitor the visitor's actions at the secure facility.

Thus, the intermediary devices of the present disclosure may act as both a virtual concierge that stands in the shoes of an owner of a secure facility, and be configured to detect the arrival of a visitor, determine the visitor's intent, grant access to the visitor, monitor the visitor's actions within the secure facility, or exercise judgment on behalf of the owner in response to one or more sensed conditions within the secure facility. The intermediary devices may be further configured to permit the owner to securely communicate with the visitor while acting as a virtual firewall that protects sensitive information or data of the owner, as well as the owner's personal effects or other possessions within the secure facility, from damage, theft or other forms of loss.

Figure 1A:
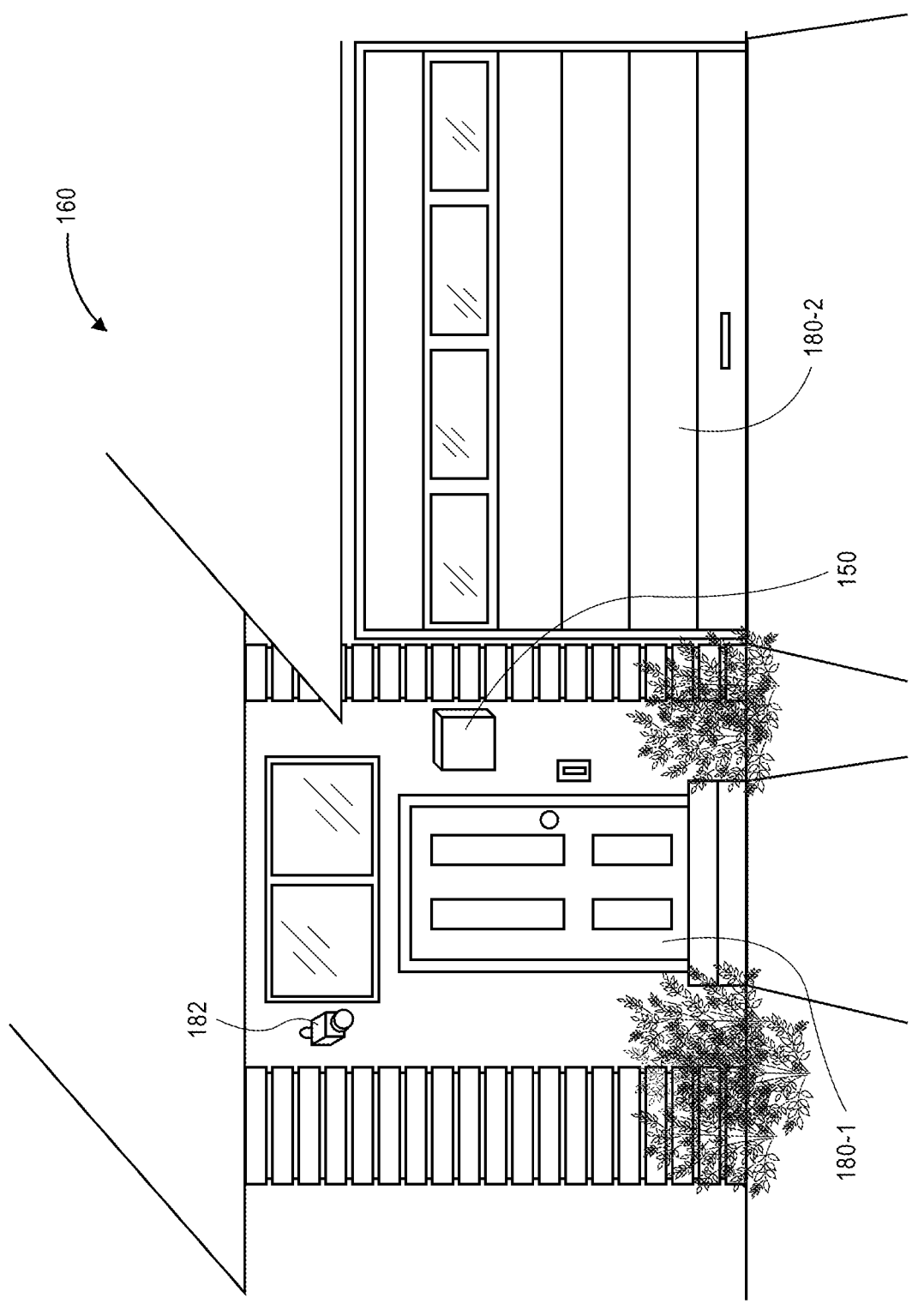

Referring to FIGS. 1A through 1I, views of aspects of one system including an intermediary device 150 in accordance with embodiments of the present disclosure are shown. As is shown in FIG. 1A, the intermediary device 150 is mounted outside of a secure facility, e.g., a home 160, having a front door 180-1 and a garage door 180-2, and a security camera 182 mounted at the front door 180-1. The intermediary device 150 may be equipped with one or more processors, components, transceivers, sensors or other systems for engaging in communications with aspects of the home 160 (e.g., appliances, lighting, environmental or other systems, such as the security camera 182), as well as any visitors to the home 160. For example, the intermediary device 150 may include any number of transceivers for communicating with aspects of the Internet or one or more other networks, including but not limited to any wired or wireless routers within the home 160, or any other computer devices therein, as well as any number of sensors or readers for communicating via any wired or wireless systems or protocols, including but not limited to Wireless Fidelity (or "Wi-Fi"), radio frequency identification (or "RFID"), near-field communication (or "NFC") readers, Bluetooth®, or any other type of systems or protocols. For example, the intermediary device 150 may further include any number of audio or video sensors, including but not limited to one or more imaging devices (e.g., digital cameras) and/or microphones, or any other type of sensors, embedded or incorporated therein.

Figure 1B:
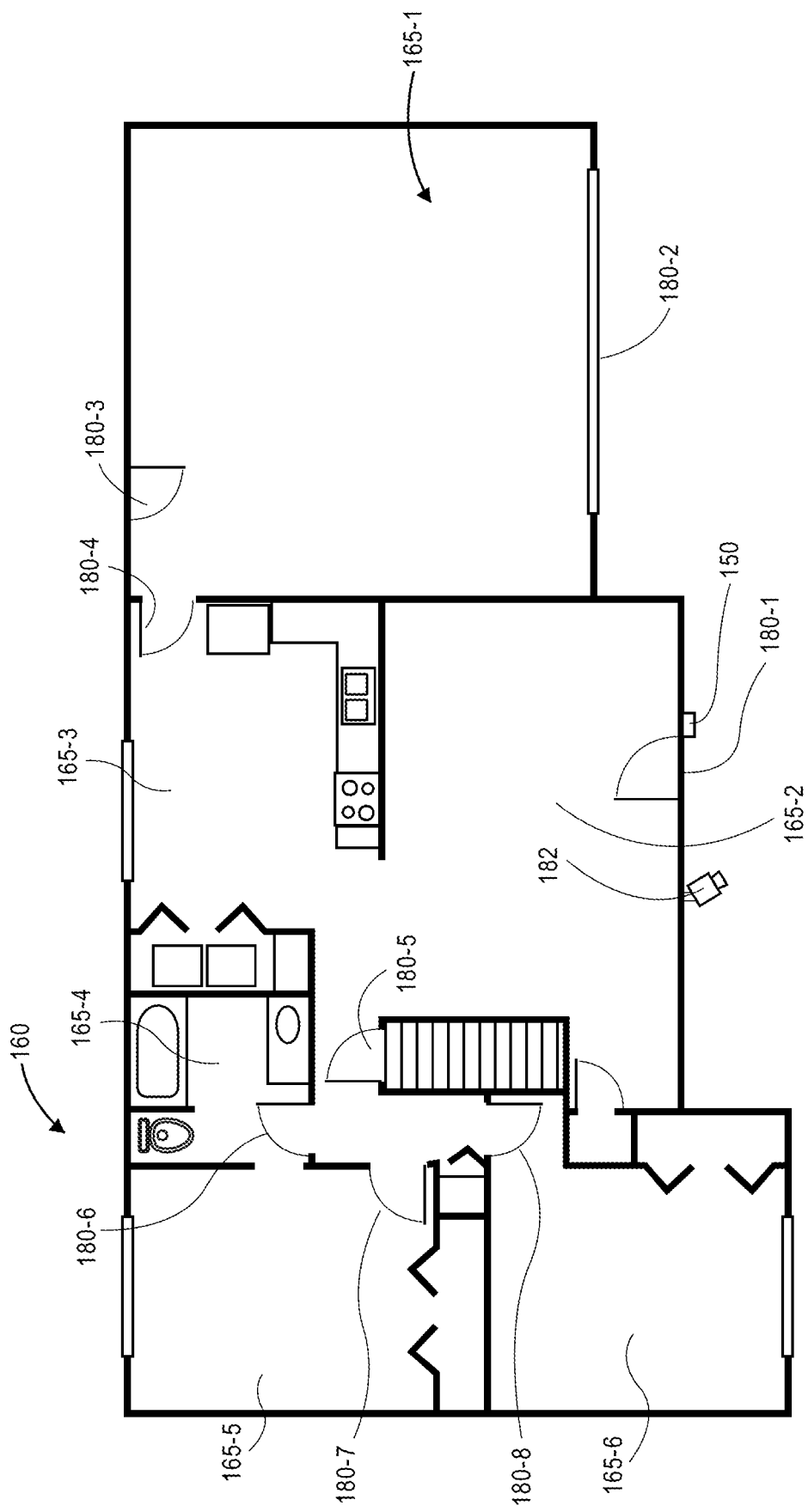

As is shown in FIG. 1B, a first floor of the home 160 includes a plurality of rooms 165-1, 165-2, 165-3, 165-4, 165-5, 165-6, including a garage 165-1, a living room 165-2, a kitchen 165-3, a bathroom 165-4, a master bedroom 165-5 and a second bedroom 165-6. The home 160 further includes a plurality of doors 180-1, 180-2, 180-3, 180-4, 180-5, 180-6, 180-7, 180-8, including the front door 180-1, the garage door 180-2, a rear door 180-3 for accessing the garage 165-1, a door 180-4 between the garage 165-1 and the kitchen 165-3, a door 180-5 leading to a basement of the home 160 (not shown), a door 180-6 leading to the bathroom 165-4, a door 180-7 leading to the master bedroom 165-5 and a door 180-8 leading to the second bedroom 165-6. One or more of the doors 180-1, 180-2, 180-3, 180-4, 180-5, 180-6, 180-7, 180-8 may be operated manually as well as automatically, such as by locking or unlocking the doors 180-1, 180-2, 180-3, 180-4, 180-5, 180-6, 180-7, 180-8 with a password, or by opening or closing the doors by hand or using one or more motorized components or like systems. Although FIG. 1B shows a floor plan of the first floor of the home 160 having six rooms and eight doors, those of ordinary skill in the pertinent arts will recognize that the home 160 may include any number of levels above or below the floor plan shown in FIG. 1B, and that such levels may include any number of rooms or doors.

Figure 1C:
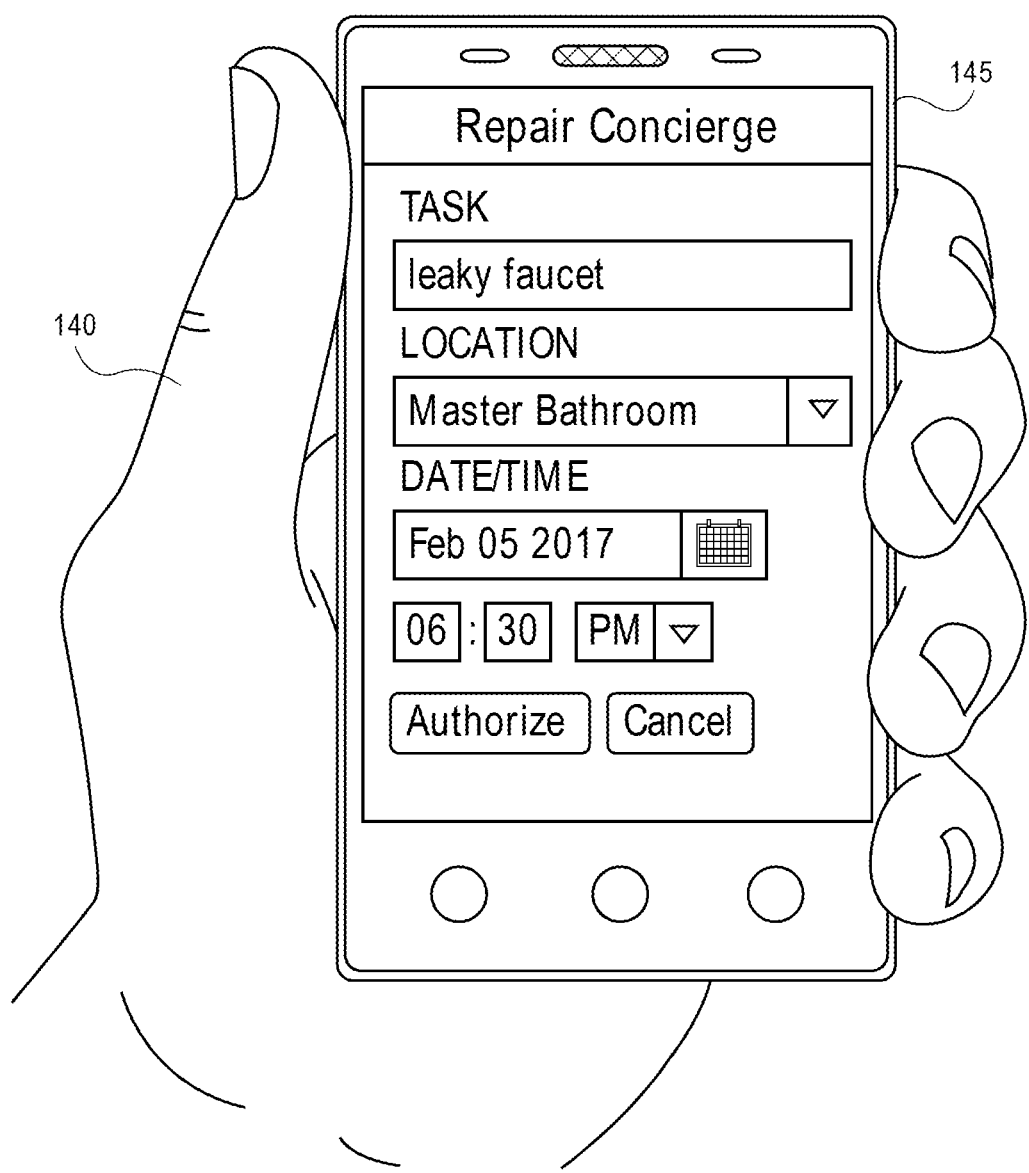
Figure 1E:
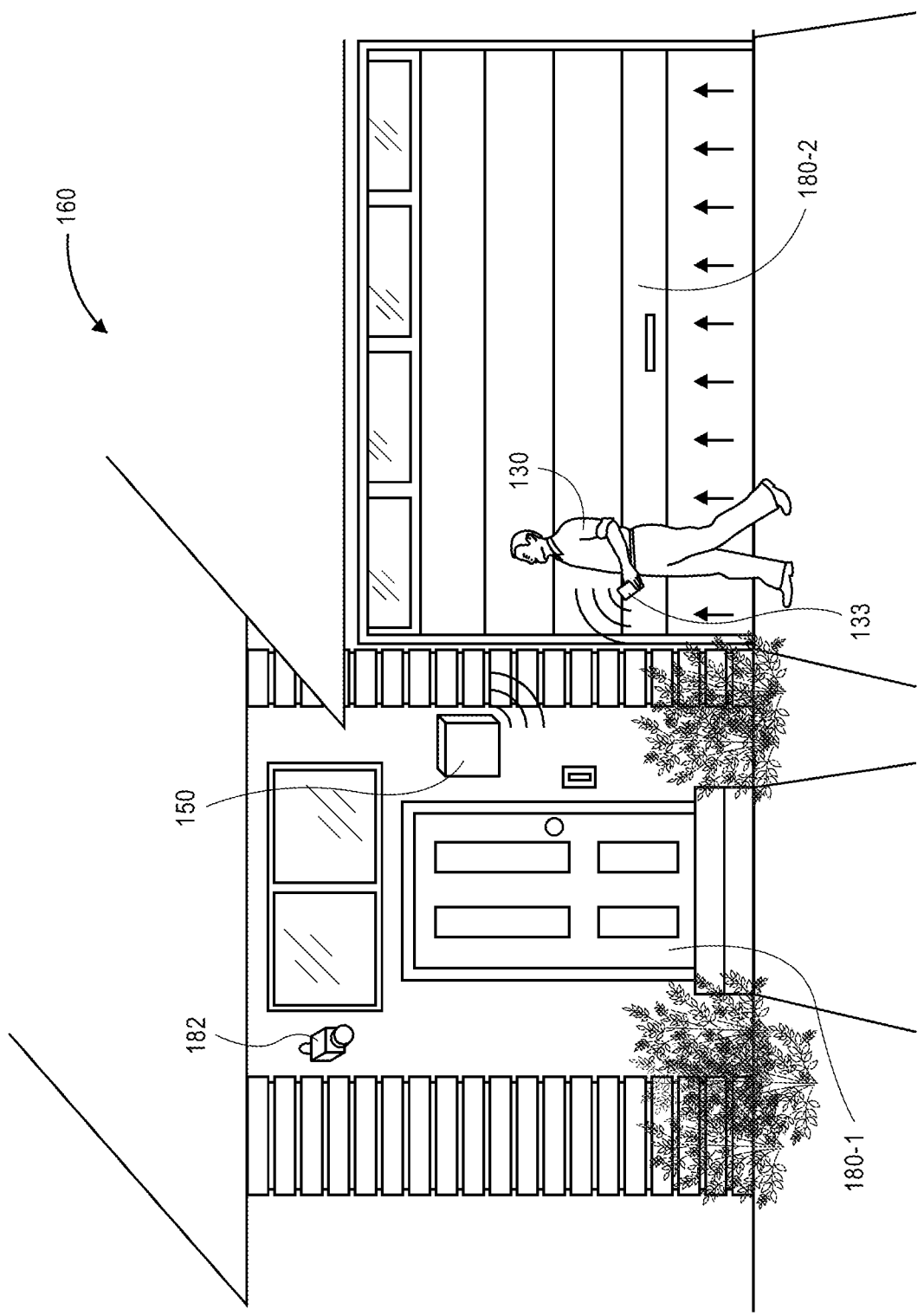

In accordance with the present disclosure, an owner 140 or other authorized individual associated with the home 160 may enable an authorized visitor to access specific aspects of the home 160, e.g., one or more of the rooms 165-1, 165-2, 165-3, 165-4, 165-5, 165-6 of the home 160, so that the visitor may perform one or more services therein. The intermediary device 150 ensures that the owner 140 need not be present when the visitor arrives, or when such services are to be performed. As is shown in FIG. 1C, the owner 140 may request that such services be performed via a mobile device 145 (e.g., a smartphone or tablet computer) or other communications device (e.g., a land-based telephone, a cellular telephone, a desktop computer, a laptop computer). For example, as is shown in FIG. 1C, the owner 140 may enter information regarding services that are desired at the home 160, viz., repairs to a leaky faucet 184 as shown in FIG. 1G, as well as a location where the services are required (viz., the bathroom 165-4), and a date and/or time when the owner 140 requests that the services be performed.

After the owner 140 of the home 160 places a request for services, such as is shown in FIG. 1C, the request may be routed to an individual or organization responsible for performing such services, such as a worker 130. For example, as is shown in FIG. 1D, information regarding the requested services is provided to a mobile device 135 (e.g., a smartphone or tablet computer) of the worker 130. The information may include an address of the home 160, as well as a description of the work to be performed, and any other information that may be known regarding the services to be performed, e.g., a model or brand of the faucet 184 that requires repair. In response to receiving the information, the worker 130 may travel to the location of the home 160 in a van 131 or another vehicle or, alternatively, on foot.

In accordance with the present disclosure, the intermediary device 150 may be configured to recognize that the worker 130 has arrived at the home 160 and to confirm that his or her intent is to perform the services at the request of the owner 140. For example, as is shown in FIG. 1E, the intermediary device 150 may detect or sense the presence of the worker 130 by one or more RFID signals received from an identification tag 133 including one or more RFID transmitting devices. The worker 130 may then be authenticated based on data contained in such signals. Alternatively, in some embodiments, where the intermediary device 150 includes a digital camera and/or a microphone, or is in communication with one or more digital cameras or microphones installed outside of the home 160, the worker 130 may be authenticated by facial recognition, gesture recognition, voice recognition or any other means. For example, the intermediary device 150 may authenticate the worker 130 based on one or more fingerprint recognition or touch recognition techniques. In still other embodiments, the intermediary device 150 may detect or sense the presence of the worker 130 based on one or more sensors or components included in or associated with the mobile device 135 of the worker 130, or based on the exchange of information or data of any type or form between the mobile device 135 and the intermediary device 150. Furthermore, in some embodiments, the intermediary device 150 may be configured to authenticate the worker 130 based on exchanges of information or data with the worker 130 and/or without sharing any information or data regarding the worker 130 with the owner 140.

Once the worker 130 has been authenticated, the intermediary device 150 may allow the worker 130 to access the home 160, e.g., by unlocking and opening the garage door 180-2, and perform services in the designated location, viz., the bathroom 165-4, thereby enabling the worker 130 to perform said services having access to a physical or virtual key or another authenticator. Alternatively, the intermediary device 150 may unlock and/or open the front door 180-1, or the rear door 180-3 shown in FIG. 1B, and allow the worker 130 to access the home 160 thereby. The intermediary device 150 may also determine a route to be traveled by the worker 130 within the home 160, e.g., a shortest or optimal path, and may automatically unlock and/or open any intervening doors that are required to enable the worker 130 to access the bathroom 165-4. The intermediary device 150 may also automatically lock and/or close any doors within the home 160 that need not be opened in order to enable the worker 130 to access the bathroom 165-4. In some embodiments, the intermediary device 150 may alter the configuration of any security systems that may be operating within or outside of the home 160, as necessary. For example, where a security system includes switches or contacts that trigger an alarm upon the opening of the garage door 180-2, or any intervening doors between the garage door 180-2 and the bathroom 165-4, the intermediary device 150 may deactivate or neutralize any such switches or contacts. The intermediary device 150 may maintain the protections provided by such a security system in place, however, with regard to doors that need not be operated in order to enable the worker 130 to access the bathroom 165-4. Likewise, the intermediary device 150 may activate or alter the configuration of one or more other security sensors (e.g., imaging devices such as the security camera 182) within or outside of the home 160, as well. Moreover, the intermediary device 150 may also activate any desired appliances (e.g., lighting systems, audio systems or any other internal systems) within the home 160, or operate any environmental systems (e.g., heating or cooling systems) that may be required in order to achieve one or more desired environmental conditions generally within the home 160 (e.g., temperatures and/or humidity levels), or in one or more of the rooms 165-1, 165-2, 165-3, 165-4, 165-5, 165-6 (e.g., the bathroom 165-4) in particular during the performance of the services.

Figure 1F:
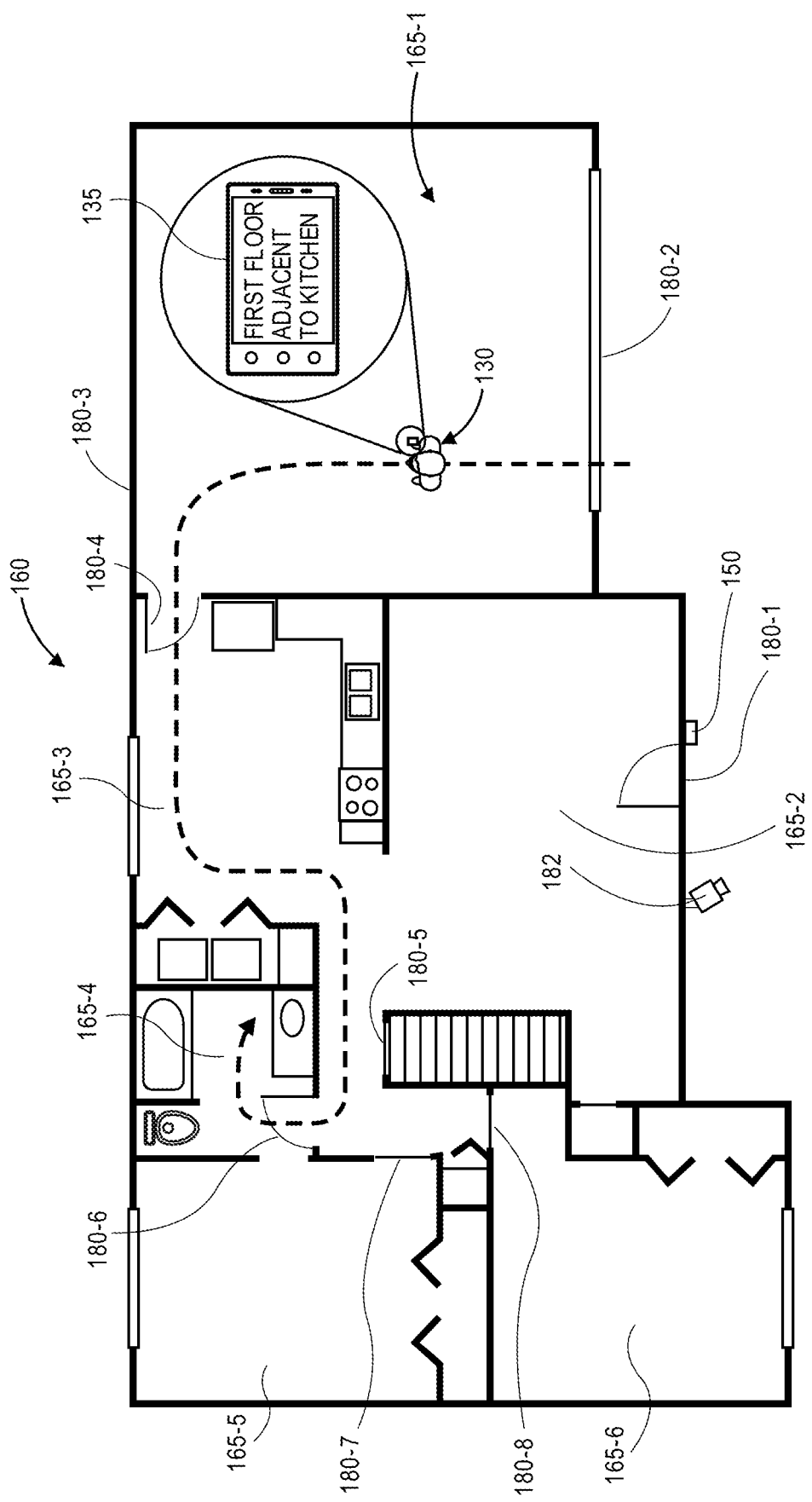
Figure 1G:
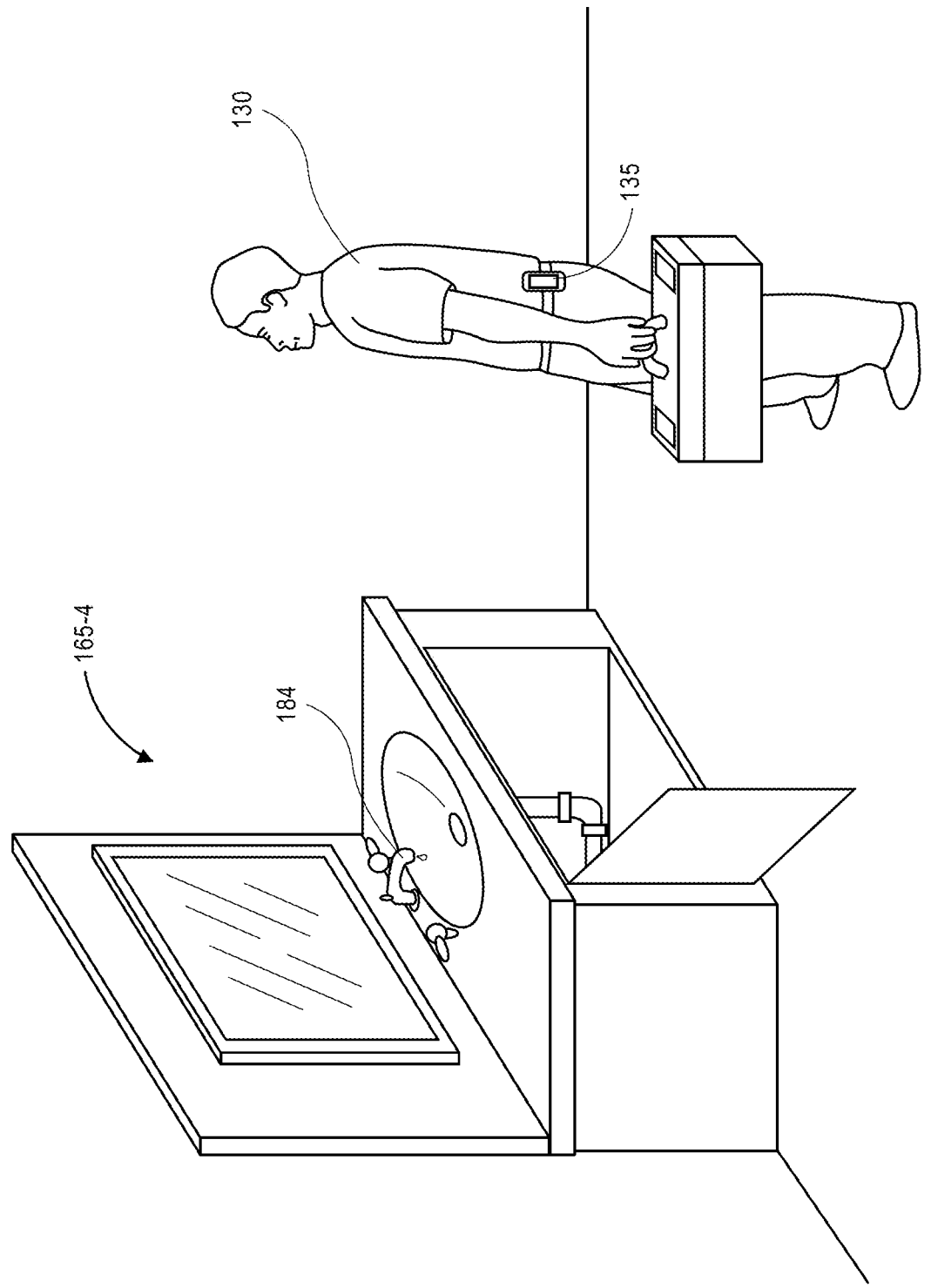

As is shown in FIG. 1F, after the garage door 180-2 has been opened, the intermediary device 150 may provide one or more additional instructions to the worker 130, including instructions identifying the location where the services are to be performed (e.g., a location of the bathroom 165-4 within the home 160, or a route to the bathroom 165-4), e.g., by one or more electronic messages to the mobile device 135. For example, the instructions may identify the location with one or more words and/or images, such as an interactive map, a text-based description, or narrated directions and/or guidance, or in any other manner. In some embodiments, the intermediary device 150 may automatically unlock and/or open any intervening doors between the garage door 180-2 and the bathroom 165-4. In some other embodiments, the intermediary device 150 may generate one or more temporary passwords or other authenticators that may be required in order to unlock and/or open any such doors, and provide such passwords or authenticators to the mobile device 135. Information or data regarding such passwords or authenticators may be transmitted between the intermediary device 150 and the mobile device 135 over a closed, secure network connection.

Figure 1H:
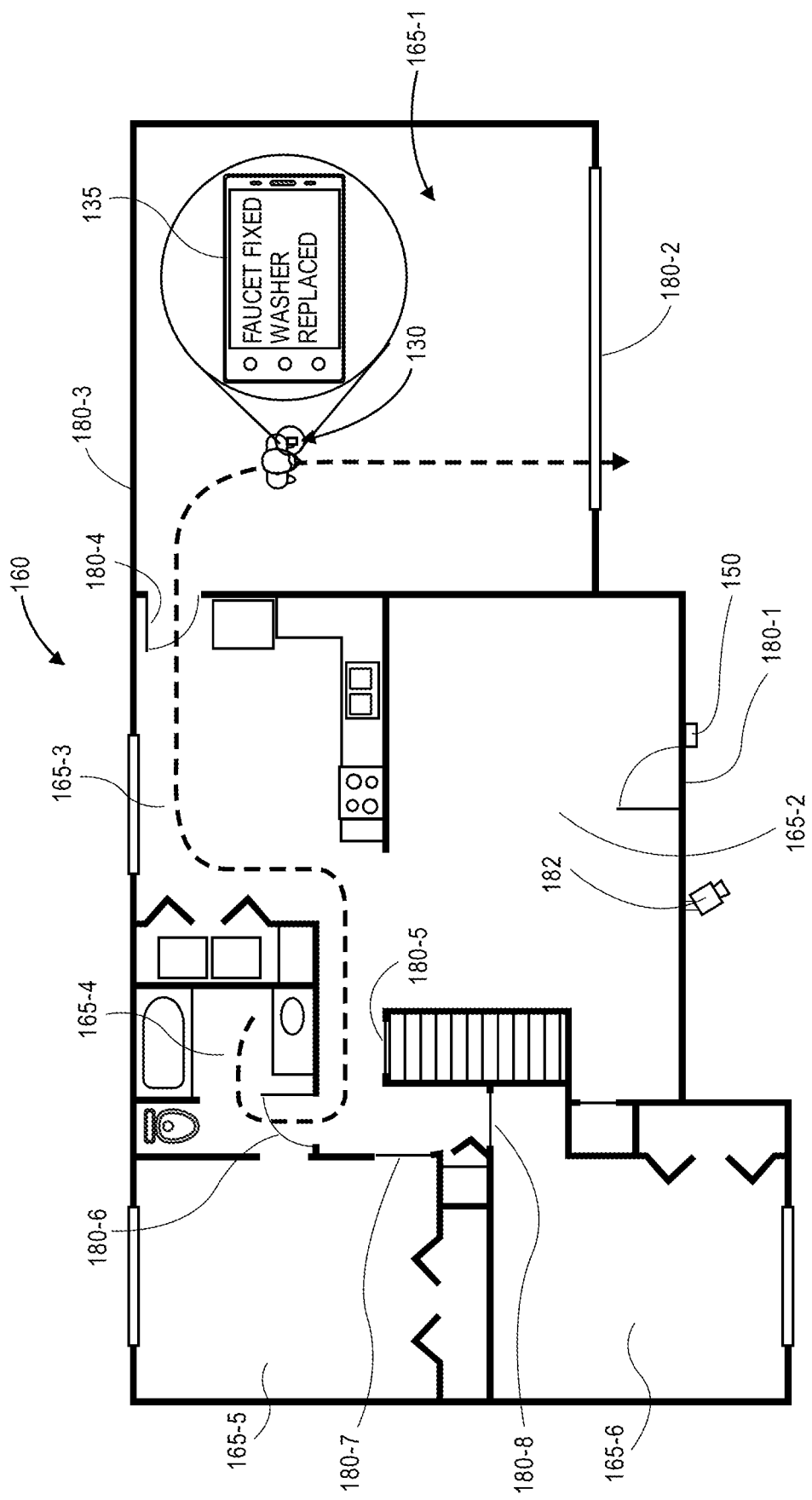

As is shown in FIG. 1G, upon reaching the bathroom 165-4, the worker 130 may access the faucet 184, e.g., above or beneath a countertop. As is shown in FIG. 1H, upon completing the services, the worker 130 may depart the bathroom 165-4 and the home 160, such as by retracing his or her steps and exiting the home 160 via the garage door 180-2, or, alternatively, by exiting the home 160 via the front door 180-1 and/or the rear door 180-3, or following any other route or path provided to the worker 130 or the mobile device 135 by the intermediary device 150. Additionally, the worker 130 may report the results of the services that he or she performed and any supplemental information that may be required to the intermediary device 150. For example, the worker 130 may transmit one or more electronic messages to the intermediary device 150 using the mobile device 135, e.g., via a closed, secure network connection, or over a network such as the Internet. Alternatively, where the intermediary device 150 includes one or more audio and/or video input devices, such as a camera and/or a microphone, the worker 130 may dictate words to the intermediary device 150, which may be configured to recognize information regarding the services from such words.

Figure 1I:
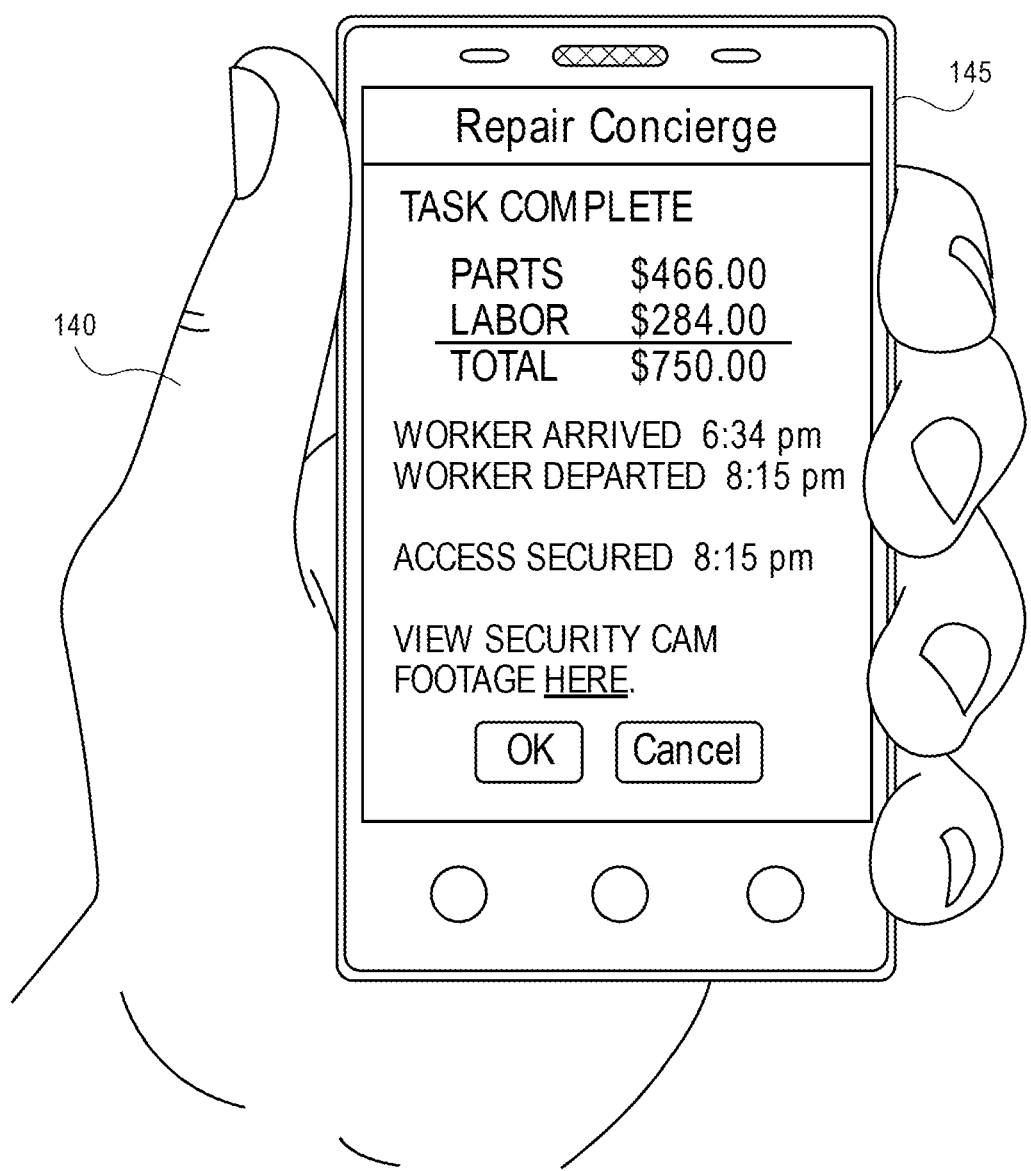

Subsequently, the intermediary device 150 may restore the home 160 to a secure condition, and cancel or invalidate any temporary passwords or authenticators that were provided to the worker 130 and/or the mobile device 135. The intermediary device 150 may then report to the owner 140 the status of the repairs, and any other relevant information, e.g., an invoice or follow-up actions that may be required on the part of the owner 140. For example, as is shown in FIG. 1I, the intermediary device 150 may transmit one or more electronic messages or other information or data to the mobile device 145 of the owner 140, reporting the times when the repairs were performed within the home 160, as well as the fact that access to the home 160 was secured. Additionally, the intermediary device 150 may further report a total cost of the services that were performed (e.g., labor and materials), and provide information or data, or links to information or data, regarding the performance of the services. For example, as is shown in FIG. 1I, the intermediary device 150 may provide a link to security footage captured by the security camera 182, or one or more other security cameras within the home 160 (not shown) prior to, during or after the services were performed by the worker 130, or any other relevant information concerning the services.

Accordingly, the systems and methods of the present disclosure are directed to intermediary devices that may be associated with secure facilities such as homes, offices or other structures. An intermediary device may be installed on an outer wall of a secure facility, such as is shown in FIG. 1A, or, alternatively, on an inner wall of the secure facility, or in any other location in association with an entryway (e.g., a door) of the secure facility, such as beneath a portico, a porch, a balcony, a veranda or another structure. The intermediary devices of the present disclosure may be configured to communicate with any computer devices within the secure facility, or any networks or communications systems within the secure facility, and also with one or more visitors to the secure facility or any computers or computer devices that may be carried or utilized by such visitors.

Additionally, the intermediary devices of the present disclosure may be further configured to operate any access-related systems within a secure facility, including any doors, security cameras or monitors or other systems that may allow a visitor to access the secure facility and monitor his or her activities within the secure facility, without requiring an owner or other designated individual at the secure facility to provide the visitor with a physical key, a password or other authenticator (e.g., a cryptographic key) for such systems, or to reduce a level of security or readiness of the secure facility in order to enable the visitor to operate such systems independently. The intermediary devices may be further configured to enable a visitor to communicate with the owner or other designated individual via one or more secure communications channels (e.g., voice, video and/or data) without requiring the owner or other designated individual to provide the visitor with any contact information (e.g., a telephone number, an E-mail address or an instant messaging or social network account name or handle). The intermediary devices may also be configured to share any relevant information or data with a visitor, at the request of an owner or other designated individual at a secure facility, while preventing the visitor from accessing any other sensitive information or data of the owner within the secure facility. The intermediary devices may also be configured to communicate with one or more autonomous mobile robots within a secure facility, including but not limited to cleaning robots, servicing robots, domestic robots, household robots, monitoring and/or surveillance robots, or robots of any other kind, e.g., to provide one or more instructions for performing one or more tasks within the secure facility.

Currently, the processes by which an owner (or a tenant or a resident, or a representative of the owner, the tenant or the resident) of a secure facility requests and receives the performance of one or more services on the premises are less than ideal, and commonly require the owner to choose from the lesser of two or more evils. For example, when a customer orders an item from a merchant (or other source of the item) for delivery to his or her house, apartment or other dwelling, e.g., by mail or a common carrier, the customer may attempt to schedule the delivery for a time when he or she will be available to retrieve a package including the item upon its arrival. If the delivery may not be scheduled for a time when the customer is available, or if the customer is otherwise unable to retrieve the package immediately upon its delivery, the package will typically be deposited on the premises of the secure facility (e.g., outside a door or other opening), requiring the customer to bear the risk that the package may be stolen by thieves or damaged by vandals, animals or the elements until the customer is available to retrieve it. The customer must then carry the package into the secure facility and assemble the item, if necessary, without the benefits of the assistance or the expertise of the merchant.

Likewise, when an owner requests that a service provider perform repairs, renovations or other services at a secure facility, the owner must either remain at the secure facility in order to personally observe and/or supervise the performance of the repairs, renovations or services, or ask that an individual with a trusted set of eyes and ears remain at the secure facility in order to observe and/or supervise such activities on his or her behalf. For example, where the repairs, renovations or other services are to be performed at a home, the owner often must stay home from work, school or other engagements or appointments in order to operate locks, doors or other access-related systems, or to answer any questions that the service provider may have during the performance of the services. Alternatively, the owner may present the service provider with a physical key, or a password or other authenticator (e.g., a cryptographic key), and authorize the service provider to enter the secure facility and to perform the repairs, renovations or other services in his or her absence. However, leaving the service provider unattended during the performance of such activities subjects the owner to the risk that the service provider may damage the secure facility, its surroundings or its connections to various utilities while performing such activities. The owner is also subject to the risk that the service provider may enter one or more spaces where repairs, renovations or other services are not required, such as where one or more valuables (e.g., jewelry) or sensitive information are located, and potentially abscond with such valuables or information. The owner further bears the risk that the service provider will not properly secure the premises upon a temporary or final completion of the repairs, renovations or other services, leaving the secure facility open for entry by one or more unauthorized individuals. Where an owner elects to be elsewhere during the performance of repairs, renovations or services, the owner must also ensure that the secure facility is placed in a desired operational or environmental condition (e.g., lighting, temperature, humidity or the like) prior to the performance of such activities, likely leaving the secure facility in this condition for an entire duration between the owner's departure and the owner's return, regardless of the length of time that is actually required to perform the activities.

Moreover, where communications with a service provider (e.g., a repairman, a deliveryman or the like) are desired or required during the performance of deliveries, repairs, renovations or other services, an owner of a secure facility typically must also either remain at the secure facility during the performance of such activities, or supply the service provider with his or her contact information (e.g., a telephone number, an E-mail address or an instant messaging or social network account name or handle), and permit the service provider to contact him or her as necessary to discuss the status of the deliveries, repairs, renovations or other services, to request and receive authorizations to purchase needed materials or perform additional work, to obtain answers to any questions that may arise during the performance of such activities, or for any other reason. After the deliveries, repairs, renovations or other services have been completed, however, the service provider retains possession of the owner's contact information, and may utilize that contact information to contact the owner at its discretion, such as with marketing inquiries and/or spam. Therefore, where an owner desires to avoid unwanted contact with a service provider following the completion of deliveries, repairs, renovations or other services, the owner must elect to remain on the premises during the performance of such activities, or change his or her telephone number, E-mail address, or instant messaging or social network account name or handle after such activities have been completed.

Similarly, where a service provider requires access to the Internet or other network during the performance of deliveries, repairs, renovations or other services at a secure facility, the owner must grant the service provider temporary access to the Internet or other network, e.g., via a router or other network component at the secure facility, and thereby accept the risk that the service provider or another entity may access secure information thereby, either at the time of the deliveries, repairs, renovations or other services or at a later time.

Thus, when an owner or other individual associated with a secure facility requires one or more services of any kind (e.g., deliveries, repairs, renovations or other services), the owner is typically faced with a choice between personally involving himself or herself in the performance of such services, such as by being present at the secure facility when a service provider performs the services and/or remaining accessible by traditional or Internet telephony, or by granting unfettered access to all or portions of the secure facility to the service provider and remaining physically absent. The former option often results in a temporary loss of productivity or opportunity for the owner, while the latter option subjects the owner to an increased risk of damage or theft of possessions, personal effects or sensitive information or data.

The systems and methods of the present disclosure are directed to intermediary devices that are particularly configured to grant access to all or portions of a secure facility, thereby enabling a service provider to perform any number of services at the secure facility in the absence of the owner, and to engaging in communications between one or more service providers and the owner via secure communications channels. The intermediary devices may include any number of sensors such as imaging sensors (e.g., digital cameras or other imaging devices), acoustic sensors (e.g., microphones) or other sensors, as well as communications equipment (e.g., wired or wireless means for communication such as components or systems operating Wi-Fi, Bluetooth, near-field communications or cellular technologies or protocols), along with one or more power modules (e.g., batteries), which may be rechargeable, refuelable or replaceable in nature. Information or data obtained or determined by such sensors or such communications equipment may be utilized in controlling the operation of any systems within a secure facility with which the intermediary devices are in communication. The intermediary devices of the present disclosure may further include any number of computer components (e.g., processors, data stores, transceivers or input/output devices) for performing any of the tasks or executing any of the functions described herein.

Thus, the intermediary devices of the present disclosure may act as both a virtual concierge that stands in the shoes of an owner of a secure facility, and is configured to detect the arrival of a visitor, determine the visitor's intent, grant access to the visitor, monitor the visitor's actions within the secure facility, or exercise judgment on behalf of the owner in response to one or more sensed conditions within the secure facility. The intermediary devices may be further configured to permit the owner to securely communicate with the visitor while acting as a virtual firewall that protects sensitive information or data of the owner, as well as the owner's personal effects or other possessions within the secure facility, from damage, theft or other forms of loss.

In some embodiments, the intermediary devices may be configured to remain aware of their respective surroundings, e.g., using one or more onboard sensors, or one or more sensors that are otherwise associated with a secure facility to which each is installed. For example, an intermediary device may include one or more digital cameras or other imaging devices, or motion and/or acoustic sensors, which may capture information or data regarding the secure facility and/or its surroundings, and determine whether a visitor (e.g., a human and/or a machine) has arrived, or to identify one or more prevailing conditions at the secure facility, based on the information or data. Alternatively, the intermediary device may be in communication with one or more sensors that are provided in association with the secure facility (e.g., security cameras and/or microphones), and may determine whether a visitor has arrived at the secure facility or identify any prevailing conditions based on information or data captured by such sensors.

Similarly, the intermediary devices may be configured to determine the intent of one or more visitors to a secure facility, e.g., by authenticating a visitor, based on information or data captured using one or more sensors and/or input/output devices provided on an intermediary device, or provided in association with the secure facility. For example, where an intermediary device or a secure facility is provided with one or more RFID readers, an authorized visitor may be authenticated based on information or data transmitted by an RFID tag associated with the visitor in the presence of one or more electromagnetic fields. Alternatively, where the intermediary device or secure facility is provided with one or more digital cameras or other imaging devices, or with one or more microphones, an authorized visitor may be authenticated by facial recognition, voice recognition, fingerprint or touch recognition, or any other recognition techniques. If a visitor is not authenticated, however, the intermediary devices may be configured to contact the owner of the secure facility or one or more local authorities (e.g., public or private security forces), and to provide any available information or data regarding the unauthorized visitor to the owner or such authorities, including but not limited to times of sensed arrivals or departures, imaging data and/or acoustic data captured by the intermediary device and any sensors associated with the secure facility, or the like.

The intermediary devices of the present disclosure may also be configured to grant access to a secure facility on behalf of an owner, e.g., to an authorized visitor to the secure facility who has been authenticated, and for whom an intent has been determined to a sufficiently high degree of confidence. For example, an intermediary device may be in communication with any number of internal or external access points or entryways, such as doors or other portals, having components that may be operated manually as well as automatically (e.g., manually and/or automatically), and may be locked, unlocked, opened and/or closed, as necessary, and at the direction of an intermediary device. Access may be granted for the performance of any services within or in association with one or more aspects of a secure facility, e.g., deliveries, repairs, renovations or any other services. Conversely, the intermediary devices of the present disclosure may also deny access to unauthorized visitors, or restrict access to one or more aspects of the secure facility, in a similar manner.

The intermediary devices of the present disclosure may be further configured to monitor operations and/or conditions within or around a secure facility, e.g., by configuring one or more imaging devices or other sensors to capture information or data prior to, during or following the performance of one or more services at the secure facility. Such sensors may include, but are not limited to, imaging devices (e.g., digital cameras), microphones, motion sensors, air quality sensors, heat sensors, weight sensors, or any other sensors that may detect the presence of a visitor and track his or her movements or other actions at a secure facility. The intermediary devices of the present disclosure may be further configured to operate any secondary systems that may aid in the monitoring of operations within or around a secure facility, including but not limited to lighting systems or the like that may aid in the performance of one or more sensors. The intermediary devices may be further configured to report information or data regarding the monitored operations or conditions, e.g., in the form of one or more electronic messages such as through short or multimedia messaging service (SMS or MMS) text messages, social network messages or online marketplace messages, as well as one or more telephone calls or the like.

Finally, the intermediary devices of the present disclosure may also be configured to exercise judgment on behalf of an owner of a secure facility. For example, when an intermediary device determines (e.g., based on information or data captured by one or more sensors) that an aberrant or undesirable condition or metric is sensed within or around a secure facility (e.g., a number of visitors, an electrical current into the secure facility, a flow of water or other resources into or out of the secure facility, a loading on a structural member, a duration associated with one or more services), or when any other condition or metric is determined to exceed or falls below a subjective or an objective threshold, the intermediary device may autonomously contact the owner and/or one or more service providers and provide the owner or the service providers with information regarding relevant conditions and/or metrics. Moreover, where a service provider requests additional authorization to perform one or more services (e.g., to purchase one or more additional materials or to exceed an agreed-upon amount of labor), the intermediary device may be configured to recognize the request, determine whether the request is legitimate depending on any prevailing conditions within or around the secure facility, and authorize or execute any transactions (e.g., purchases, rentals, leases or the like) that may be deemed appropriate by the intermediary device based on any express instructions provided by the owner, or based on any previously observed preferences of the owner, or prior actions taken by the owner.

The intermediary devices of the present disclosure may be configured to receive instructions from an owner of a secure facility in any manner, e.g., by a direct inter-device connection with a computer device of the owner (e.g., the mobile device 135 of FIG. 1D, 1F, 1G or 1H, or the mobile device 145 of FIG. 1C or 1I) or over one or more networks, which may include the Internet in whole or in part. Additionally, the intermediary devices may be configured to communicate with computer devices associated with one or more service providers or any operators, users, workers or persons associated with such providers, including but not limited to online marketplaces, common carriers, or organizations or entities associated with the construction, repair or renovation of secure facilities, or any number of systems therein, including but not limited to architects, bakers, butchers, carpenters, chefs, concrete finishers, deliverymen, draftsmen, electricians, engineers, gasmen, glaziers, handymen, interior designers, linemen, mechanics, painters or plumbers, or other assistants, repairmen or technicians of any kind, who may access a secure facility for any reason.

For example, the intermediary devices of the present disclosure may be configured to control or communicate with any number of existing computer devices within a secure facility, including but not limited to desktop computers, laptop computers, mobile devices (e.g., smartphones or tablet computers). The intermediary devices of the present disclosure may also be configured to control or communicate with one or more operational and/or environmental systems within a secure facility, including but not limited to lighting systems, environmental systems (e.g., heating, ventilation and/or air conditioning systems), security and/or monitoring systems (e.g., cameras, baby monitors, sensors, doors, doorbells, safes), plumbing systems or any other systems.

In some embodiments, an intermediary device may be programmed or instructed to automatically open a door or other entry point at a secure facility such as a home, an office or another structure (e.g., a private dwelling or business location), to access a public garage or other parking or standing area, or to activate an indicator within the secure facility. For example, in some embodiments, when an order for a delivery of an item is received, and the order is assigned to a fulfillment center, a warehouse or another distribution facility for fulfillment, an intermediary device may be configured to transmit wireless codes, signals or other information to trigger a response from one or more devices or machines equipped with wireless transceivers, such as garage door openers, doorbells, lights, haptic feedback systems or other machines or devices.

Alternatively, requests or instructions for granting access to locations on behalf of a worker or other individual or entity may be transmitted by one or more external computer devices or resources to one or more devices associated with secure facilities, and access to such facilities may be granted accordingly. Such requests or instructions may include access codes, authenticators, keys, tokens or similar information, which may be generated by an intermediary device and used by a worker to obtain access to one or more aspects of a secure facility at a given location. For example, a request or an instruction to grant access to a location may be transmitted to an intermediary device at the location that is configured to receive such requests or instructions, and to grant access to the location. The intermediary device may be programmed with one or more access codes, passwords, authenticators, keys, tokens or similar information associated with a location, and may grant access to the location in response to a request or an instruction received from a worker and/or external computer device or resource without divulging such access codes, passwords, authenticators, keys, tokens or similar information to the worker or the computer device or resource.

The intermediary devices of the present disclosure may be further configured to control or communicate with any other computer-enabled systems within the secure facility, including but not limited to televisions, set-top boxes, home theater systems, digital media players and/or consoles, refrigerators, ovens (e.g., microwave ovens, convection ovens, warmers), dishwashers, toasters, coffee pots, ventilation fans, ceiling fans, vacuum cleaners, water heaters, wireless speakers (e.g., "smart speakers"), automobiles, power tools or any other component that may be outfitted with one or more computer processors and/or other components. The intermediary devices of the present disclosure may also be configured to control or communicate with any communication systems including but not limited to telephones such as land-line telephones, wireless telephones, cellular telephones, voice over Internet Protocol (or "VoIP") telephones, as well as any computer-related communications systems such as hubs, routers or switches.

The intermediary devices of the present disclosure may be outfitted with one or more transceivers (e.g., transmitters and/or receivers) for communicating according to any number of protocols, e.g., over any communications network and in accordance with any protocol, including but not limited to Wi-Fi or any radio frequency waves or signals, at any frequencies or power levels, such as RFID signals, NFC signals, Bluetooth® signals, or any other type of wired or wireless signals. Furthermore, the intermediary devices of the present disclosure may be mounted to and/or associated with a secure facility of any kind. As used herein, the term "secure facility" shall refer to any building, region, structure or other space (e.g., covered or uncovered) to which the automated control of access may be desired, or from within which secure communications may be desired. For example, in accordance with the present disclosure, a secure facility may be a home of any type, kind, shape or form, including but not limited to a house, an apartment, a condominium, a dormitory, a barracks, or any other defined or undefined structure having one or more living spaces. A secure facility may also be a business-related structure such as a building, an office, a shopping center, a restaurant, a post office, a grocery store, a department store, or any other defined or undefined structure having one or more commercial areas. A secure facility may also be any other type of facility including but not limited to stadiums, ballfields, transportation centers or financial institutions (e.g., banks). In some embodiments, the secure facility may be or include an island or space station.

As used herein, the term "owner" may refer to any individual or entity having title or one or more rights of occupation, possession or ownership over a given secure facility, and need not require that the individual or the entity own all or any portion of the secure facility. For example, the term "owner" may include an individual or an entity that owns a secure facility, subject to any number of restrictions, as well as a person or an entity that leases, rents or temporarily occupies a secure facility (e.g., a tenant or resident). The term "owner" may also include any individual or entity (e.g., an employee or contractor) designated by an individual or entity that owns, leases, rents or occupies a secure facility.

Figure 2:
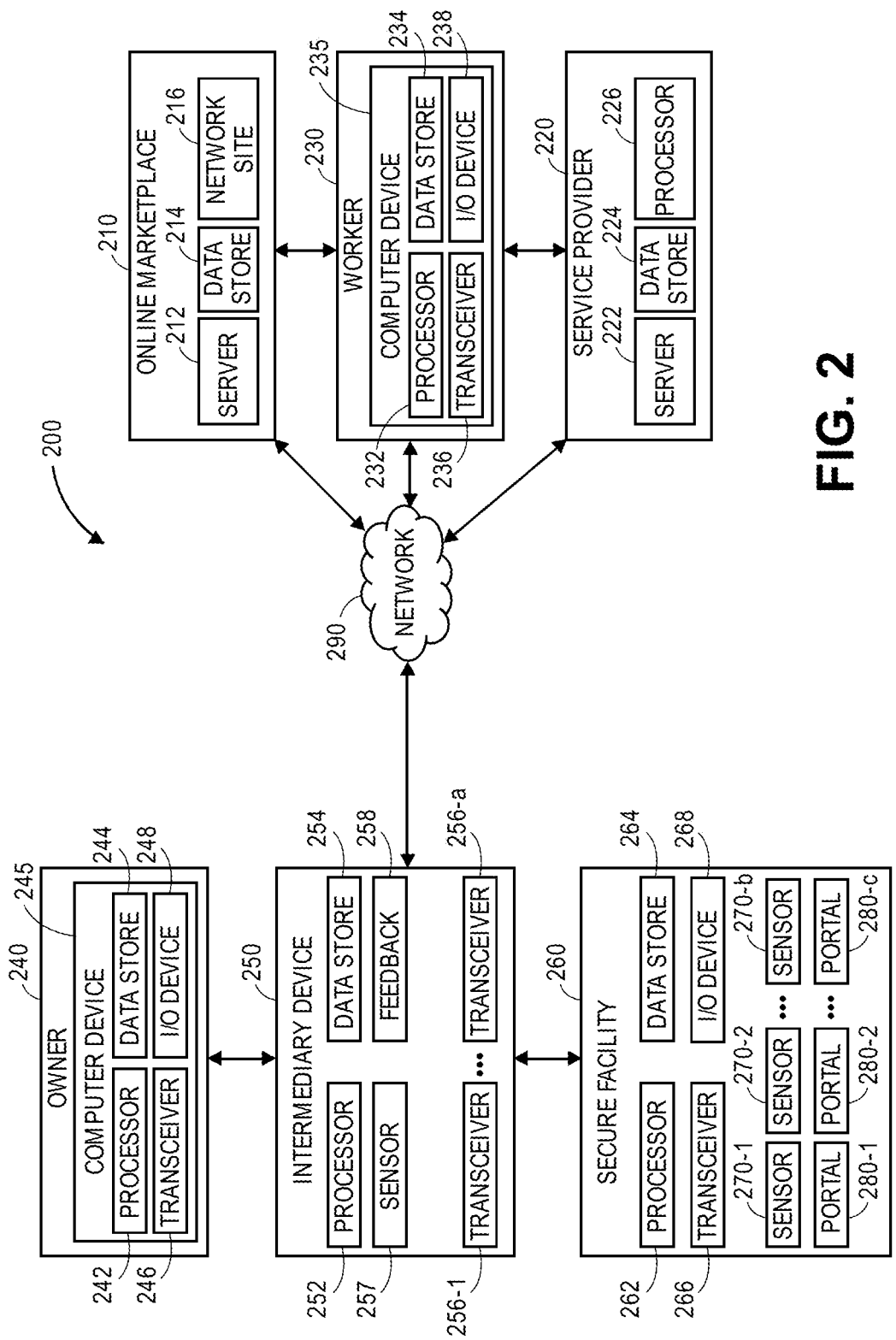
FIG. 2 is a block diagram of one system including an intermediary device in accordance with embodiments of the present disclosure.

Referring to FIG. 2, a block diagram of components of one system 200 including an intermediary device 250 in accordance with embodiments of the present disclosure. The system 200 includes an online marketplace 210, a service provider 220, a worker 230, an owner 240, the intermediary device 250 and a secure facility 260 that are connected to one another across a network 290, which may include the Internet in whole or in part. Except where otherwise noted, reference numerals preceded by the number "2" in FIG. 2 refer to elements that are similar to elements having reference numerals preceded by the number "1" shown in FIGS. 1A through 1I.

The marketplace 210 may be any entity or individual that wishes to make items from a variety of sources (e.g., manufacturers, merchants, sellers or vendors) available for download, purchase, rent, lease or borrowing by customers using a networked computer infrastructure, including one or more physical computer servers 212 and data stores 214 (e.g., databases) for hosting a network site 216. The network site 216 may be implemented using the one or more servers 212, which connect or otherwise communicate with the one or more data stores 214 as well as with one or more external computer devices over the network 290, through the sending and receiving of digital data. Moreover, the data store 214 may include any type of information regarding items that have been made available for sale through the marketplace 210, or ordered by customers, such as the owner 240, from the marketplace 210, or any information or data regarding the delivery of such items to such customers, e.g., by the worker 230 or any other individuals or machines, including but not limited to manned or unmanned carriers such as cars, trucks, trailers, freight cars, container ships or cargo aircraft (e.g., manned aircraft or unmanned aircraft, such as drones).

The server 212 may operate one or more order processing and/or communication systems and/or software applications having one or more user interfaces, or communicate with one or more other computing devices or machines that may be connected to the network 290, for any other purpose. For example, the server 212 may operate or provide access to one or more reporting systems for receiving or displaying information or data regarding orders for items received by the marketplace 210, or deliveries made to customers in response to such orders. The server 212 may be a general-purpose device or machine, or a dedicated device or machine that features any form of input and/or output peripherals such as scanners, readers, keyboards, keypads, touchscreens or like devices, and may further operate or provide access to one or more engines for analyzing the information or data regarding the orders, or interactions received from the one or more operators, users, workers or persons.

The marketplace 210 may be physically or virtually associated with one or more storage or distribution facilities, such as a fulfillment center, a warehouse, a bricks-and-mortar retail establishment, or any other like facilities. Such facilities may be adapted to receive, store, process and/or distribute items, and may include any number of stations for receiving, storing and distributing items to customers, including but not limited to one or more receiving stations, storage areas and/or distribution stations. Additionally, such facilities may further include any number of associated servers, data stores, processors or like computer components, any of which may connect or otherwise communicate over the network 290 through the sending and receiving of digital data, or in any other manner.

The service provider 220 may be any entity or individual that is engaged in the provision of services, either at no cost or for a fee, to or on behalf of one or more entities or individuals, including but not limited to any entities or individuals associated with facilities such as the secure facility 260. For example, the service provider 220 may be associated with any type of service, including but not limited to architectural services, food preparation services, construction or repair services, professional services, or any other type of services. In some embodiments, the service provider 220 may be a manufacturer, a merchant, a seller and/or a vendor of one or more items that may be made available for download, purchase, rent, lease or borrowing by way of the marketplace 210. In some embodiments, the service provider 220 may be the worker 230. The service provider 220 may also feature a networked computer infrastructure, including one or more physical computer servers 222 and data stores 224 (e.g., databases) and/or processors 226. The service provider 220 may be configured to communicate with one or more external computer devices over the network 290, through the sending and receiving of digital data.

The worker 230 (or operator, or user, or other person or machine, such as an autonomous mobile robot) may be any individual or entity associated with one or more of the marketplace 210 and/or the service provider 220. For example, the worker 230 may be a picker, a sorter or a deliveryman associated with storing, retrieving or delivering items from a facility associated with the marketplace 210 to the owner 240 or to the secure facility 260. Alternatively, the worker 230 may be a laborer associated with the service provider 220, or an autonomous mobile robot associated with the service provider 220, and may perform any general tasks, or may be particularly trained to perform one or more specific tasks. In some embodiments, the worker 230 may be the service provider 220. The worker 230 may utilize one or more computing devices 235 (e.g., a smartphone, a tablet computer, a laptop computer, a desktop computer, or computing devices provided in wristwatches, televisions, set-top boxes, automobiles or any other appliances or machines), or any other like machine. As is shown in FIG. 2, the computer device 235 may include one or more processors 232, data stores (e.g., databases) 234, transceivers 236 (e.g., transmitters and/or receivers) and input/output devices 238 (e.g., keyboards, keypads, mice, styluses, touchscreens, RFID readers, or other devices).

The owner 240 may be any individual or entity having a permanent or temporary right of occupation, possession or ownership of all or any portion of the secure facility 260, including but not limited to a resident, a tenant, an employee, a contractor of the owner 240 or the secure facility 260, or an individual designated by an owner, a resident, a tenant, an employee or a contractor of the owner 240 or the secure facility 260. The owner 240 may utilize one or more computing devices 245 (e.g., a smartphone, a tablet computer, a laptop computer, a desktop computer, or computing devices provided in wristwatches, televisions, set-top boxes, automobiles or any other appliances or machines), or any other like machine. As is shown in FIG. 2, the computer device 245 may include one or more processors 242, data stores (e.g., databases) 244, transceivers 246 (e.g., transmitters and/or receivers) and input/output devices 248 (e.g., keyboards, keypads, mice, styluses, touchscreens, RFID readers, or other devices).

The intermediary device 250 includes one or more processors 252, data stores 254, transceivers 256-1, 256-2 . . . 256-*a*, sensors 257 and/or feedback devices 258. The transceivers 256-1, 256-2 . . . 256-*a* may be configured to receive or transmit information or data to or from the marketplace 210, the service provider 220, the worker 230, the owner 240 and/or the secure facility 260, or any other computing device over the network 290. For example, the transceivers 256-1, 256-2 . . . 256-*a* may be configured to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceivers 256-1, 256-2 . . . 256-*a* may further include or be in communication with one or more input/output (or "I/O") interfaces, network interfaces and/or input/output devices, and may be configured to allow information or data to be exchanged between one or more of the intermediary device 250 or to one or more other computer devices or systems via the network 290.

The transceivers 256-1, 256-2 . . . 256-*a* may perform any necessary protocol, timing or other data transformations in order to convert data signals from a first format suitable for use by one component into a second format suitable for use by another component. For example, in some embodiments, the transceivers 256-1, 256-2 . . . 256-*a* may be configured to communicate according to one or more protocols traditionally associated with discrete components, e.g., within specific frequency spectra, including but not limited to radio frequency signals typically within ranges of approximately three hundred to four hundred megahertz, or MHz, that are ordinarily associated with garage doors and/or garage door openers, as well as radio frequency signals typically within ranges of approximately three hundred to five hundred megahertz, or MHz, that are ordinarily associated with doorbells, a high frequency or RFID signal typically within a range of approximately 13.56 megahertz, or MHz, or Bluetooth® signal may be transmitted at greater distances (e.g., at a frequency of approximately 2.4 gigahertz, or GHz). Alternatively, the transceivers 256-1, 256-2 . . . 256-*a* may be configured to communicate within customized frequency spectra, or at dynamic frequencies, in accordance with the present disclosure.

In some embodiments, the transceivers 256-1, 256-2 . . . 256-*a* may include support for devices attached through various types of peripheral buses, e.g., variants of the Peripheral Component Interconnect (PCI) bus standard or the Universal Serial Bus (USB) standard. In some other embodiments, functions of the transceivers 256-1, 256-2 . . . 256-*a* may be split into two or more separate components, or incorporated directly into the processors 252.

Additionally, the intermediary device 250 may further include any type of power source for providing electrical power or other forms of power in support of one or more electrical loads. Such power sources may include, for example, one or more batteries or other power cells, e.g., dry cell or wet cell batteries such as lead-acid batteries, lithium ion batteries, nickel cadmium batteries or nickel metal hydride batteries, or any other type, size or form of batteries, and may each have any cell voltages, peak load currents, charge times, specific energies, internal resistances or cycle lives, or other power ratings. The intermediary device 250 may also include any type, size or form of other power source, e.g., other than a battery, including but not limited to one or more fuel cells or solar cells.

The intermediary device 250 may be any computer-related machine that is configured to control the operation of one or more aspects of the secure facility 260 on behalf of the owner 240. For example, the intermediary device 250 may be configured to control the capture of information or data within the secure facility 260 by one or more sensors 270-1, 270-2 . . . 270-*b*, or to grant or restrict access to the secure facility 260 by operating (e.g., locking, unlocking, opening, closing) one or more of the portals 280-1, 280-2 . . . 280-*c*. Alternatively, the intermediary device 250 may be configured to activate any other systems that may be associated with the secure facility 260 (e.g., lighting and/or environmental systems). In this regard, the intermediary device 250 may receive information, data and/or instructions from the owner 240, e.g., by way of the computer device 245, in the form of a direct inter-device connection or over the network 290. Such information, data and/or instructions may identify one or more individuals or entities (e.g., the service provider 220 and/or the worker 230) that are permitted to access the secure facility 260, as well as dates or times at which access to the secure facility 260 is authorized, and the services that are to be performed by such individuals or entities as such dates and times. The information, data and/or instructions may further identify any conditions that must be met prior to the performance of such services, including determining whether one or more of the portals 280-1, 280-2 . . . 280-*c* must be unlocked or opened, or locked or closed, in order to grant access to locations at the secure facility 260 where such services are to be performed, or to restrict access to other locations at the secure facility 260, as well as determining whether any temperature, lighting or humidity levels that must optimally be established within the secure facility 260, and establishing such conditions, prior to the performance of such services therein.

The sensors 257 may be any operational and/or environmental sensors having any components or features for determining one or more attributes of the intermediary device 250 and/or the secure facility 260, including extrinsic information or data or intrinsic information or data. Such sensors 257 may be installed in the same common unit as the one or more processors 252, data stores 254, transceivers 256-1, 256-2 . . . 256-*a* and/or feedback devices 258, or in one or more units provided in association with (and in communication with) such components, subject to functional or spacing limitations or constraints.

In some embodiments, the sensors 257 may include one or more thermometers, barometers, hygrometers, anemometers, current sensors, voltage sensors, resistance sensors or any other type or form of sensor. In some other embodiments, the sensors 257 may include one or more air monitoring sensors (e.g., oxygen, ozone, hydrogen, carbon monoxide or carbon dioxide sensors), acoustic sensors (e.g., microphones, piezoelectric sensors, vibration sensors), infrared sensors, ozone monitors, pH sensors, magnetic anomaly detectors, metal detectors, radiation sensors (e.g., Geiger counters, neutron detectors, alpha detectors) or the like, as well as one or more imaging devices (e.g., digital cameras). In some embodiments, information or data captured by one or more of the sensors 257 may be used to authenticate one or more individuals or entities at the secure facility 260, including but not limited to the owner 240, the worker 230, or any other individual or entity.

For example, where one or more of the sensors 257 includes a digital camera, imaging data (e.g., still or moving images, as well as associated audio data or metadata) captured using the sensors 257 may be processed according to any number of recognition techniques. In some embodiments, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

In some embodiments, one or more of the sensors 257 may be used to capture information or data regarding an environment in which the intermediary device 250 is provided, and such information or data may be used to control (or as a basis for controlling) the operation of one or more aspects of the secure facility 260. For example, the one or more sensors 257 may determine that a visitor (e.g., a human and/or a machine) has arrived at and/or approached the secure facility 260, and may capture information or data (e.g., imaging data, acoustic data or any other type or form of information or data) regarding the visitor in order to determine the intent of the visitor, or whether the presence of the visitor is authorized. The one or more sensors 257 may further monitor the actions or activities of the visitor within or around the secure facility 260. Additionally, information or data captured by one or more of the sensors 257 may be captured and stored in one or more data stores, e.g., the data store 254 of the intermediary device 250, or any other data stores (such as the data store 244 of the computer device 245 or the data store 265 of the secure facility 260, and in one or more alternate or virtual locations, e.g., in a "cloud"-based environment.

The intermediary device 250 may further include one or more feedback devices 258. The feedback devices 258 may be any component configured for returning feedback to the owner 240, to the worker 230, or to any other individuals or entities in or around the secure facility 260. Such feedback devices 258 may be installed in the same common unit as the one or more processors 252, data stores 254, transceivers 256-1, 256-2 . . . 256-a and/or feedback devices 258, or in one or more units provided in association with (and in communication with) such components, subject to functional or spacing limitations or constraints.

In some embodiments, the feedback devices 258 may include one or more individually addressable lighting elements (e.g., LED lights) that may be automatically controlled or configured to emit light in any frequency, intensity or hue. In some other embodiments, the feedback devices 258 may include one or more audio speakers or other physical components that may be automatically controlled or configured to transmit audible messages, signals or sounds. In some other embodiments, the feedback devices 258 may include one or more haptic vibrating elements, e.g., any physical component that may be automatically controlled or configured to generate tactile vibrations of any frequency or intensity.

The secure facility 260 may be any building, region, structure or other space (e.g., covered or uncovered) to which the automated control of access may be desired, or from within which secure communications may be desired. For example, as is discussed above, the secure facility 260 may be a home or a business-related structure of any type, kind, shape or form, or any other type of facility. The secure facility 260 may further include a networked computer infrastructure, including one or more processors 262, data stores (e.g., databases) 264, transceivers 266 (e.g., transmitters and/or receivers) and input/output devices 268 (e.g., keyboards, keypads, mice, styluses, touchscreens, RFID readers, or other devices). The secure facility 260 further includes the sensors 270-1, 270-2 . . . 270-b and the portals 280-1, 280-2 . . . 280-c. The sensors 270-1, 270-2 . . . 270-b may take the form of one or more of the sensors 257 described above, and, like such sensors 257, may be any operational and/or environmental sensors having any components or features for determining one or more attributes of the intermediary device 250 and/or the secure facility 260, including extrinsic information or data or intrinsic information or data.

In some embodiments, the input/output devices 268 may be configured to receive and provide information to the owner 240, the worker 230, or any other individuals or entities at the secure facility 260, and may include, but are not limited to, a display, (e.g., a touch-screen display), a scanner, a keypad, a biometric scanner, an audio transducer, one or more speakers, one or more imaging devices such as a video camera, and any other types of input or output devices that may support interaction between the intermediary device 250, the secure facility 260 and/or the owner 240 or the worker 230. For example, in one embodiment, the input/output devices 268 may include a relatively small touchscreen display and/or a keypad for receiving inputs. In various embodiments, the input/output devices 268 may have capabilities for directly receiving such signals from the owner 240, the worker 230 or the intermediary device 250 that provides a signal or an instruction to operate one or more of the portals 280-1, 280-2 . . . 280-c.

The portals 280-1, 280-2 . . . 280-c may include one or more doors or other access points (e.g., standard doors equipped with keyless access systems, as well as garage doors, pet doors or other access doors), wireless doorbells, or any other systems (e.g., feedback devices of any kind), as well as any electrometrical components for automatically operating such doors or other access points. Such portals 280-1, 280-2 . . . 280-c may be used to grant or deny access to the secure facility 260, e.g., an external door, or to grant or deny access to one or more specific spaces within the secure facility 260, e.g., an internal door, such as one or more of the rooms 165-1, 165-2, 165-3, 165-4, 165-5, 165-6 of the home 160 shown in FIG. 1B. The portals 280-1, 280-2 . . . 280-c may further include one or more windows, blinds, shades, drapes, louvers or other coverings, or any other systems associated with other openings to the secure facility 260.

Such portals 280-1, 280-2 . . . 280-c may operate under the control of the processors 262 and/or the intermediary device 250 or, alternatively, the computer device 245 of the owner 240. For example, each of the portals 280-1, 280-2 . . . 280-c may be in communication with the one or more processors 262 and/or the intermediary device 250, e.g., Bluetooth® or Wi-Fi, and may transmit or receive one or more signals or instructions associated with their respective operations. Alternatively, each of the portals 280-1, 280-2 . . . 280-c may be operated based at least in part on manual or automatic inputs provided by the owner 240 or another authorized individual at the secure facility 260, e.g., by way of the input/output devices 268. In some embodiments, one or more of the portals 280-1, 280-2 . . . 280-c may include an electromechanical operating and/or locking mechanism which is designed to automatically open or close a portal, or to lock or unlock the portal, in response to signals or instructions from an authorized device (e.g., the intermediary device 250) using a wired or wireless protocol. Such instructions may include a password or another authenticator (e.g., a cryptographic key). Additionally, the portals 280-1, 280-2 . . . 280-c may be associated with the one or more sensors 270-1, 270-2 . . . 270-b, or may include one or more sensors, and may be configured to capture information or data regarding successful or unsuccessful attempts at operation thereof, or any other events occurring at the secure facility 260.

Any combination of networks or communications protocols may be utilized in accordance with the systems and methods of the present disclosure. For example, the computer device 245, the secure facility processors 262 and/or the intermediary device 250 may be configured to communicate with one another or with the marketplace server 212, the service provider server 222 and/or the worker computer 235 via the network 290, such as is shown in FIG. 2, e.g., via an open or standard protocol such as Wi-Fi. Alternatively, the computer device 245, the secure facility processors 262 and/or the intermediary device 250 may be configured to communicate with one another directly outside of a centralized network, such as the network 290, e.g., by a wireless protocol such as Bluetooth, in which the intermediary device 250 and one or more other components (e.g., one or more sensors 270-1, 270-2 . . . 270-b or the portals 280-1, 280-2 . . . 280-c) may be paired with one another.

The computers, servers, devices and the like described herein have the necessary electronics, software, memory, storage, databases, firmware, logic/state machines, microprocessors, communication links, displays or other visual or audio user interfaces, printing devices, and any other input/output devices to provide any of the functions or services described herein and/or achieve the results described herein. Also, those of ordinary skill in the pertinent arts will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "service provider" a "worker," an "owner," an "intermediary device," a "secure facility," or like terms, may be automated steps performed by their respective computer systems, or implemented within software modules (or computer programs) executed by one or more general purpose computers. Moreover, process steps described as being performed by a "marketplace," a "service provider" a "worker," an "owner," an "intermediary device" or a "secure facility" may be typically performed by a human operator, but could, alternatively, be performed by an automated agent.

The marketplace 210, the service provider 220, the worker 230, the owner 240, the intermediary device 250 and/or the secure facility 260 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages, social network messages, online marketplace messages, telephone calls or the like. For example, the server 212, the server 222, the computer device 235, the computer device 245, the processor 252 and/or the processor 262 may be adapted to transmit information or data in the form of synchronous or asynchronous messages between or among themselves, or between or among any other computer device in real time or in near-real time, or in one or more offline processes, via the network 290. Those of ordinary skill in the pertinent arts would recognize that the marketplace 210, the service provider 220, the worker 230, the owner 240, the intermediary device 250 or the secure facility 260 may operate any of a number of computing devices that are capable of communicating over the network, including but not limited to set-top boxes, personal digital assistants, digital media players, web pads, laptop computers, desktop computers, laptop computers, tablet computers, smartphones, smart speakers, wrist watches, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 212, 222, the computer devices 235, 245, the intermediary device 250 and/or the processors 252, the secure facility 260 and/or the processors 262, or any other computers or control systems utilized by the marketplace 210, the service provider 220, the worker 230, the owner 240, the intermediary device 250 and/or the secure facility 260, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
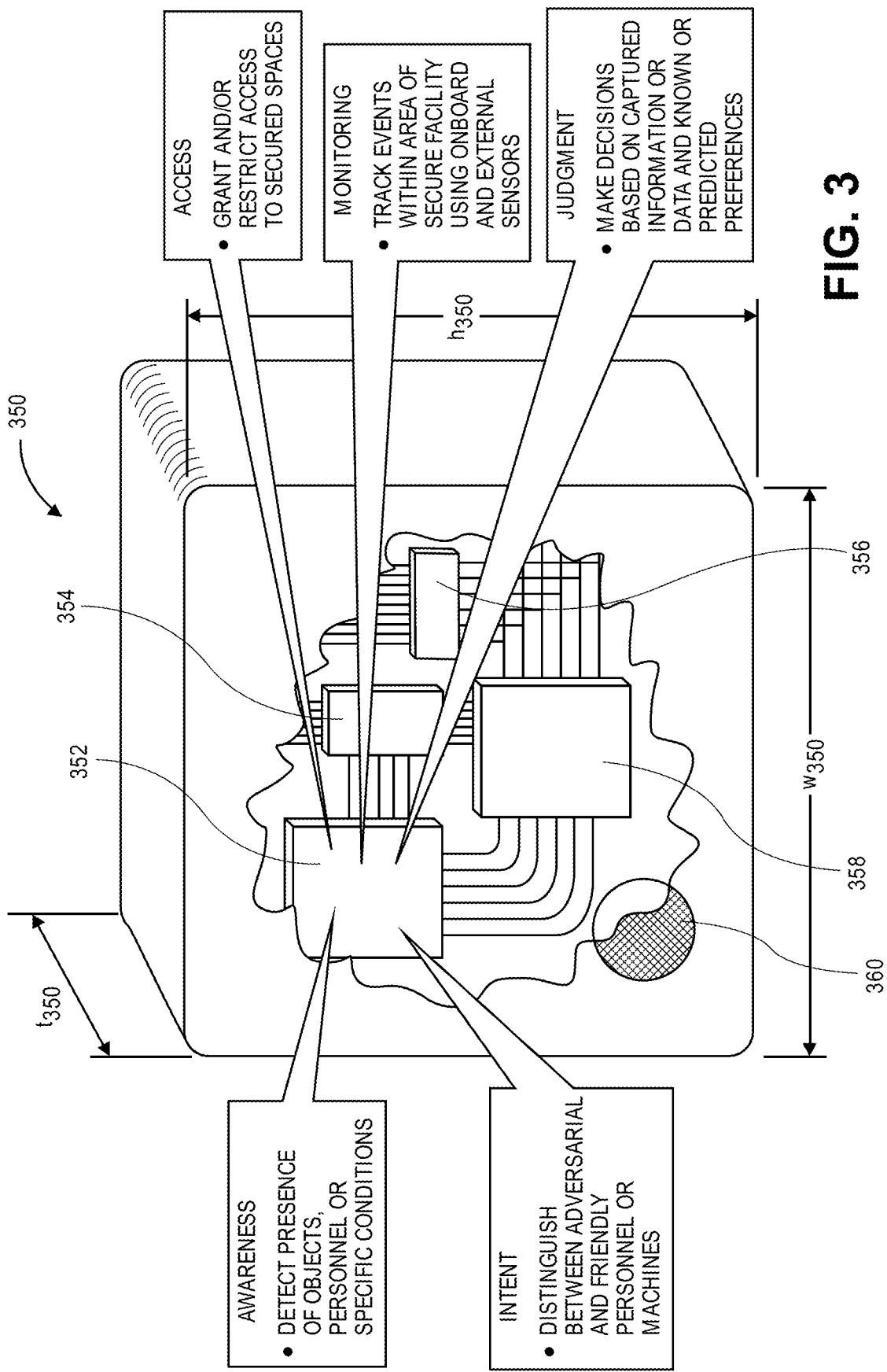
FIG. 3 is a view of aspects of one intermediary device in accordance with embodiments of the present disclosure.

As is discussed above, in some embodiments, the intermediary devices of the present disclosure may be mounted, installed or otherwise provided in association with secure facilities, and may include one or more components for engaging in communication with other devices or controlling the operations of one or more aspects of such secure facilities, including but not limited to the granting or the denial of access to such secure facilities on behalf of their respective owners, or the facilitating of secure communications between visitors to the secure facilities and their respective owners. Referring to FIG. 3, a view of aspects of one intermediary device 350 in accordance with embodiments of the present disclosure is shown. Except where otherwise noted, reference numerals preceded by the number "3" shown in FIG. 3 indicate components or features that are similar to components or features having reference numerals preceded by the number "2" shown in FIG. 2 or by the number "1" shown in FIGS. 1A through 1I.

As is shown in FIG. 3, the intermediary device 350 is a substantially square-shaped rectangular solid object defining a cavity having a plurality of components and/or circuitry disposed therein, including one or more processors 352, memory components 354, transceivers 356 and power sources 358, which may be provided in discrete components or circuits, or joined together as one or more independent components or circuits. Such components may be multipurpose in nature, or may be dedicated to performing one or more discrete functions. For example, the intermediary device 350 may be equipped with two or more processors 352, two or more memory components 354, two or more transceivers 356 and two or more power sources 358, each of which may be fixedly or releasably installed within a cavity defined by the intermediary device 350. Moreover, such components may be formed in a single-piece construction or from multiple pieces, and the intermediary device 350 may be closed or sealed with such components therein using one or more fasteners, hinges, clips or like fasteners.

As is discussed above, the computer-based components of the intermediary devices of the present disclosure, including but not limited to the processors 352, the memory components 354, the transceivers 356 and/or the power sources 358 of the intermediary device 350 of FIG. 3, may be configured to execute one or more functions or perform one or more roles on behalf of an owner of a secure facility. For example, as is shown in FIG. 3, the intermediary device 350 may be configured to demonstrate awareness on behalf of the owner, and to detect the presence of objects, personnel or one or more specific conditions at the secure facility. The intermediary device 350 may be further configured to determine the intent of one or more visitors to the secure facility, e.g., by distinguishing between adversarial and friendly personnel or machines, such as by authenticating any human or machine visitors by facial recognition, voice recognition, fingerprint or touch recognition, or any other authentication means (e.g., a cryptographic key or password). The intermediary device 350 may be further configured to control access to the secure facility, e.g., by granting and/or restricting access to secured spaces at the secure facility to authorized visitors. The intermediary device 350 may be further configured to perform one or more monitoring functions in or around the secure facility, and to track events occurring within a vicinity of the secure facility using one or more onboard or external sensors. The intermediary device 350 may also be configured to exercise judgment on behalf of an owner of the secure facility, such as by making decisions based on captured information or data and one or more known or predicted preferences of the owner.

As is shown in FIG. 3, the intermediary device 350 is a substantially square-shaped rectangular solid object having a height $h_{350}$, a width $w_{350}$ and a thickness $t_{350}$. In some embodiments, the intermediary device 350 may be formed from one or more plastics of any density or rigidity, including but not limited to thermoplastics or thermosetting plastics such as epoxy or phenolic resins, polyurethanes or polyesters, as well as polyethylenes, polypropylenes or polyvinyl chlorides, or acrylonitrile butadiene styrenes. In some embodiments, the intermediary device 350 may be permanently or temporarily closed with the processors 352, memory components 354, transceivers 356 and power sources 358 therein, such as by one or more lips, rims (e.g., a snap-fit construction), glues, sealants, bands, adhesive layers or other materials.

As is also discussed above, the intermediary device 350 may take any shape and have dimensions of any size. For example, in some embodiments, the intermediary device 350 may be square and/or rectangular in shape, such as is shown in FIG. 3, and sufficiently small. In some other embodiments, the intermediary device 350 may have a width $w_{350}$ and/or a thickness $t_{350}$ of approximately four to six inches (4-6 in.), and a thickness $t_{350}$ of approximately one inch (1 in.), or about two to three centimeters (2 cm to 3 cm). In some other embodiments, the intermediary devices may take any other shape, e.g., substantially round, trapezoidal, pyramidal, or of any other shape, with straight corners and/or rounded sides or edges, and with any thickness. The intermediary devices may have edges of any length, with faces of any shapes, size or surface area, and may occupy any volume. Dimensions, shapes, thicknesses and/or volumes of such devices may be selected on any basis or criterion, including but not limited to the dimensions, shapes, thicknesses and/or volumes of one or more internal components to be housed therein.

In some embodiments, an intermediary device may include one or more holes, bores or other openings, or other structural features, which may aid in binding the intermediary device to a substantially immovable fixture, e.g., by one or more bolts, screws, rivets, nails or other like fasteners. In some other embodiments, intermediary devices may be joined to such structures or fixtures using belts, straps, bands, clamps, clips or any other tension or compression members. In other embodiments, intermediary devices may be mounted to ground features, e.g., by stakes, nails, posts or other components. Moreover, although some of the figures depict the mounting of intermediary devices in a substantially vertical or lengthwise orientation, and by a face having a comparatively large surface area, such as is shown in FIG. 1A, the intermediary devices of the present disclosure are not so limited, and may be mounted to or in association with secure facilities in any orientation. For example, the intermediary devices may be mounted in a substantially horizontal orientation, or in any other orientation, by any face, and to any surface. Furthermore, the intermediary devices of the present disclosure may be mounted on external walls or other surfaces of a secure facility, e.g., in locations where the intermediary device may remain in a communications range of one or more components or systems that may be located inside of the secure facility, such as is shown in FIG. 1A, or on one or more internal walls or other surfaces of a secure facility, e.g., in locations where the intermediary device may remain in a communications range of one or more components or systems that may be located outside of the secure facility.

Figure 4:
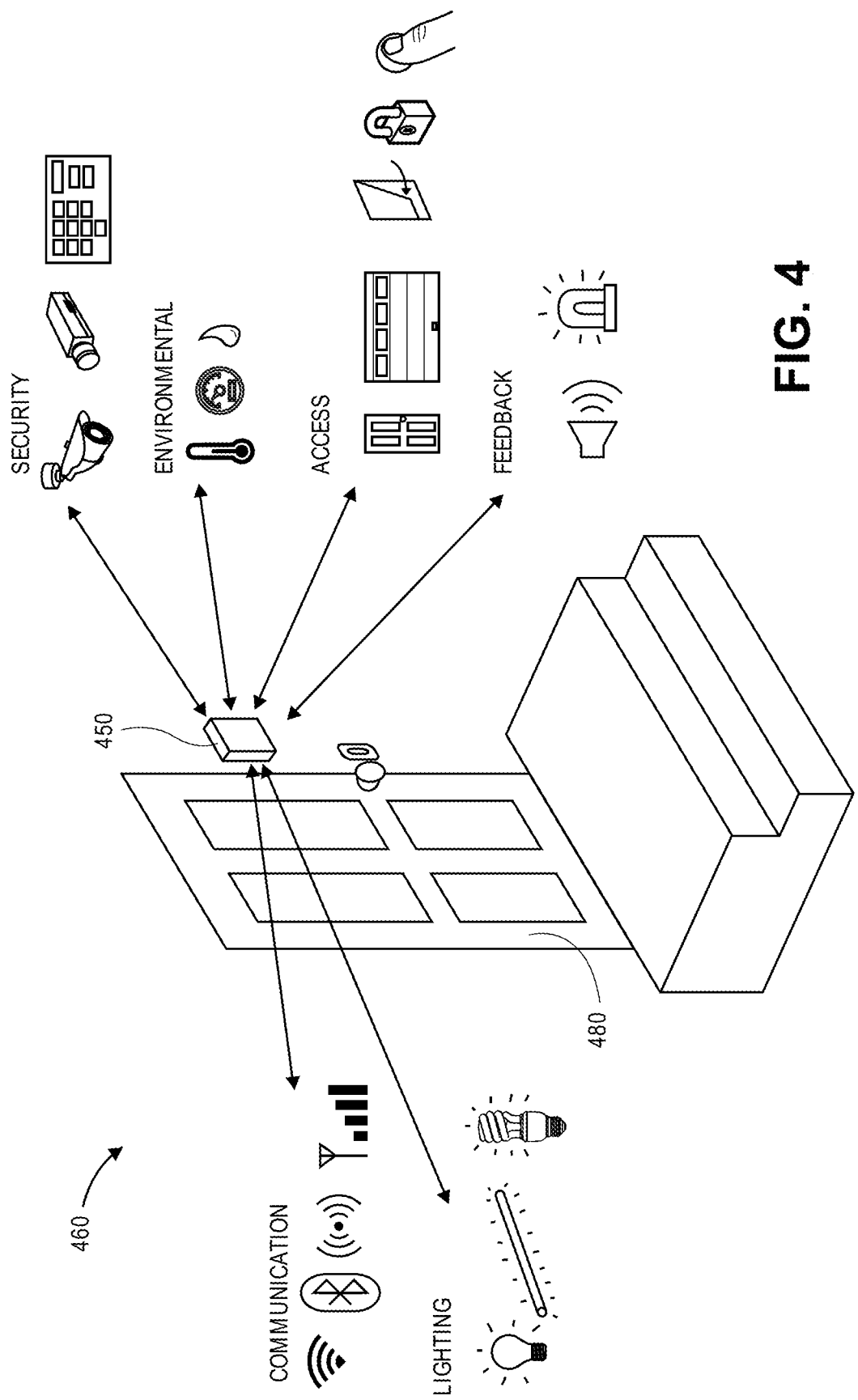
FIG. 4 is a view of aspects of one intermediary device in accordance with embodiments of the present disclosure.

Moreover, as is discussed above, the various components of the intermediary devices may be configured to communicate with any internal or external systems operating or associated with a secure facility with which the intermediary devices are associated. Referring to FIG. 4, a view of aspects of one intermediary device 450 in accordance with embodiments of the present disclosure is shown. Except where otherwise noted, reference numerals preceded by the number "4" shown in FIG. 4 indicate components or features that are similar to components or features having reference numerals preceded by the number "3" shown in FIG. 3, by the number "2" shown in FIG. 2 or by the number "1" shown in FIGS. 1A through 1I.

As is shown in FIG. 4, the intermediary device 450 may establish one or more functional or operational relationships with any number or type of systems within or around a secure facility (e.g., a home 460). For example, the intermediary device 450 may communicate with and/or control the operation of one or more components of a security system, including but not limited to imaging devices (e.g., digital cameras), sensors (e.g., motion sensors, heat sensors, weight sensors or the like) or input/output devices (e.g., keyboards, keypads, mice, styluses, touchscreens, RFID readers, fingerprint recognition and/or touch recognition systems, or other devices) associated with the activation, deactivation or control of the security system. Such components may be located within the home 460 or outside of the home 460, or in any other physical or virtual location. The intermediary device 450 may further communicate with and/or control the operation of one or more environmental systems or controls, including but not limited to thermometers or thermostats, pressure sensors, hygrometers, valves, tanks, meters or the like. Such components may also be located within the home 460 or outside of the home 460, or in any other physical or virtual location.

The intermediary device 450 may further communicate with and/or control the operation of one or more access control systems, which may be associated with one or more doors or other portals (e.g., doors, ports, or entryways such as standard doors, garage doors, pet doors, or the like) as well as any remotely activated locking systems for such doors or other portals. The intermediary device 450 may also communicate with and/or control the operation of any number of feedback devices or mechanisms including but not limited to audio speakers, video monitors, lighting systems and/or alarms, haptic feedback systems or any other system for providing feedback to individuals or entities within or outside of the home 460. The intermediary device 450 may communicate with and/or control one or more communication systems within or outside of the home 460, including but not limited to one or more hubs, routers (e.g., wired or wireless routers) or switches, as well as any other computers or computer-enabled systems within the home 460, including but not limited to appliances, telephonic systems or the like. Moreover, the intermediary device 450 may be further configured to communicate according to any communications protocol. For example, the intermediary device 450 may include one or more transceivers (e.g., transmitters and/or receivers) for transmitting and/or receiving information or data via Wi-Fi or any other radio frequency (or "RF") waves or signals, and at any frequencies or power levels, with any type of system, device or component. The intermediary device 450 may further include one or more transceivers for transmitting and/or receiving RFID signals, NFC signals, Bluetooth® signals, or any other type of wireless signals, also at any frequencies or power levels, with any type of system, device or component.

The intermediary device 450 may also be configured to communicate with and/or control any lighting systems within or outside of the home 460, including not only one or more lighting systems associated with a security system (e.g., flashes and/or other illuminators) but also any other lighting systems associated with the home 460. For example, the intermediary device 450 may activate or deactivate any number of lighting systems including but not limited to one or more accent lights, ceiling lights, chandeliers, fans and/or lights, pendant lights, recessed lights, track lights, utility lights or wall lights of any kind and having one or more incandescent bulbs, compact and/or linear fluorescent bulbs, halogen lamps, metal halide lamps, light emitting diodes ("LED"), neon lamps, sodium lamps or any other type or form of lamp or bulbs.

Figure 5:
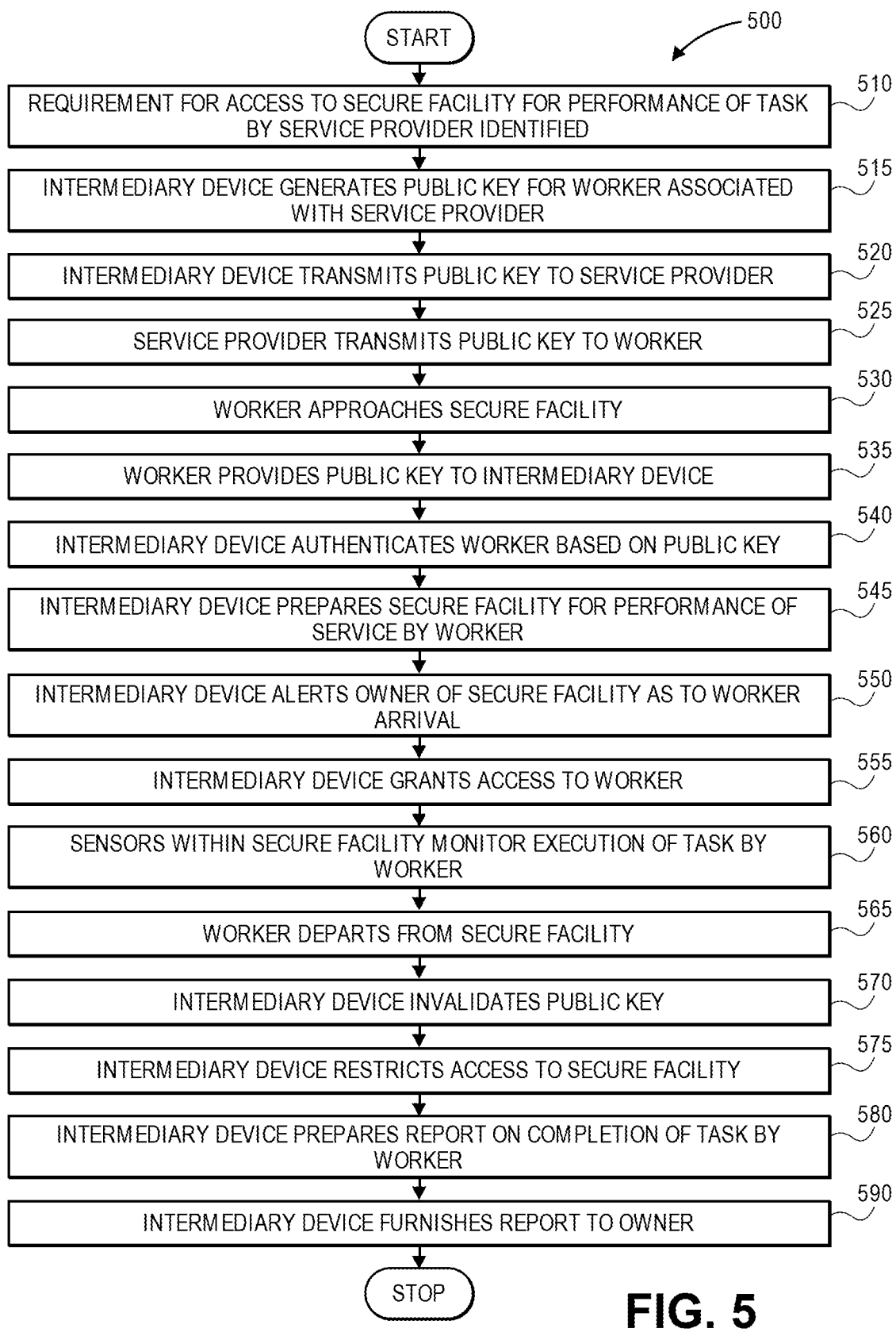
FIG. 5 is a flow chart of one process for using an intermediary device in accordance with embodiments of the present disclosure.

Referring to FIG. 5, a flow chart 500 of one process for using an intermediary device in accordance with embodiments of the present disclosure is shown. At box 510, a requirement for access to a secure facility for the performance of a task by a service provider is required. For example, an owner of the secure facility (e.g., a home, an office building, or any other structure or facility) may place an order for a delivery of an item to the secure facility (e.g., consumer products, supplies, food or any other transportable item) with a marketplace or other service provider online, by telephone, in person, or in any other manner. Alternatively, the owner may request that one or more services be performed at the secure facility (e.g., inside or outside of the secure facility) in any manner. Such services may include, but are not limited to, one or more construction, landscaping, maintenance, repair or other services. At box 515, the intermediary device generates a public key for a worker associated with the service provider, and at box 520, the intermediary device transmits the public key to the service provider. The public key may be a password or other authenticator that may be generated specifically for the performance of the task identified at box 510, and may be provided to the marketplace or service provider in any manner, e.g., electronically, over the Internet or one or more other networks, and according to any communications channel or protocol. The use of the public key may be subject to one or more conditions, as well. For example, the use of the public key may be restricted to the worker, or to one or more dates or times, or on any other basis. Alternatively, any other form of access restriction and/or cryptography, other than the use of public keys, may be utilized in accordance with the present disclosure.

At box 525, the service provider transmits the public key to the worker. The service provider may provide the public key to the worker in any manner or via any communications channel or protocol, including over the Internet or one or more other networks. Alternatively, the intermediary device may transmit the public key directly to the worker, rather than transmitting the public key to the service provider, and requiring the service provider to transmit the public key to the worker.

At box 530, the worker approaches the secure facility, and at box 535, the worker provides the public key to the intermediary device. For example, the worker may travel to the secure facility according to any mode of transportation, including but not limited to by one or more ground, sea or air vehicles or on foot, or by two or more modes of transportation. The worker may provide the public key to the intermediary device in a manual or automatic fashion, such as by manually entering the public key into an input/output device associated with the intermediary device or a computer device of the worker (e.g., a smartphone or tablet computer) or by transmitting the public key to the intermediary device in a wired or wireless fashion. For example, the public key may be automatically transmitted to the intermediary device by plugging the computer device of the worker into the intermediary device, e.g., by a USB or other cable or connector, or by placing the computer device of the worker within a proximity of the intermediary device, e.g., via Bluetooth®, NFC, RFID or another wireless protocol. At box 540, the intermediary device authenticates the worker based on the public key. For example, the intermediary device may confirm not only that the public key was generated thereby but also that the public key is the public key generated for the worker at box 515, or that one or more conditions associated with the use of the public key (e.g., a date or time of the intended use) have been met. Alternatively, or additionally, the worker may be authenticated in any other manner or by any other means. For example, where the intermediary device and/or the secure facility includes one or more acoustic sensors, imaging devices and/or other input/output devices, the worker may be authenticated based on voice recognition (e.g., after speaking a predetermined set of text that may include the public key), facial recognition, fingerprint or touch recognition (e.g., by contact with one or more surfaces by a thumb or other finger, or another body part), or by entering one or more sets of alphanumeric characters, gestures or other information or data via the input/output devices.

After the worker has been authenticated, at box 545, the intermediary device prepares the secure facility for the performance of one or more services associated with the task by the worker. The intermediary device may prepare the secure facility in any number of respects. For example, the intermediary device may determine a route between an entryway for the worker and a location within the secure facility where the services are desired, and may unlock and/or open any number of doors or other portals through which the worker must travel in order to reach the location while locking and/or closing doors or other portals through which the worker need not travel, or doors or other portals leading to spaces where the presence of the worker is neither desired nor required. Additionally, the intermediary device may further activate any number of lighting systems and/or security systems (e.g., digital cameras and/or microphones) while ensuring that safes or other protective compartments where valuables may be stored are closed and locked. The intermediary device may further heat or cool all or portions of the secure facility to a desired temperature, or take any other action that may be required in order to place the secure facility in a desired operational or environmental condition. Alternatively, or additionally, where establishing one or more desired conditions within a secure facility may require a substantial lead time, the intermediary device may take actions to establish the desired conditions in advance of the worker's arrival, e.g., prior to the authentication of the worker at box 540. At box 550, the intermediary device alerts the owner as to the arrival of the worker, e.g., by one or more electronic messages such as E-mail, SMS or MMS text messages, social network or instant messaging messages, by a telephone call, or by any other manner. At box 555, the intermediary device grants access to the worker, e.g., by unlocking and/or opening one or more outer doors, and instructing the worker to enter the secure facility accordingly.

At box 560, one or more sensors within the secure facility monitor the execution of the task by the worker. For example, where the task involves the delivery of an item to the secure facility, the intermediary device may instruct any number of imaging devices or acoustic sensors to capture imaging data and/or sounds within the secure facility during the delivery, and monitor the imaging data and/or sounds or store them in one or more data stores. Where the task involves the performance of electrical work, the intermediary device may instruct any number of current sensors, voltage sensors and/or circuit breakers within the secure facility to monitor or store current or voltage levels and/or switch positions in one or more data stores. Where the task involves the performance of plumbing work, the intermediary device may instruct any number of flow sensors, pressure sensors, level sensors (e.g., for detecting liquid spills or leaks), air monitoring sensors (e.g., for detecting gaseous or vapor spills or leaks) to monitor or store any information regarding flow conditions, pressure conditions and/or atmospheric or environmental conditions in one or more data stores. Any sensors that may be available on the intermediary device and/or within the secure facility may be manipulated as necessary in order to determine whether the task has been completed satisfactorily.

At box 565, the worker departs from the secure facility. The worker's departure may be determined in any manner, including but not limited to any of the sensors that sensed the approach of the worker at box 530. For example, the worker's departure may be determined based on information or data received from the worker (e.g., vocal commands or instructions spoken within a vicinity of the intermediary device or one or more acoustic sensors, or one or more electronic messages received from a computer device of the worker), as well as imaging data (e.g., indicating that the worker and/or any associated vehicles have departed from the secure facility), positions of doors and/or switches within the secure facility, or any other type or form of information or data.

At box 570, the intermediary device invalidates the public key that was generated at box 515, and at box 575, the intermediary device restricts access to the secure facility. For example, with the task having been completed by the worker, the public key is no longer necessary, and the one or more doors or other portals by which the worker was granted access may be closed and securely locked, e.g., by one or more signals or instructions from the intermediary device. At box 580, the intermediary device prepares a report on the completion of the task by the worker. The report may include any available information or data regarding the completion of the task, including but not limited to times of arrival or departure of the worker, whether conditions within the secure facility were restored to their original or desired conditions, whether the task was completed satisfactorily and/or whether any follow-up actions are required. The report may further identify any costs incurred by the owner during the performance of the task, and may include any and all information or data captured during the performance of the task, e.g., by one or more sensors, or links to any such information or data. At box 590, the intermediary device furnishes the report to the owner, e.g., via one or more electronic or print messages, and the process ends. Alternatively, the report may be furnished to any other recipient, and used for any relevant purpose. For example, the report may be provided to the service provider, e.g., for billing, invoicing, record-keeping or scheduling purposes. The report may also be provided to one or more governmental agencies, e.g., for updating zoning, tax or other land records, or for confirming that the performance of the task complied with one or more standards, ordinances, statutes, regulations or other requirements.

Referring to FIGS. 6A through 6E, views of aspects of one system 600 including an intermediary device 650 in accordance with embodiments of the present disclosure are shown. In particular, the system 600 is shown in FIGS. 6A through 6E during the performance of a task, e.g., a delivery of an item to a secure facility 660, subject to the monitoring and control of the intermediary device 650. Except where otherwise noted, reference numerals preceded by the number "6" shown in FIGS. 6A through 6E indicate components or features that are similar to components or features having reference numerals preceded by the number "4" shown in FIG. 4, by the number "3" shown in FIG. 3, by the number "2" shown in FIG. 2 or by the number "1" shown in FIGS. 1A through 1I.

Figure 6B:
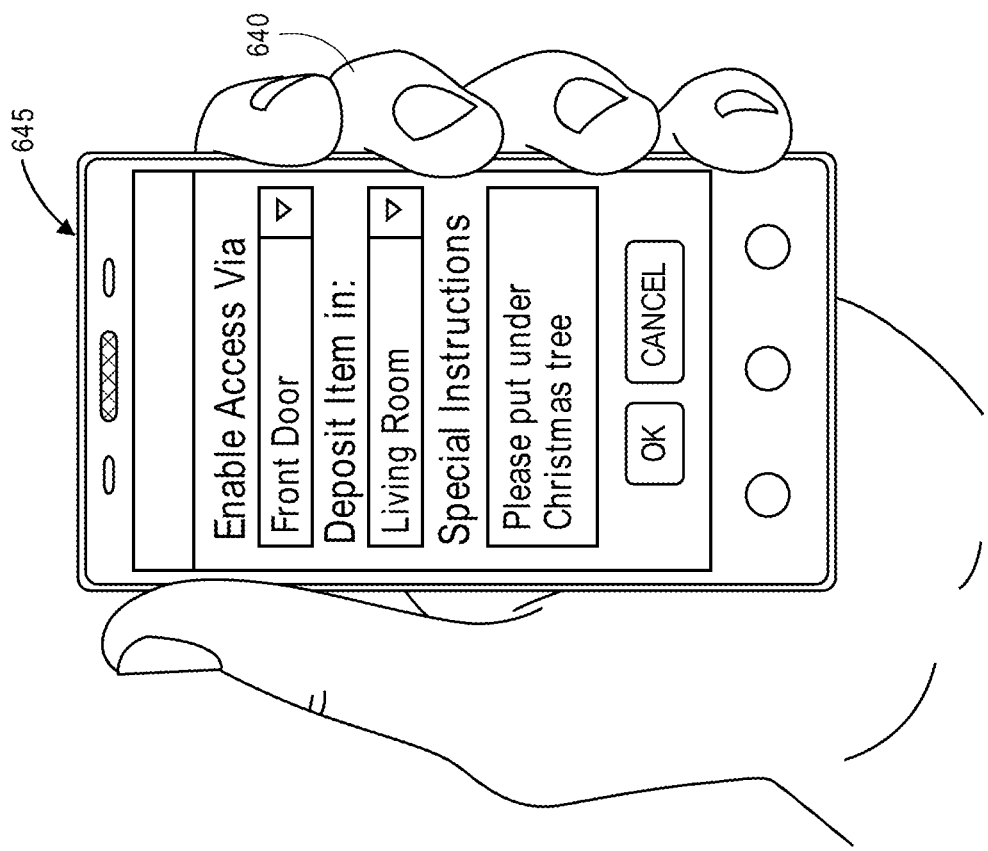
FIGS. 6A through 6E are views of aspects of one system including an intermediary device in accordance with embodiments of the present disclosure.
Figure 6A:
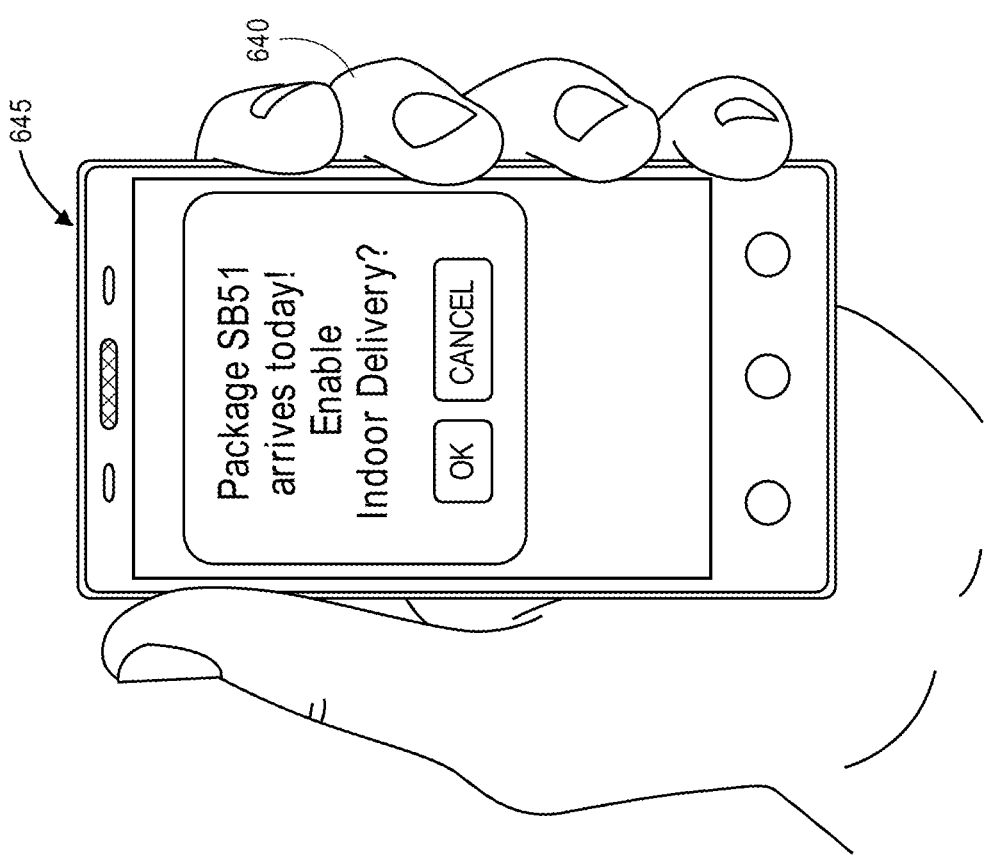

As is shown in FIG. 6A, an owner 640 (or a tenant or a resident, or a representative of the owner, the tenant or the resident) receives an electronic message on his or her smartphone 645 from an online marketplace 610 indicating that a package is to be delivered, and requesting that the owner authorize an indoor, unattended delivery of the package. As is shown in FIG. 6B, the owner 640 authorizes the delivery of the item to the secure facility 660 via a designated portal (viz., a front door) and requests that the item be deposited in a designated space (viz., a living room), and provides specific instructions for the delivery of the item (viz., that the item be deposited beneath a tree in the living room) via the smartphone 645.

Figure 6C:
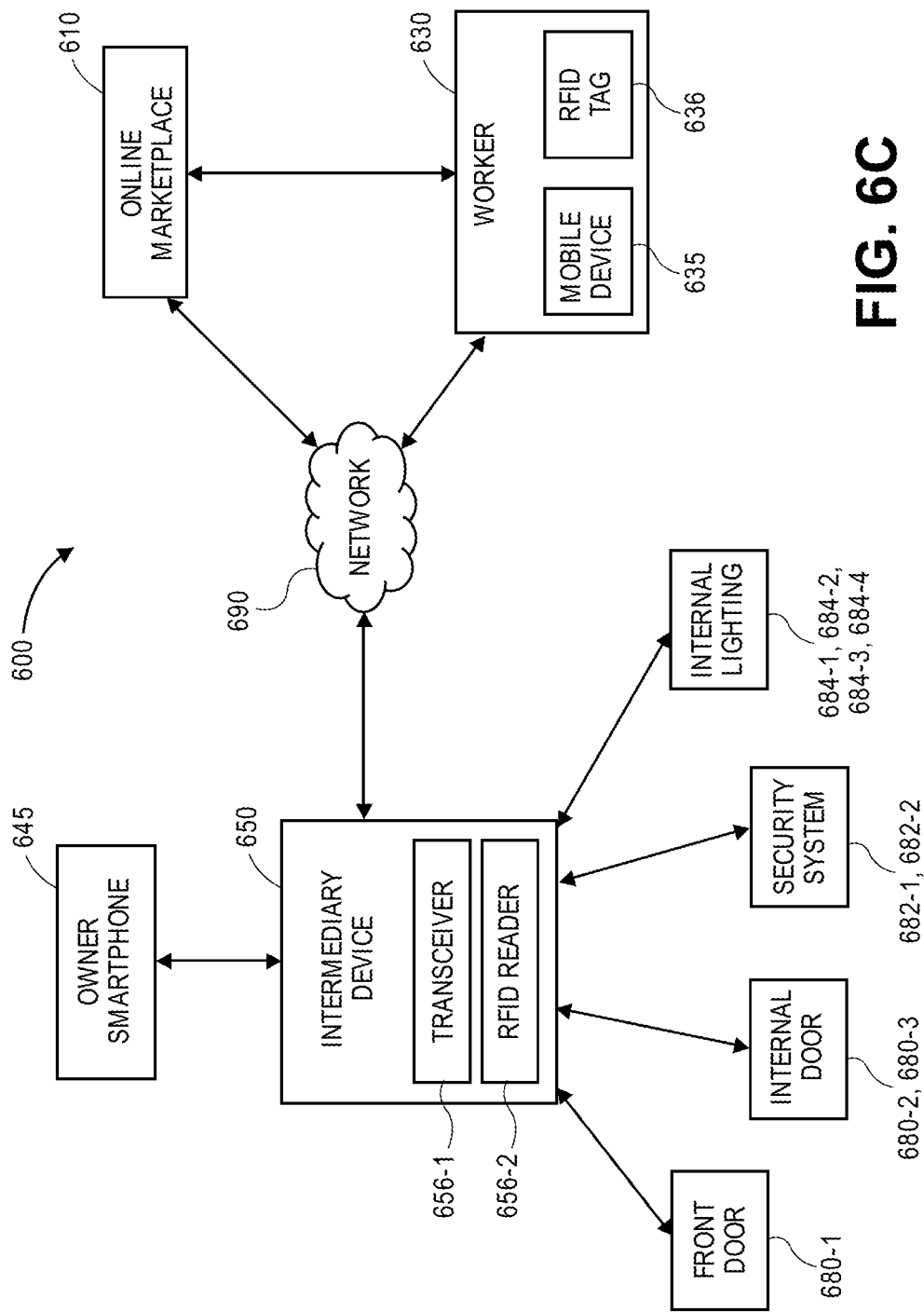

As is discussed above, in some embodiments, the intermediary devices of the present disclosure may act as a virtual concierge that monitors the performance of services within a secure facility, and restricts access to only the discrete areas of the secure facility that are required for the performance of the services, while capturing information or data regarding the performance of the services, by one or more electronic interactions with specific systems at the secure facility. As is shown in FIG. 6C, one embodiment of an intermediary device 650 including a transceiver 656-1 and an RFID reader 656-2 is in communication with the smartphone 645 of the owner 640, as well as with one or more aspects of a secure facility 660, including a front door 680-1 and internal doors 680-2, 680-3, security system components 682-1, 682-2 (e.g., imaging devices and/or motion sensors), and internal lighting components 684-1, 684-2, 684-3, 684-4. The intermediary device 650 may further be in communication with the online marketplace 610 and/or a worker 630 having a mobile device 635 and an RFID tag 636, e.g., over a network 690.

Figure 6D:
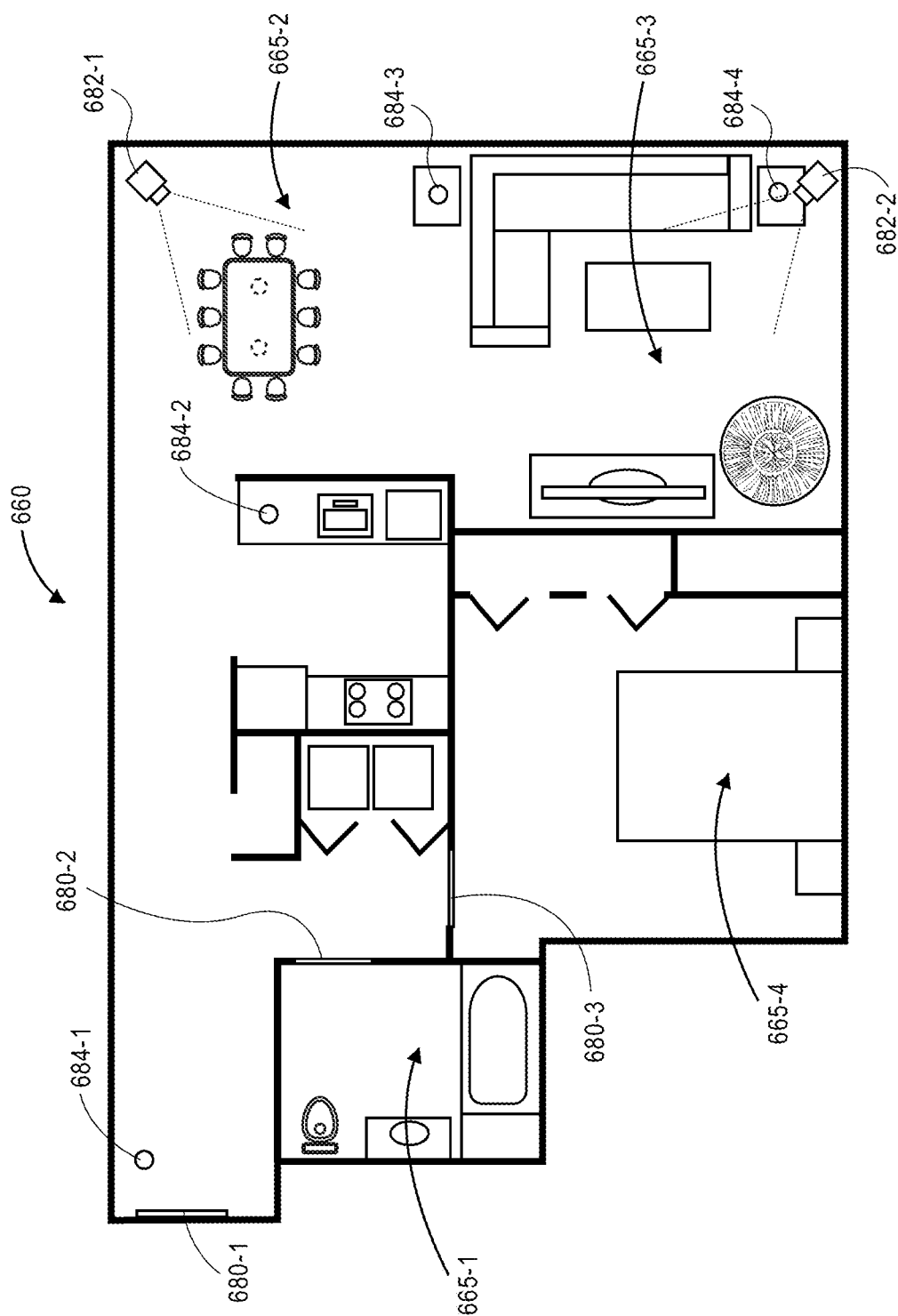

As is shown in FIG. 6D, a floor plan of the secure facility 660 includes a bathroom 665-1, a dining room 665-2, a living room 665-3, a bedroom 665-4 and a bathroom 665-5. The floor plan of the secure facility 660 further includes the front door 680-1 and interior doors 680-2, 680-3 at entrances to the bathroom 665-1 and the bedroom 665-4. The floor plan of the secure facility 660 also includes security system components 682-1, 682-2 in the dining room 665-2 and in the living room 665-3. The floor plan of the secure facility 660 further includes lighting elements 684-1, 684-2, 684-3, 684-4 adjacent the front door 680-1 and in the dining room 665-2 and the living room 665-3.

Figure 6E:
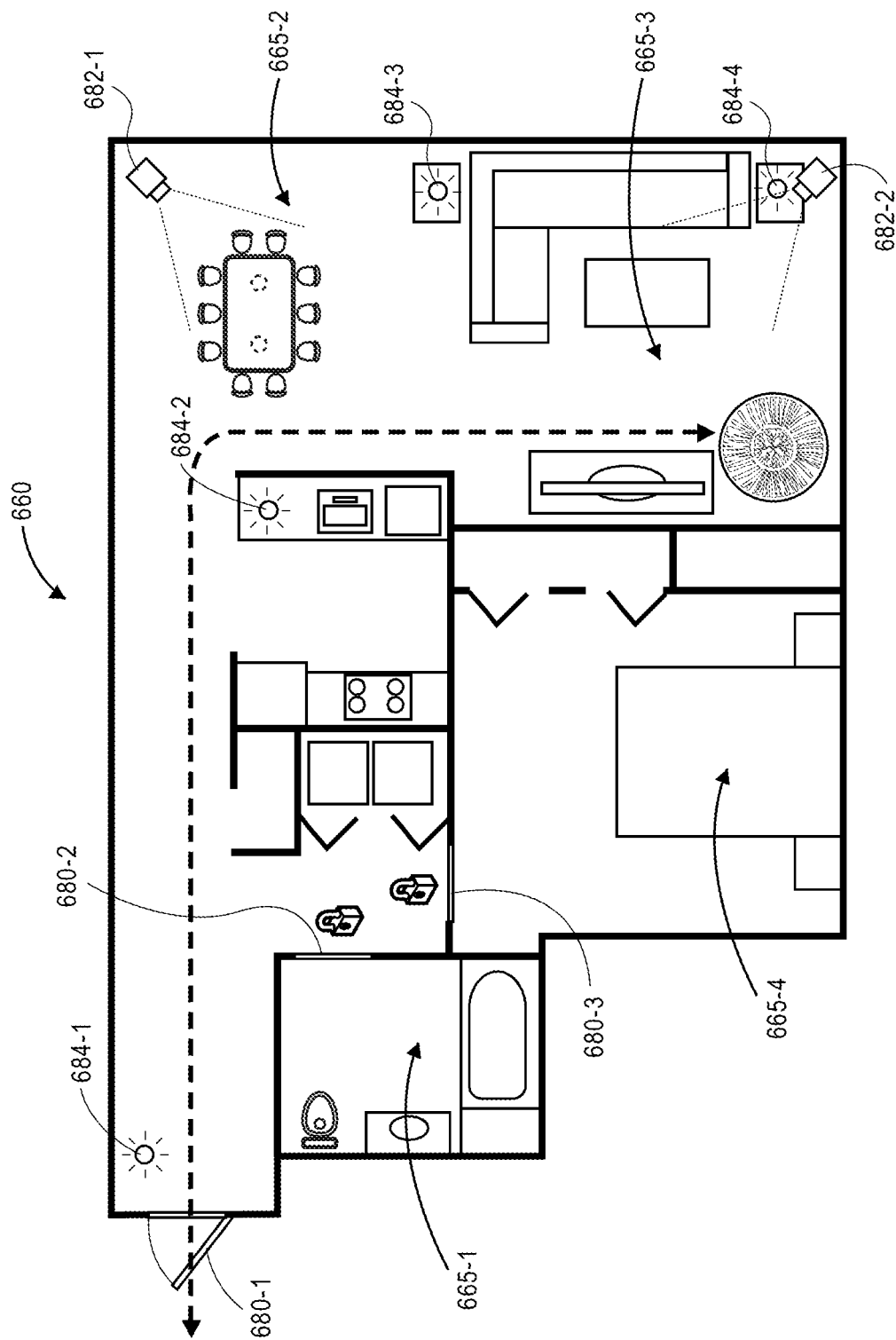

In response to the selections by the owner 640, the intermediary device 650 may define a path to be traveled by the worker 630 in delivering the item, unlocking and/or opening any doors that may be required in order to reach the destination selected by the owner 640, and locking and/or closing any doors that need not be opened, or doors securing spaces that the worker 630 need not enter. As is shown in FIG. 6E, the floor plan of the secure facility 660 shows the front door 680-1 as unlocked and opened, and the interior doors 680-2, 680-3 at the entrances to the bathroom 665-1 and the bedroom 665-4 as closed and locked. As is also shown in FIG. 6E, each of the lighting elements 684-1, 684-2, 684-3, 684-4 is illuminated, and each of the security system components 682-1, 682-2 is activated. After the worker 630 delivers the item to the destination selected by the owner 640, and is confirmed to have departed from the secure facility 660, the front door 680-1 may be closed and locked, and any information or data captured by the security system components 682-1, 682-2 may be stored in one or more data stores, including but not limited to one or more data stores associated with the smartphone 645, the intermediary device 650 or the secure facility 660, or in one or more alternate or virtual locations, e.g., in a "cloud"-based environment.

The intermediary devices of the present disclosure may also be configured to open a secure communications channel between an owner of a secure facility, or a designated representative of the owner, and a worker providing one or more services at the secure facility. In this regard, the intermediary devices permit the owner to communicate with the worker on an as-needed basis, while the services are in progress, and without requiring the owner to provide the worker with his or her telephone number, E-mail address, or instant messaging or social network account name or handle.

Figure 7:
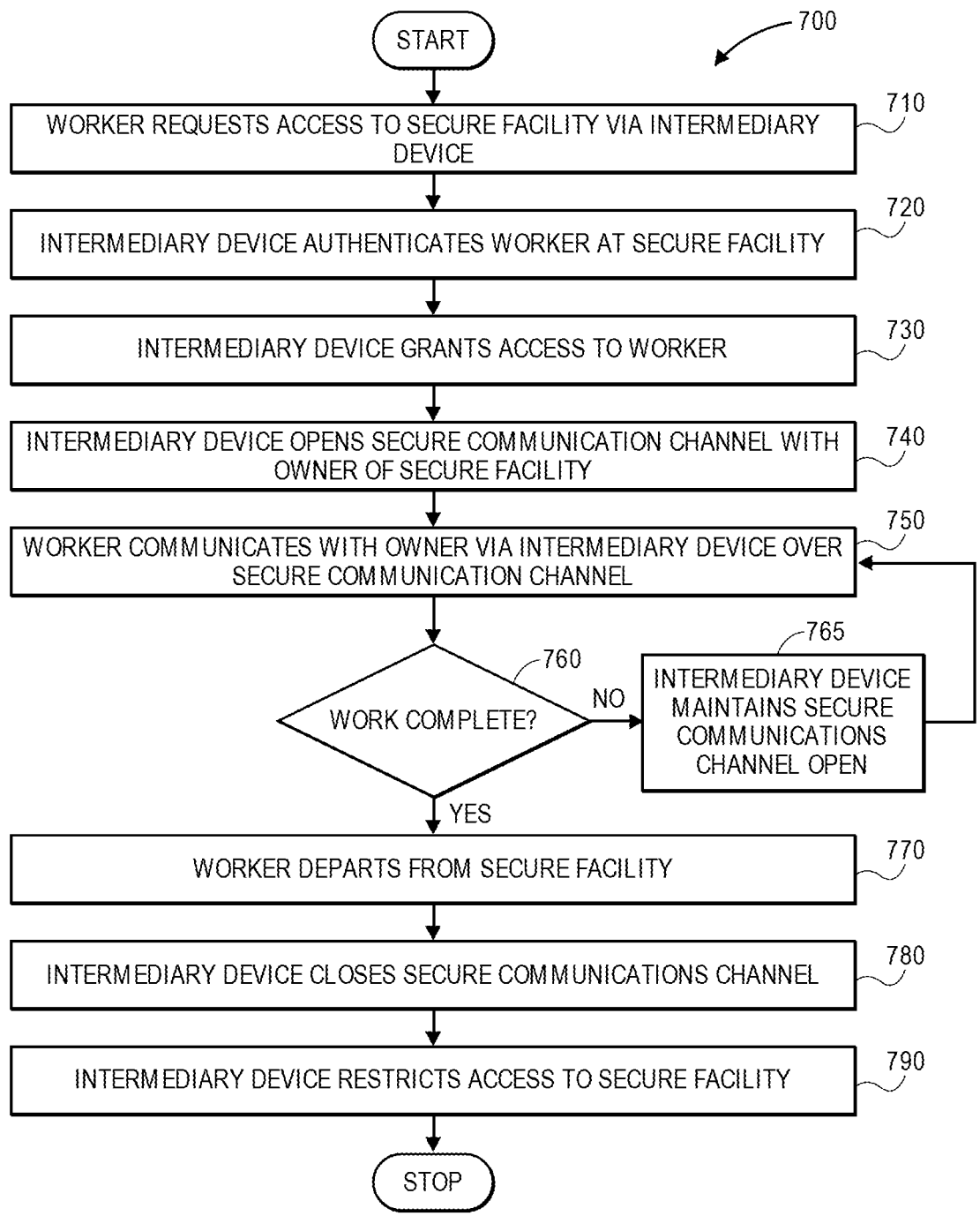
FIG. 7 is a flow chart of one process for using an intermediary device in accordance with embodiments of the present disclosure.

Referring to FIG. 7, a flow chart 700 of one process for using an intermediary device in accordance with embodiments of the present disclosure is shown. At box 710, a worker requests access to a secure facility via an intermediary device. The worker may request the access in any fashion, such as by providing one or more passwords or other authenticators to the intermediary device, by transmitting one or more electronic messages to the intermediary device (e.g., one or more signals according to any protocol, including but not limited to Wi-Fi, RFID, NFC, Bluetooth® signals, or any other type of wired or wireless signals) from a mobile device, by audibly and/or visibly requesting access in view of a camera and/or microphone, or in any other manner. At box 720, the intermediary device authenticates the worker. For example, the worker may be authenticated based at least in part on the manner in which the worker requested access to the secure facility, including but not limited to whether the request included a valid password or other authenticator, whether the mobile device and/or the worker were authorized to make the request, by voice recognition and/or facial recognition techniques, or in any other manner.

At box 730, the intermediary device grants access to the worker, and at box 740, the intermediary device opens a secure communication channel with the owner of the secure facility. At box 750, the worker and the owner communicate via the intermediary device over the secure communication channel. For example, in granting access to the worker, the intermediary device may automatically unlock and/or open one or more doors or other portals and enable the worker to access any locations within the secure facility that may be associated with the request. Alternatively, the intermediary device may further activate one or more sensors or other systems within the secure facility, e.g., to place the secure facility in a desired condition for the performance of the services, or to monitor the worker during the performance of the services. The intermediary device may also contact the owner via any number or type of communication channels, including but not limited to voice, data or video channels. For example, the intermediary device may include a microphone and a speaker, and may be programmed to act as a speakerphone, and to initiate a telephone call to a number or Internet Protocol address designated by the owner. The owner may thus communicate with the worker by telephone without having to divulge the number or the Internet Protocol address to the worker. Alternatively, the intermediary device may act as a subrouter linked to a router within the secure facility, and may enable a mobile device of the worker to access one or more networks (e.g., the Internet) while minimizing the risk that the worker or another individual or entity may attempt to access any sensitive information or data of the owner and/or the secure facility. Once the worker has access to the one or more networks, the worker and the owner may engage in a video chat through one or more dedicated channels. Any voice, data or video communications technique or protocol that may be implemented by way of the intermediary device at the secure facility, while shielding sensitive information or data at the secure facility from unauthorized access may be utilized in accordance with the present disclosure.

At box 760, whether the work is complete is determined. The work may be determined to be complete (or incomplete) based on imaging data and/or acoustic data captured using one or more imaging devices, microphones or other sensors, based on the positions of one or more doors or other portals, or any other information or data that may be accessible to the intermediary device. If the work is not complete, then the process advances to box 765, where the secure communication channel remains open, before returning to box 750, where the worker and the owner continue to communicate over the secure communication channel. If the work is complete, the process advances to box 770, where the worker departs from the secure facility. The worker may then report the status of the work, including whether any follow-up actions are required, along with any other relevant information, including but not limited to the worker's times of arrival and departure, any materials or utilities consumed during the performance of the work, any invoices for labor, materials or other charges, or any other information or data (e.g., audio and/or video data captured during the performance of the work, or links to such data). At box 780, after the worker has been determined to have departed the secure facility, the intermediary device closes the secure communications channel. At box 790, the intermediary device restricts access to the secure facility, e.g., by closing and locking any doors or other portals used by the worker to access the secure facility, reactivating any security system components that were deactivated during the performance of the work, or taking any other steps in order to restore the facility to a secure status, and the process ends.

As is discussed above, the intermediary devices may capture information or data on behalf of an owner of a secure facility while services are being provided at the secure facility, and engage in open and secure communications with the owner during the performance of the services, thereby accelerating the efficiency which such services are performed, and increasing the confidence of the owner that the services will be performed in an optimal manner and without a risk of loss of possessions, personal effects or sensitive information or data. The intermediary devices may be utilized in connection with the performance of any type or form of services, including but not limited to deliveries, repairs, renovations or any other services.

Referring to FIGS. 8A through 8K, views of aspects of one system including an intermediary device in accordance with embodiments of the present disclosure are shown. Except where otherwise noted, reference numerals preceded by the number "8" shown in FIGS. 8A through 8K indicate components or features that are similar to components or features having reference numerals preceded by the number "6" shown in FIGS. 6A through 6E, by the number "4" shown in FIG. 4, by the number "3" shown in FIG. 3, by the number "2" shown in FIG. 2 or by the number "1" shown in FIGS. 1A through 1I.

Figure 8A:
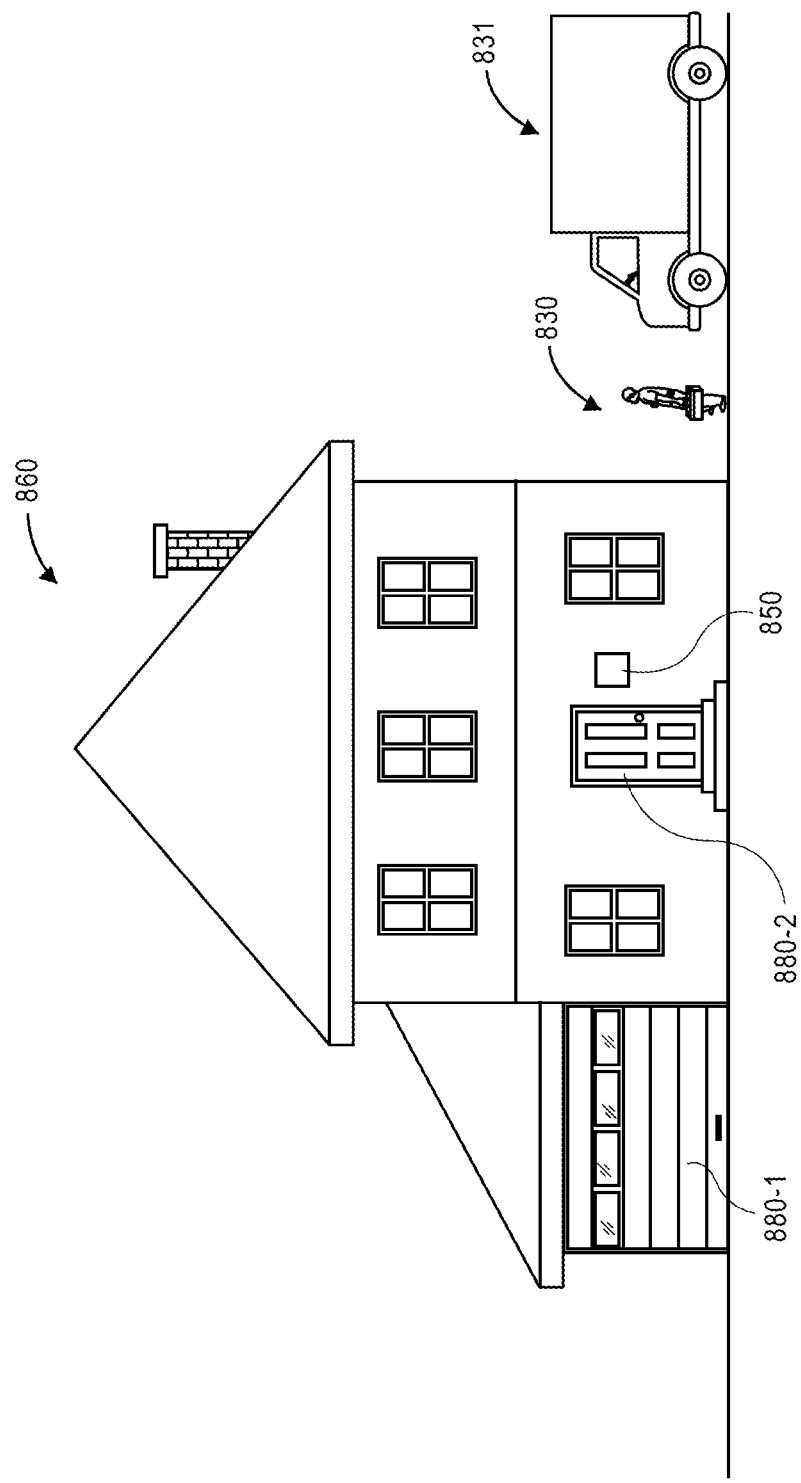
FIGS. 8A through 8K are views of aspects of one system including an intermediary device in accordance with embodiments of the present disclosure.

As is shown in FIG. 8A, a worker 830 travels to a home 860 (or other secure facility) in a service vehicle 831 to perform one or more services. The home 860 includes one embodiment of an intermediary device 850 of the present disclosure mounted to an external surface thereof, as well as a garage door 880-1 and a front door 880-2.

Figure 8B:
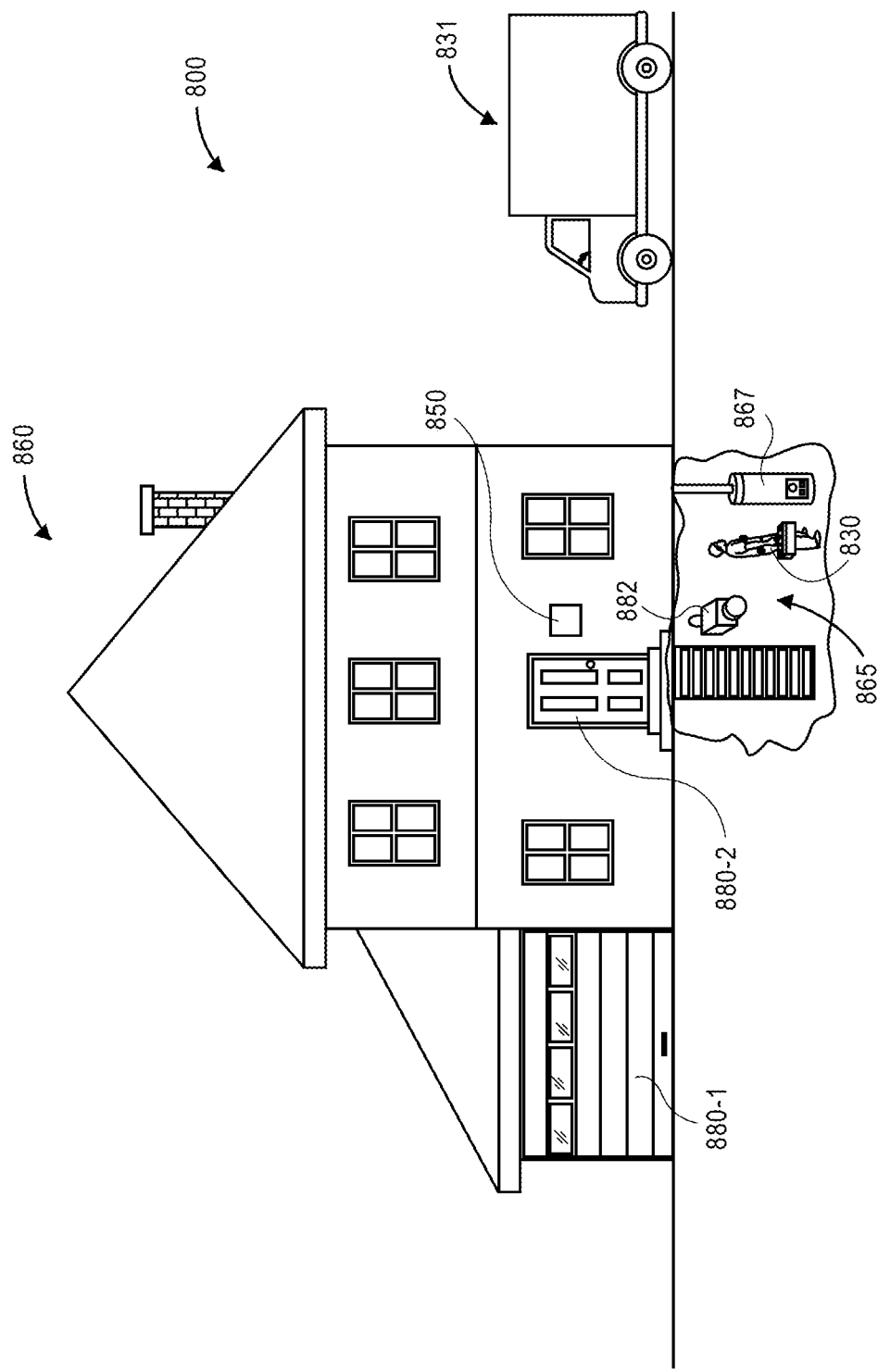
Figure 8C:
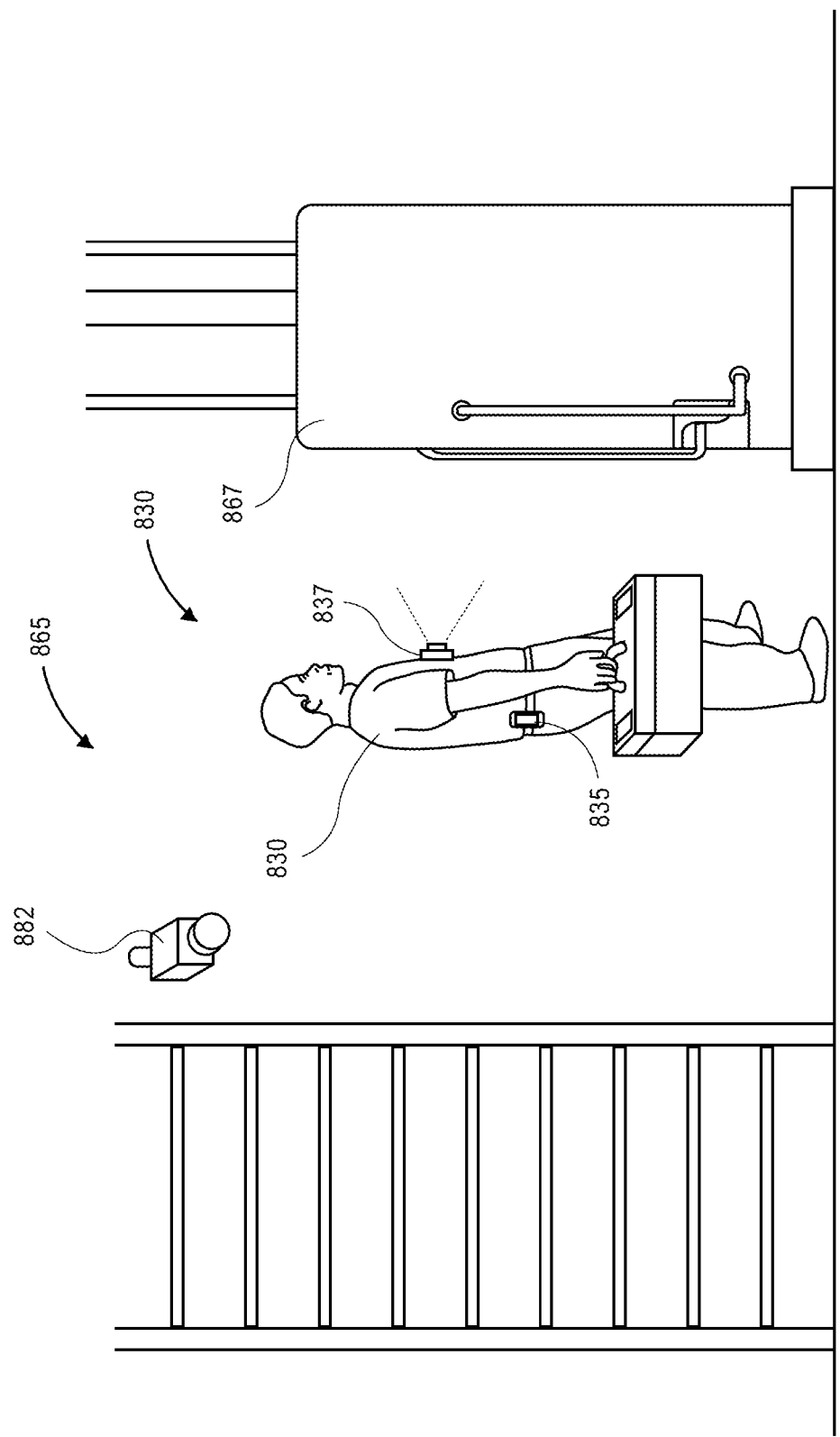
Figure 8D:
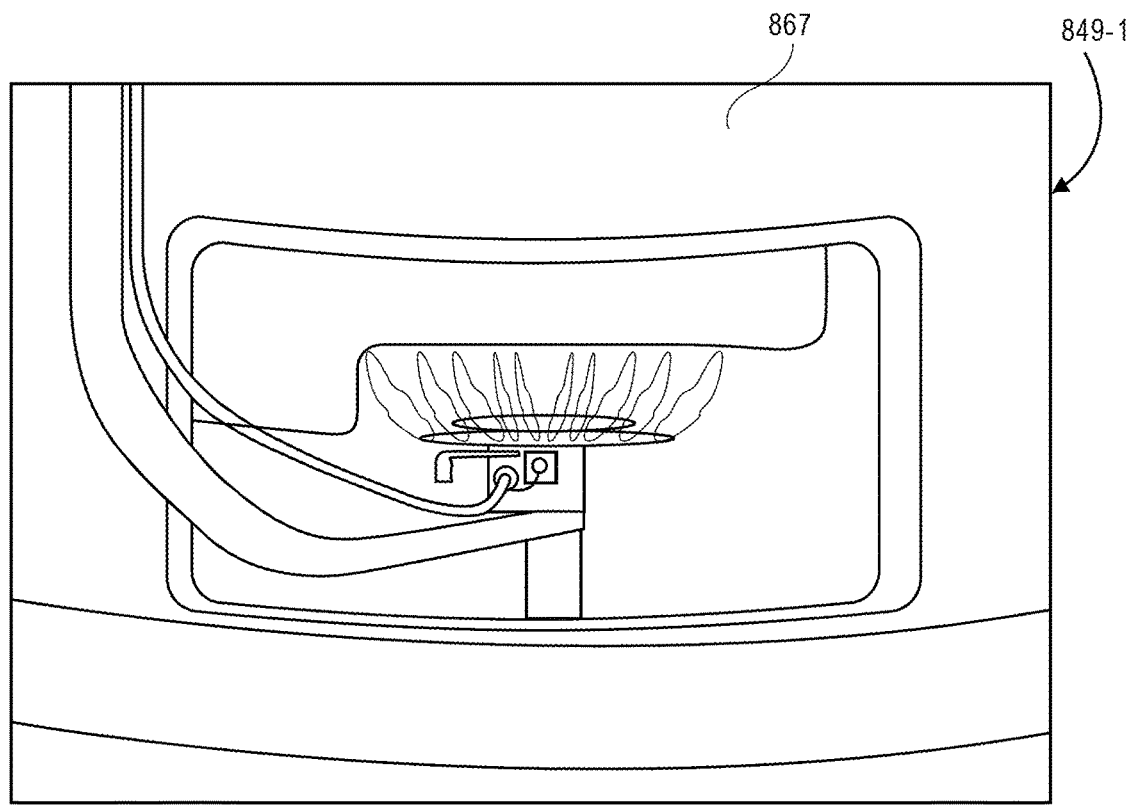
Figure 8E:
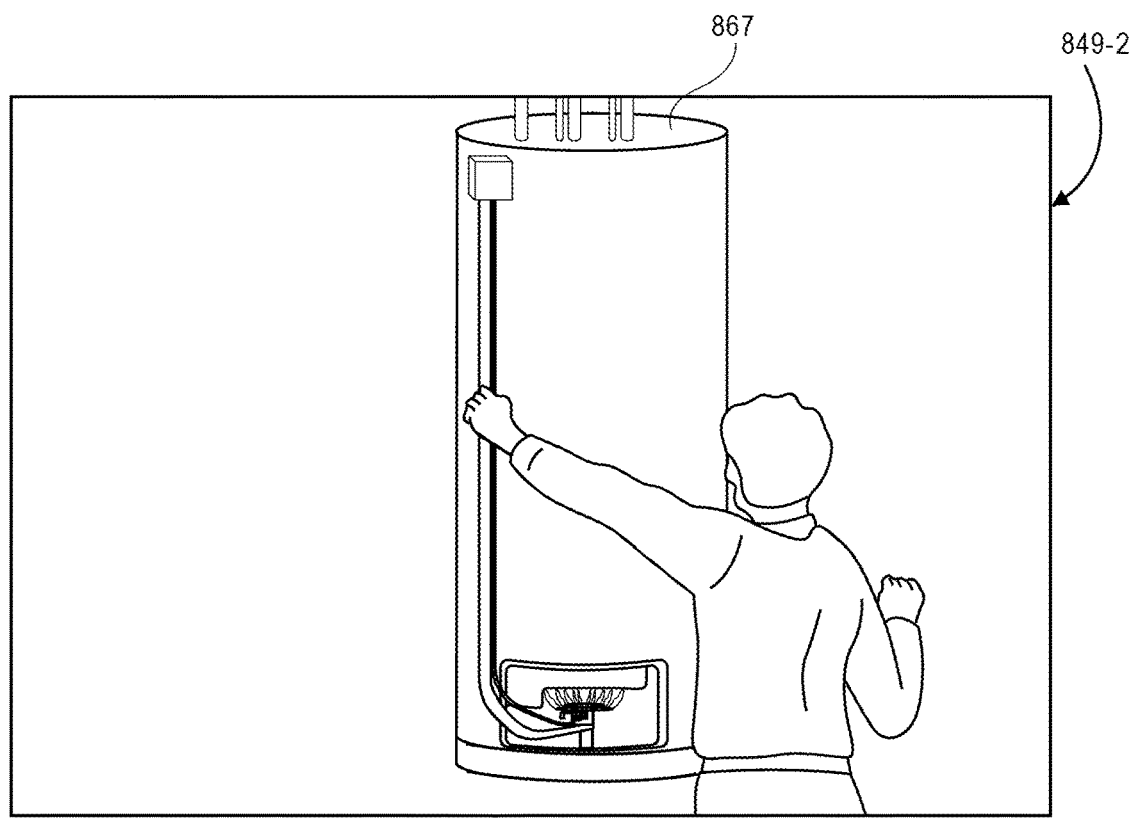

As is shown in FIG. 8B and FIG. 8C, the worker 830 is granted access to the home 860, e.g., by way of the front door 880-2, and proceeds to a basement 865 of the home 860 to evaluate a water heater 867. The worker 830 carries a mobile device 835 on his belt, and wears a portable camera 837 on his front. The portable camera 837 is configured to capture imaging data and/or acoustic data from the perspective of the worker, e.g., during the performance of services within the basement 865. Additionally, the basement 865 includes a security camera 882 including portions of the basement 865 within a field of view. The portable camera 837 and the security camera 882 may be configured to capture imaging data and/or related information or data (e.g. acoustic signals). For example, as is shown in FIG. 8D, the portable camera 837 may capture a plurality of image frames, such as an image frame 849-1, showing the water heater 867 and its surroundings within the basement 865. As is shown in FIG. 8E, the security camera 882 may capture a plurality of image frames, such as an image frame 849-2, depicting the water heater 867 and the worker 830 within the basement 865.

Figure 8F:
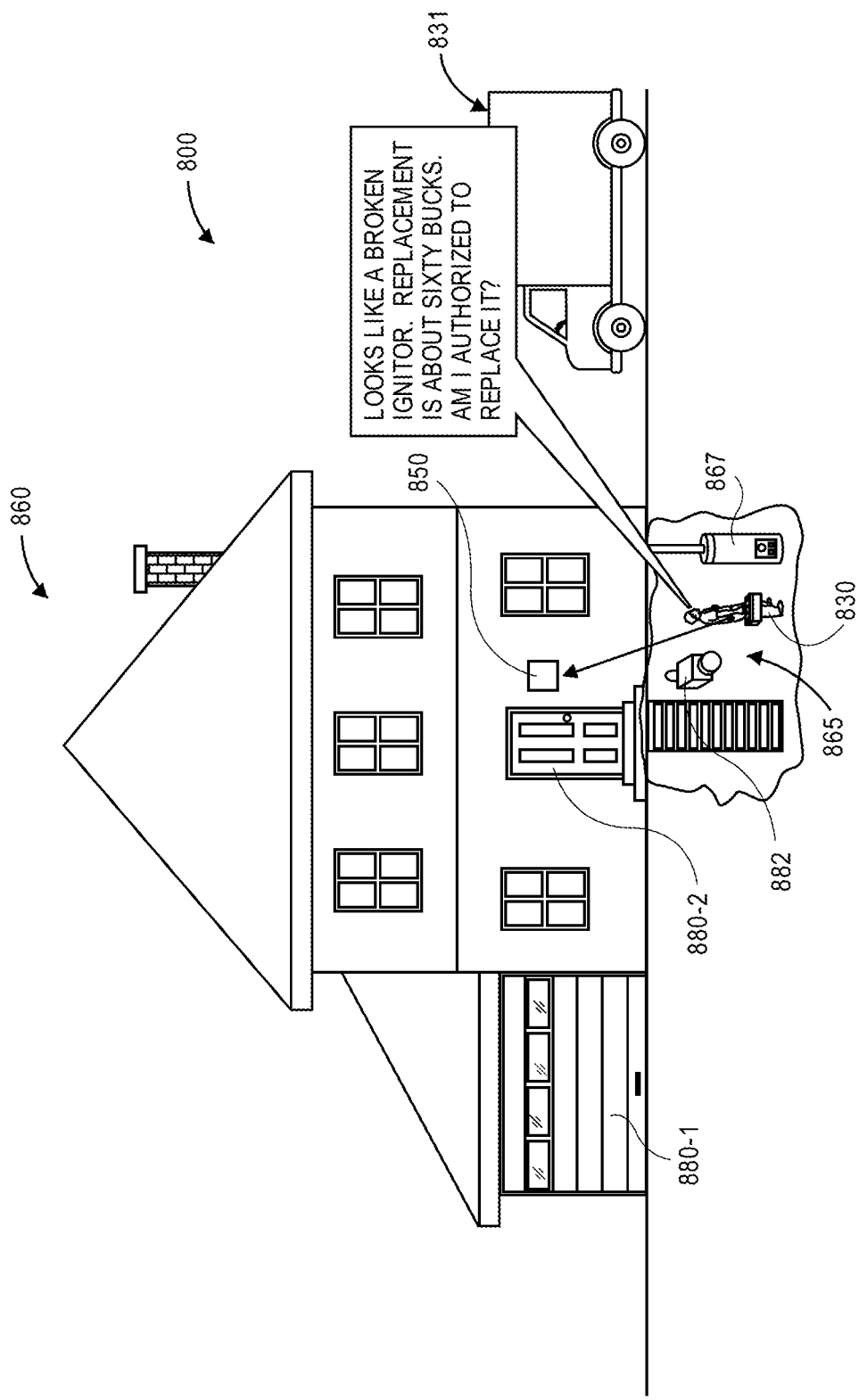

The intermediary device 850 is configured to receive communications from the worker 830 during the performance of services, including but not limited to voice communications, electronic communications (e.g., one or more messages or signals transmitted by the mobile device 835, which may include audio data, video data, text or other information or data), or any other type or form of information or data. For example, as is shown in FIG. 8F, when the worker 830 provides a verbal report as to the status of his work (viz., a diagnosis of the water heater 867 and an estimated cost of a replacement part), the mobile device 835 may transmit the verbal report or the contents thereof to the intermediary device 850 or, alternatively, one or more microphones or acoustic sensors provided on the intermediary device 850 may detect and interpret the verbal report. Alternatively, the worker 830 may provide one or more electronic messages including the contents of the verbal report to the intermediary device, e.g., by way of the mobile device 835.

Figure 8G:
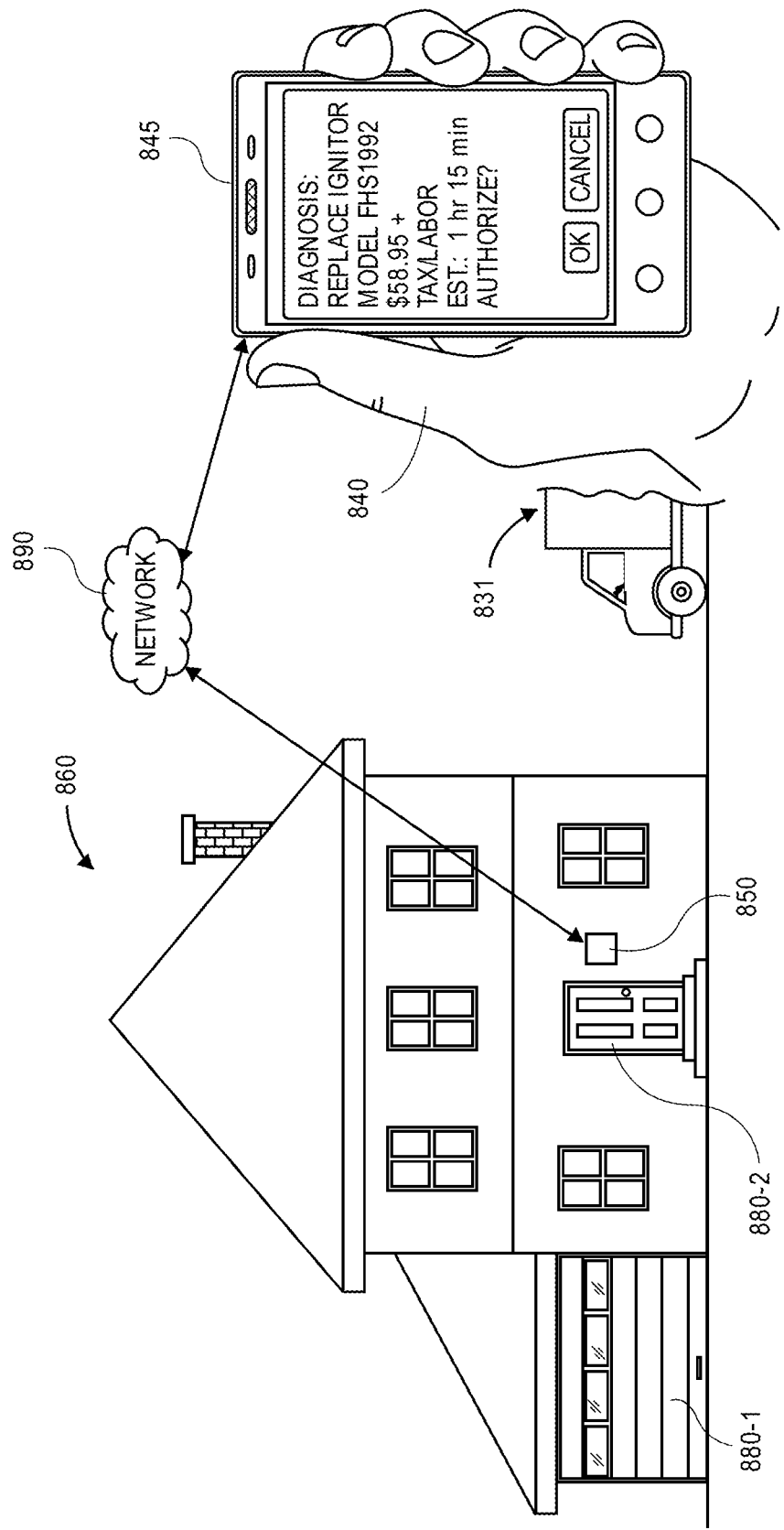

As is shown in FIG. 8G, the intermediary device 850 may transmit one or more electronic messages including information regarding the verbal report or the contents thereof to a smartphone 845 or other computer device of the owner 840 via one or more networks 890, which may include the Internet in whole or in part. Such messages may include a diagnosis and/or a request for authorization to purchase one or more replacement parts (viz., an ignitor for the water heater 867) that the worker 830 requires in order to complete the work, or any other relevant information or data. Alternatively, in some embodiments, the intermediary device 850 may be configured to grant or deny the request for the authorization automatically, e.g., where the authorization falls below one or more thresholds or otherwise complies with one or more rules established by the owner 840, or based on any preferences of the owner 840 that may be known, implied or determined for the owner 840.

Figure 8H:
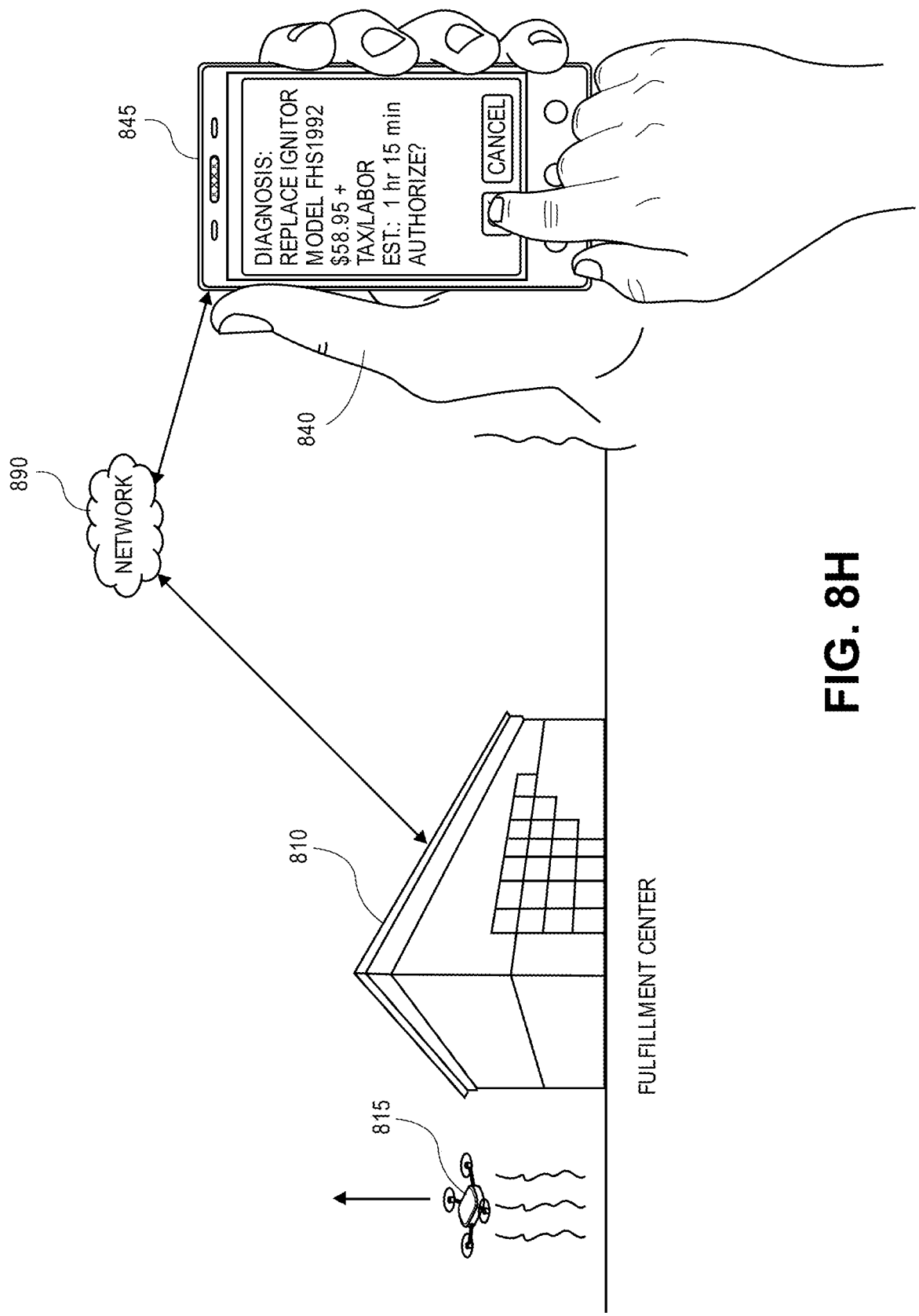

As is shown in FIG. 8H, when the owner 840 grants the request for the authorization via the smartphone 845, the smartphone 845 may transmit one or more electronic messages to an online marketplace 810 or other source of the replacement parts requested by the worker, via the networks 890. The online marketplace 810 may then initiate a delivery of the replacement parts to the home 860 by any means, including but not limited to an aerial vehicle 815, or any other type of ground, sea or aerial vehicle. Alternatively, the replacement parts may be delivered by one or more other workers (not shown) on foot, by bicycle, by mail, or by any form of common carrier.

Figure 8I:
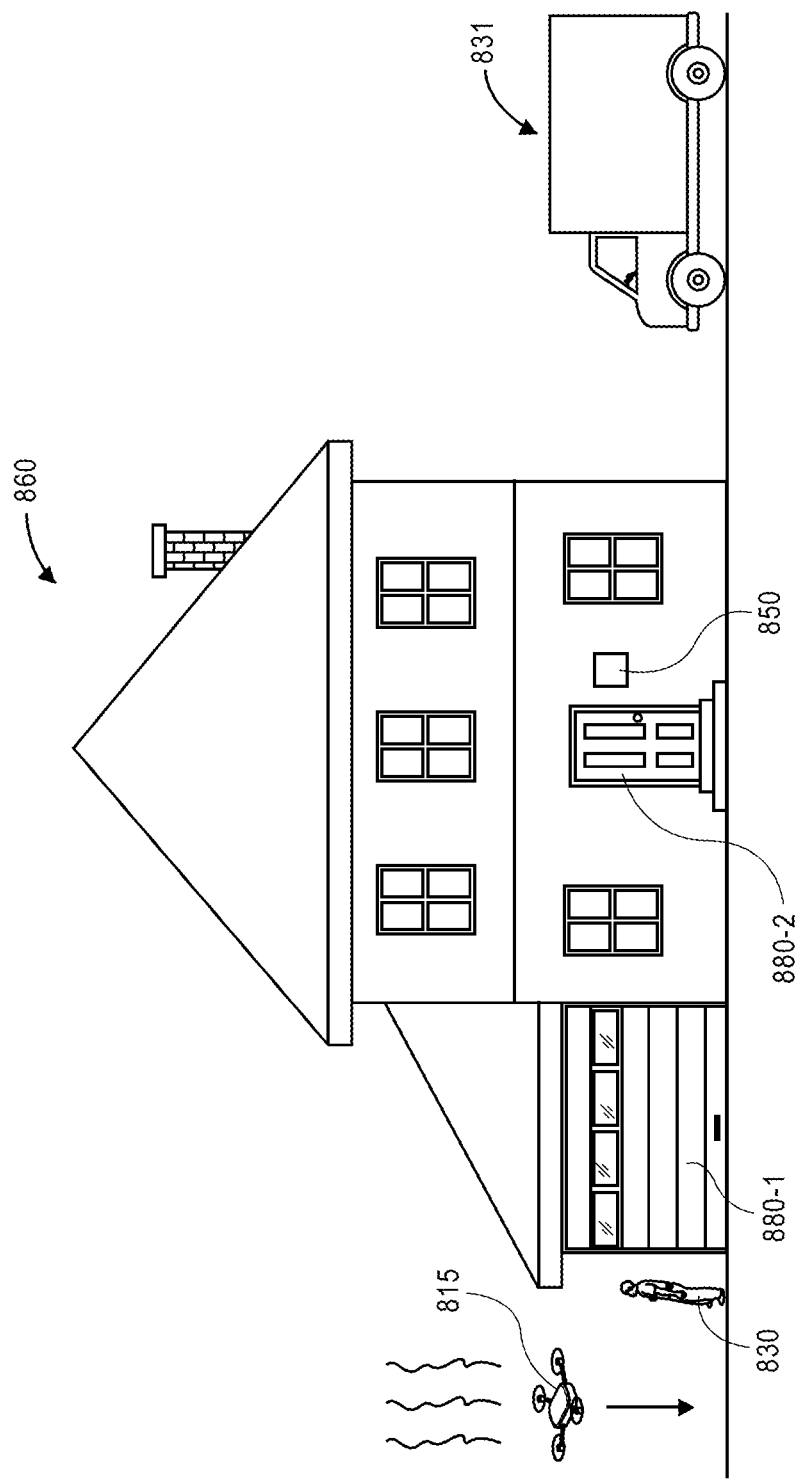
Figure 8J:
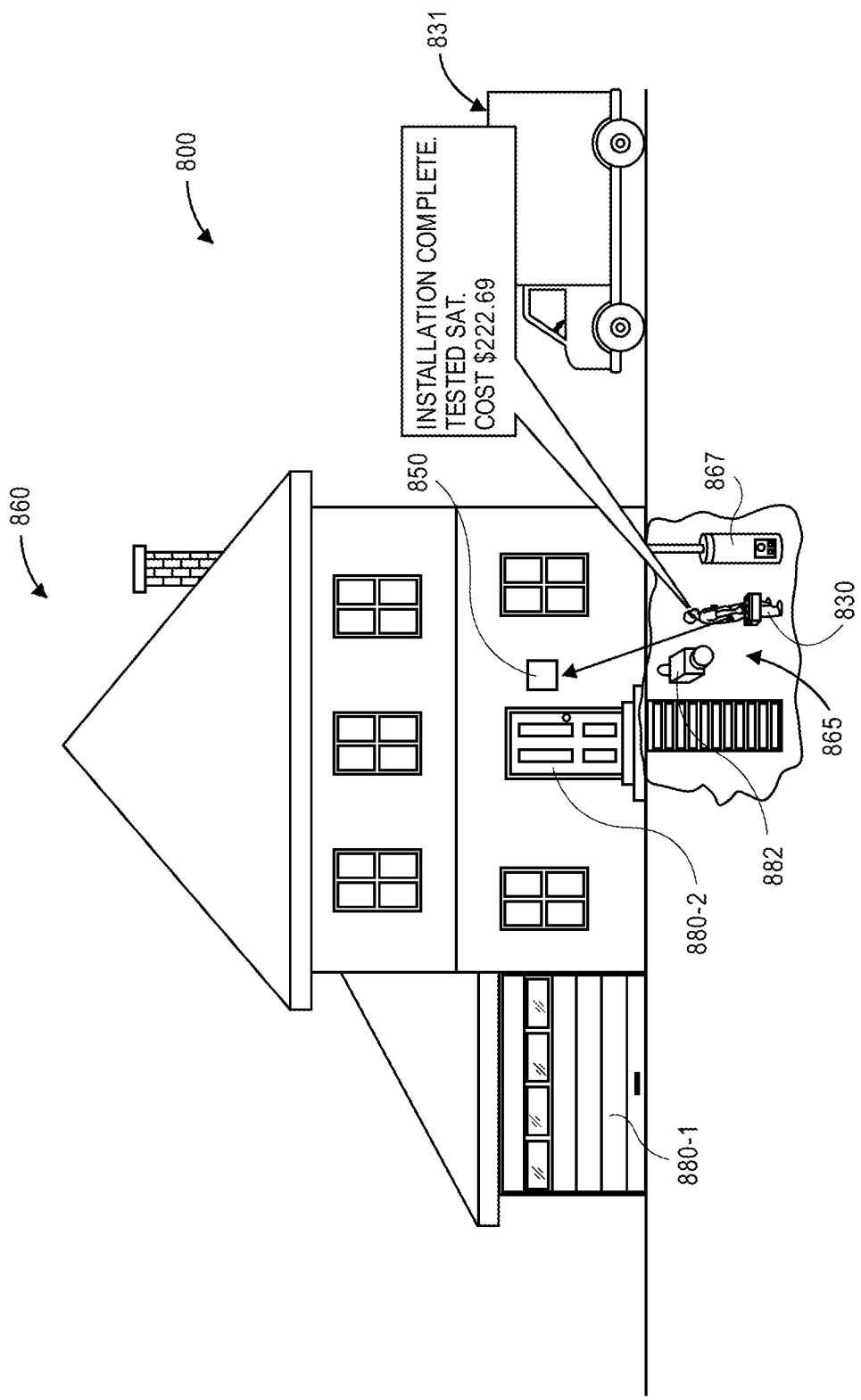
Figure 8K:
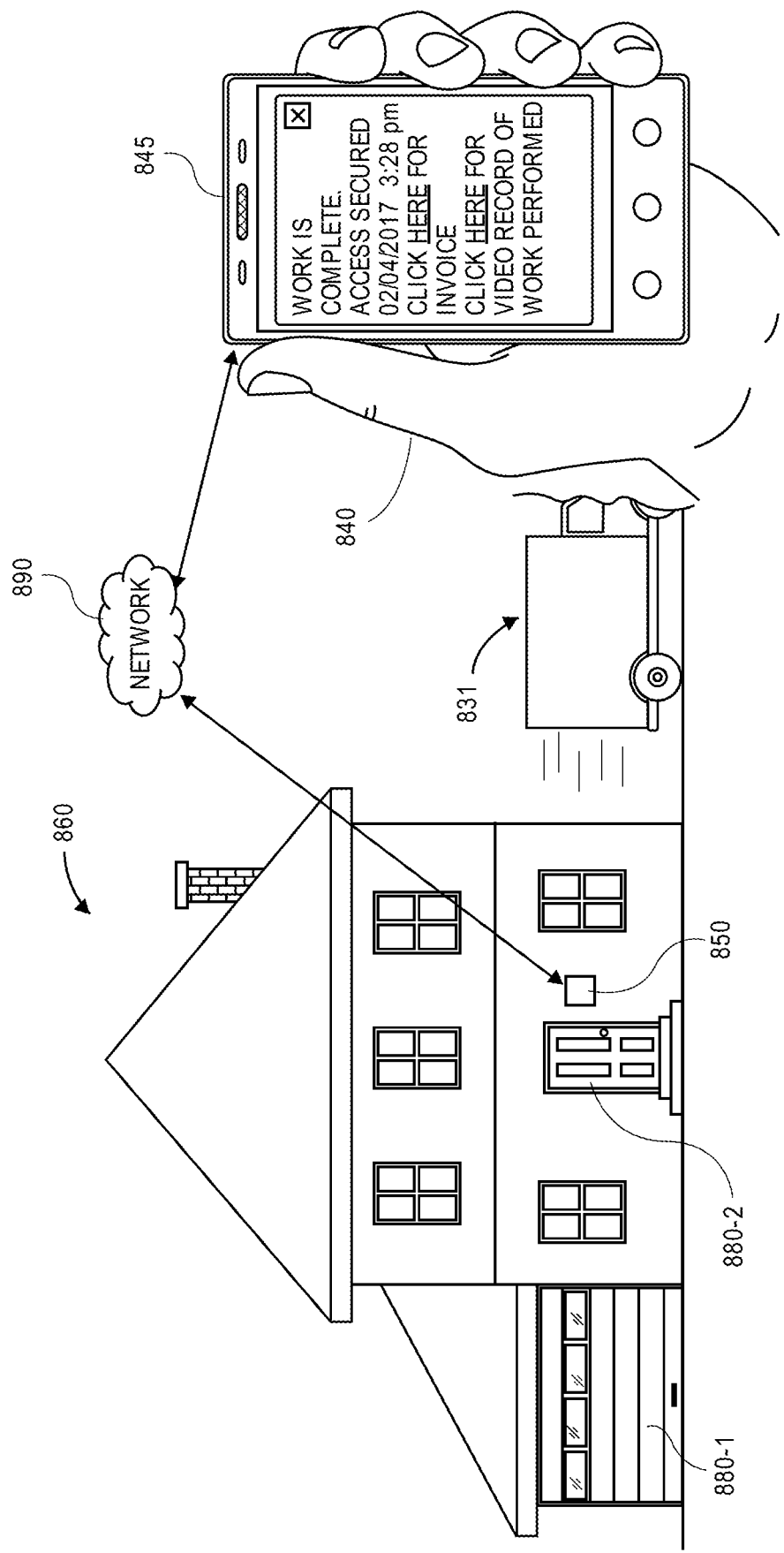

As is shown in FIG. 8I, the aerial vehicle 815 arrives at the home 860 and delivers the replacement parts (not shown), which may be retrieved by the worker 830. As is shown in FIG. 8J, the worker 830 installs the replacement parts in the water heater 867 in the basement 865 and confirms that the installation has been completed satisfactorily. The worker 830 then provides a verbal and/or electronic report to the intermediary device 850 indicating that the services are complete and reporting a total cost of the services. As is shown in FIG. 8K, the intermediary device 850 may then transmit information or data regarding the report received from the worker 830 to the mobile device 845 of the owner 840, via the networks 890. For example, the intermediary device 850 may transmit a summary of the work that was performed, as well as an invoice for the work that was performed, and any imaging data and/or acoustic data that was captured during the performance of the work, e.g., by the portable camera 837 worn by the worker 830, by the security camera 882, or by one or more security cameras or other systems (not shown) within the basement 865 or elsewhere within the home 860, or links to such data.

Figure 9A:
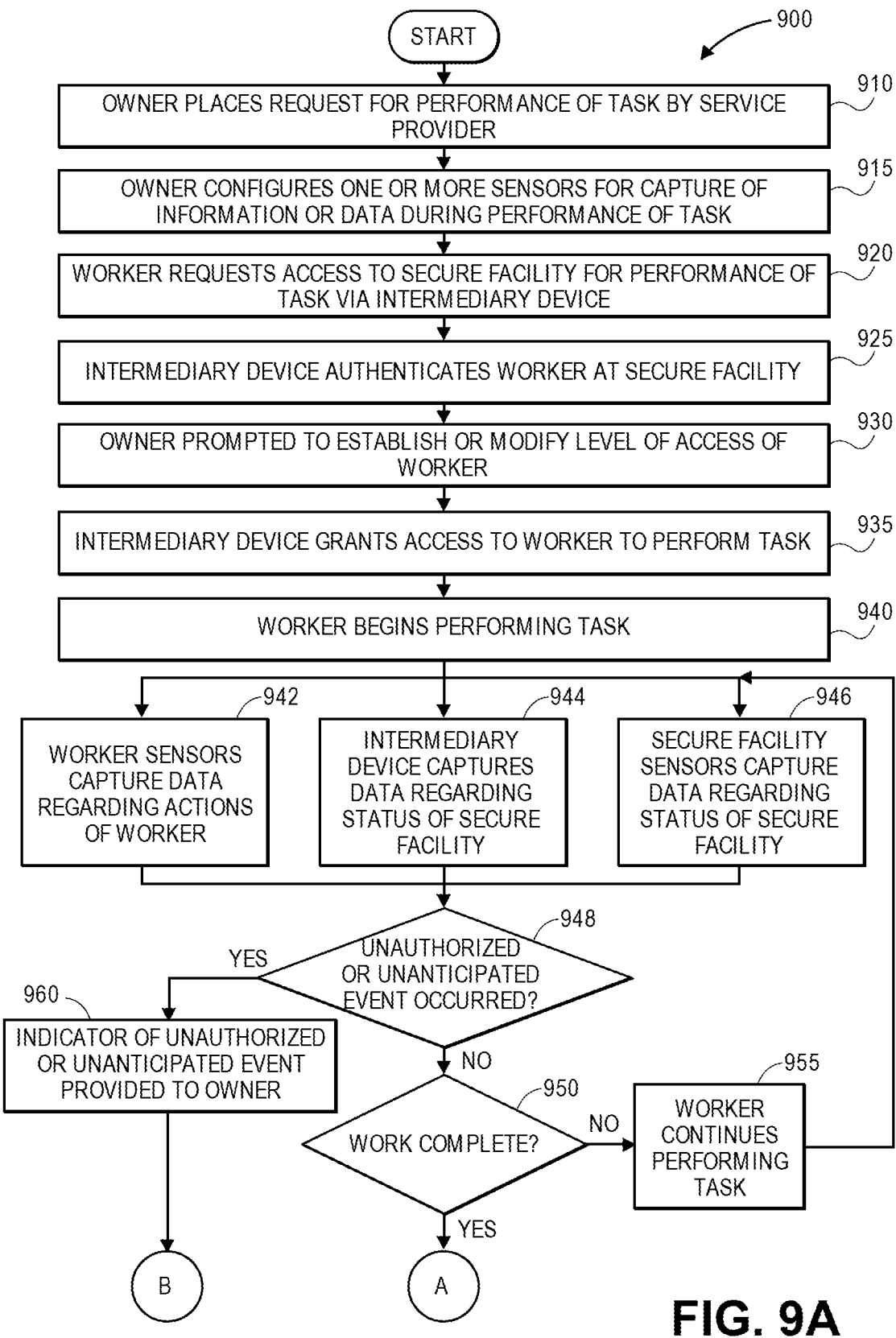
FIG. 9A and FIG. 9B are a flow chart of one process for using an intermediary device in accordance with embodiments of the present disclosure.
Figure 9B:
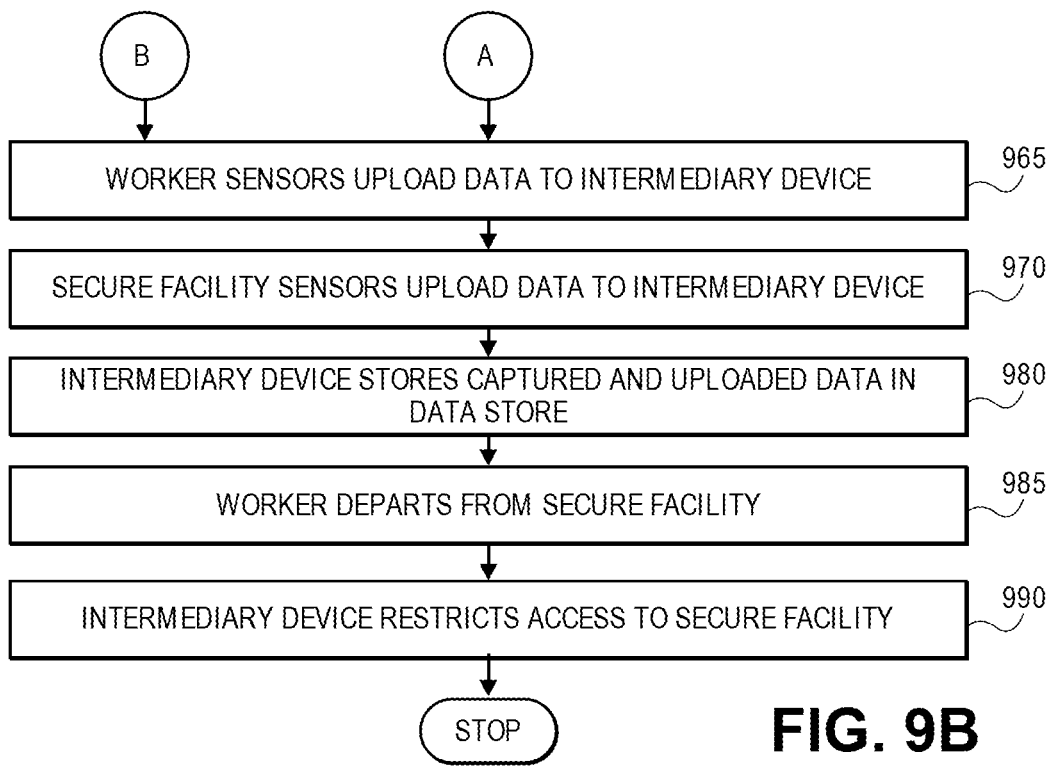

The capacity of the intermediary devices of the present disclosure to capture information and data from one or more sources during the performance of services within a secure facility may be useful to not only an owner of the secure facility but also one or more workers that performed the services, in that the information or data may serve to minimize or resolve any doubt or disagreement as to the services that were performed (e.g., scope and quality), or the statuses of the secure facility both before and after work was completed. Referring to FIG. 9A and FIG. 9B, a flow chart 900 of one process for using an intermediary device in accordance with embodiments of the present disclosure is shown. At box 910, an owner places a request for the performance of a particular task from a service provider. The request may be made in any manner, e.g., by telephone, by E-mail, online, or in person, such as at a bricks-and-mortar store. Alternatively, the request may be made by an agent of the owner, or by one or more representatives authorized to act on behalf of the owner. At box 915, the owner configures one or more sensors to capture information or data during the performance of the task. For example, the owner may designate one or more imaging devices, microphones or other sensors that may be associated with the secure facility, or an intermediary device at the secure facility, to capture information or data at one or more defined times or for one or more intervals of time, or in response to detecting or recognizing one or more events within the secure facility. Alternatively, the owner may specifically request that the service facility ensure that one or more workers who are assigned to perform the task be outfitted with or accompanied by one or more additional sensors, including but not limited to wearable imaging devices, microphones or other systems.

At box 920, a worker requests access to a secure facility via an intermediary device, and at box 925, the intermediary device authenticates the worker. The worker may request access, and may be authenticated by the intermediary device, in any number of ways or by any number of means in accordance with the present disclosure. For example, the intermediary device may detect or sense the presence of the worker based on one or more RFID, NFC, Bluetooth® or other signals transmitted by an identification tag, a mobile device or any other system associated with the worker, and the worker may then be authenticated based on information or data contained in such signals. Alternatively, in some embodiments, the worker may be authenticated by facial recognition, gesture recognition, voice recognition or any other techniques, or based on the exchange of information or data of any type or form between an identification tag, a mobile device or any other system associated with the worker, and the intermediary device.

After the intermediary device has authenticated the worker, the process advances to box 930, where the owner is prompted to establish or modify a level of access of the worker. For example, where the owner determines that the worker is a trusted individual (e.g., a family member, a friend, or an associate of a service provider with whom the owner has a positive relationship or experience), the owner may grant unfettered access to the secure facility for the performance of the task, or may reduce or eliminate the level of monitoring within the secure facility during a performance of the task. Where the owner determines that the worker is an inexperienced individual (e.g., an apprentice), or an individual with whom the owner has no prior experience, the owner may identify a number of rooms, spaces or features (e.g., closets, safes or other secure spaces) within the secure facility that may not be accessed during the performance of the task, or may initiate or elevate a level of monitoring within the secure facility during the performance of the task. The owner may, in some embodiments, specify rooms, spaces or features to which access is granted or denied, or specify that one or more sensors, lighting elements or other components within the secure faculty be activated or secured, in any manner. For example, the owner may receive information regarding the authenticated worker via one or more electronic messages, telephone calls or like communications (e.g., E-mail, SMS or MMS text messages, social network messages) and may establish or modify the level of access of the worker in kind, such as by an electronic message in reply, or by accessing one or more networked sites (e.g., one or more web sites), or in any other manner.

At box 935, the intermediary device grants access to the worker in order to perform a task therein, e.g., in accordance with any designations or modifications by the owner, and at box 940, the worker begins to perform the task. While the worker performs the task, at box 942, one or more sensors associated with the worker (e.g., the portable camera 837 shown in FIG. 8C, or one or more other sensors) begin to capture information or data regarding the worker's actions within the secure facility. For example, such sensors may monitor the worker's movements, e.g., the operation of one or more of the worker's major joints (including the knees, the hips, the elbows and the shoulders), as well as his or her pace of operation, range of motion, vital signs or any other aspect of the performance of the work by the worker. In parallel, at box 944, the intermediary device captures data regarding the status of the secure facility, and at box 946, one or more sensors at the secure facility also capture data regarding the status of the secure facility (e.g., the security camera 882 shown in FIG. 8C, or one or more other sensors). For example, the intermediary device may include one or more imaging devices, microphones or other sensors, or be in communication with one or more other sensors around the secure facility, including but not limited to security system components such as cameras and/or motion sensors, as well as one or more doors or other portals, in order to monitor the actions of the worker during the performance of the task. In some embodiments, some or all of the information or data captured by such sensors (e.g., the sensors associated with the worker, the intermediary device or the secure facility) may be provided to the owner in real time or in near-real time, e.g., by streaming, over one or more networks via the intermediary device.

At box 948, whether an unauthorized or unanticipated event has occurred is determined. For example, an unauthorized event may involve an attempt to access a room, a space or a feature (e.g., by breaking and entering) that is unnecessary for the performance of the task, or to which access has not been granted. In some embodiments, an unauthorized event be may an event that is intentional, negligent or innocent in nature. An unanticipated event may involve any occurrence that is not expected during the performance of the task, such as high or low voltage or current levels, high or low flows of water or other fluids, or high or low levels of oxygen, carbon dioxide or other gases (e.g., smoke or poisonous gases) within the secure facility, or one or more alarms, sounds, lights, odors or other conditions or occurrences observed within the secure facility, and need not be the fault of the worker. Such a determination may be made based at least in part on the data captured at boxes 942, 944, 946 by the worker sensors, the intermediary device and/or the other sensors within the secure facility, or based on the presence or absence of any information, data and/or reports as to the completion of one or more aspects of the task by the worker, or on any other factor.

If an unauthorized or unanticipated event is determined to have occurred, then the process advances to box 960, where an indicator regarding the unauthorized or unanticipated event is provided to the owner, e.g., in the form of one or more electronic messages, telephone calls, or like communications (e.g., E-mail, SMS or MMS text messages, social network messages) by the intermediary device. Alternatively, the intermediary device may further provide one or more indicators to local authorities (e.g., public or private security forces).

At box 965, the worker sensors upload the captured data to the intermediary device, e.g., by one or more Wi-Fi signals, NFC signals, Bluetooth® signals, or any other type of wired or wireless communications. At box 970, the secure facility sensors upload the data captured thereby to the intermediary device, and at box 980, the intermediary device stores the captured and uploaded data in one or more data stores. For example, the intermediary device may store the captured data in data stores or other memory components provided on the intermediary device or in one or more alternate or virtual locations, e.g., in a "cloud"-based environment. At box 985, the worker departs the secure facility, e.g., by the same door or other portal by which the worker accessed the secure facility, or by another door or portal. At box 990, the intermediary device restricts access to the secure facility, e.g., by closing and/or locking one or more doors or portals at the secure facility, and the process ends.

If no unauthorized or unanticipated events are determined to have occurred, however, then the process advances to box 950, whether the work is complete is determined. Such a determination may also be made based at least in part on the data captured at boxes 942, 944, 946 by the worker sensors, the intermediary device and/or the other sensors within the secure facility, or based on the presence or absence of a report as to the completion of the work by the worker, or on any other factor. If the work is not complete, then the process advances to box 955, where the worker continues to perform the task within the secure facility, before returning to boxes 942, 944, and 946 where data is captured by the worker sensors, the intermediary device and/or the other sensors. If the work is complete, however, then the process advances to boxes 965, 970, where captured data is uploaded to the intermediary device, and to box 980, where the captured and uploaded data is stored in one or more data stores, thereby enabling the worker to depart the secure facility at box 985, and the intermediary device to restrict access to the secure facility at box 990.

Although some embodiments of the present disclosure show the use of intermediary devices to control access to one or more aspects of a home or like structure, those of ordinary skill in the pertinent arts will realize that the systems and methods of the present disclosure are not so limited. Rather, the systems and methods of the present disclosure may be utilized in connection with any facility for which the selective control of access by visitors to a secure facility, or where communications with such visitors, are desired. Moreover, although the present disclosure includes a number of references to human workers and terms concluding with the word "man" (e.g., "deliveryman" or "repairman"), those of ordinary skill in the pertinent arts will recognize that the systems and methods of the present disclosure are not limited to humans in general or males in particular, and that access may be provided to any number of machines and/or females, or that communications may be established with such machines and/or females, in accordance with the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 5, 7 or 9A and 9B, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A home comprising:
    a structure defining an interior comprising a plurality of rooms;
    a first door between the interior of the structure and an exterior of the structure, wherein the first door comprises a first electromechanical lock that may be configured in at least one of a locked state or an unlocked state;
    a second door associated with a first one of the plurality of rooms, wherein the second door comprises a second electromechanical lock that may be configured in at least one of a locked state or an unlocked state;
    an intermediary device provided within the home, wherein the intermediary device comprises at least one computer processor, at least one memory component, at least one transceiver and at least one power source disposed within a housing, wherein the at least one transceiver is configured to communicate according to at least:
        a first communications protocol over at least a first network comprising at least a portion of the Internet; and
        a second communications protocol over a second network, wherein the second network is a wireless personal area network; and
    wherein the at least one computer processor of the intermediary device is in communication with at least the first electromechanical lock and the second electromechanical lock, and
    wherein the at least one computer processor is configured to at least:
        determine that a delivery of an item is to occur on at least one of a first day or a first time, wherein the item is to be delivered from a fulfillment center to the first one of the plurality of rooms;
        generate an authenticator associated with the delivery of the item;
        transmit at least a first electronic message comprising the authenticator to at least one of the fulfillment center or a worker associated with the fulfillment center over at least the first network according to the first communications protocol;
        receive at least a second electronic message from a mobile device of the worker over the second network according to the second communications protocol;
        determine that the second electronic message comprises the authenticator; and
        in response to determining that the second electronic message comprises the authenticator,
            configure the first electromechanical lock in the unlocked state; and
            configure the second electromechanical lock in the unlocked state.

2. The home of claim 1, further comprising at least one imaging device including at least a portion of the interior of the structure within a field of view,
    wherein the at least one computer processor of the intermediary device is in communication with the at least one imaging device, and
    wherein the at least one computer processor is further configured to at least:
        capture imaging data by the at least one imaging device.

3. The home of claim 1, further comprising:
    a third door associated with a second one of the plurality of rooms, wherein the third door comprises a third electromechanical lock that may be configured in at least one of a locked state or an unlocked state,
    wherein the at least one computer processor of the intermediary device is in communication with at least the third electromechanical lock, and
    wherein the at least one computer processor is configured to at least:
        in response to determining that the second electronic message comprises the authenticator,
            configure the third electromechanical lock in the locked state.

4. A computer-implemented method comprising:
    receiving, by an intermediary device provided within a secure facility, a first electronic message from a mobile device of a worker associated with a service provider, wherein the intermediary device comprises at least one computer processor, at least one memory component, and at least one transceiver disposed within a housing,
        wherein the at least one transceiver is configured to communicate according to at least a first communications protocol over a wireless personal area network and a second communications protocol over at least a portion of the Internet, and
        wherein the first electronic message is transmitted according to the first communications protocol;
    authenticating, by the intermediary device, the worker based at least in part on the first electronic message;
    determining, by the intermediary device, that at least one of the first electronic message or the worker is associated with a predetermined task to be performed within an interior of the secure facility on behalf of the service provider;
    identifying, by the intermediary device, a location within the interior of the secure facility associated with the predetermined task; and causing, by the intermediary device, at least a first portal between an exterior of the secure facility and the interior of the secure facility to be unlocked or opened.

5. The computer-implemented method of claim 4, wherein the housing is mounted to at least one wall separating the exterior of the secure facility and the interior of the secure facility.

6. The computer-implemented method of claim 4, further comprising:
   determining, by the intermediary device, that the predetermined task is to be performed at the location;
   generating, by the intermediary device, an authenticator associated with one of the predetermined task or the service provider; and
   transmitting, by the intermediary device, a second electronic message comprising the authenticator to the service provider, wherein the second electronic message is transmitted according to the second communications protocol, and
   wherein authenticating the worker comprises:
      determining whether the first electronic message comprises the authenticator,
      wherein the worker is authenticated in response to determining that the first electronic message comprises the authenticator.

7. The computer-implemented method of claim 4, further comprising:
   receiving, by the intermediary device, a third electronic message from a computer device of an occupant of at least the location within the interior of the secure facility, wherein the third electronic message identifies the predetermined task and at least one of:
      a date associated with the predetermined task;
      a time associated with the predetermined task; or
      the location within the interior of the secure facility,
   wherein the third electronic message is transmitted according to one of the first communications protocol or the second communications protocol, and
   wherein the authenticator is generated in response to the third electronic message.

8. The computer-implemented method of claim 4, wherein the intermediary device further comprises at least one imaging device, and
   wherein authenticating the worker further comprises:
      capturing imaging data by the at least one imaging device;
      determining, by the intermediary device, that the imaging data includes at least one face; and
      recognizing, by the intermediary device, the at least one face as corresponding to the worker according to at least one recognition technique.

9. The computer-implemented method of claim 4, wherein the intermediary device further comprises at least one microphone, and
   wherein authenticating the worker further comprises:
      receiving acoustic data by the at least one microphone; and
      determining, by the intermediary device, that the acoustic data comprises vocal signals corresponding to the worker by at least one recognition technique.

10. The computer-implemented method of claim 4, wherein the intermediary device further comprises at least one imaging device, and
    wherein authenticating the worker further comprises:
       receiving contact by at least one finger of the worker with at least a portion of the intermediary device; and
       recognizing, by the intermediary device, a fingerprint of the worker based at least in part on the contact, wherein the work is authenticated based at least in part on the fingerprint.

11. The computer-implemented method of claim 4, wherein the first communications protocol is one of:
    Bluetooth; or
    near field communication, and
    wherein the second communications protocol is one of:
    wireless fidelity; or
    SMS or MMS text messaging.

12. The computer-implemented method of claim 4, wherein the predetermined task is a delivery of at least one item to the interior of the secure facility.

13. The computer-implemented method of claim 4, further comprising:
    receiving, by the intermediary device, a request for an authorization associated with the predetermined task, wherein the request is at least one of:
       at least one spoken word requesting the authorization; or
       at least a second electronic message requesting the authorization, wherein the second electronic message is transmitted according to at least one of the first communications protocol or the second communications protocol;
    transmitting, by the intermediary device, a third electronic message comprising the request to a computer device of an occupant of the secure facility, wherein the third electronic message is transmitted according to at least one of the first communications protocol or the second communications protocol; and
    receiving, by the intermediary device, a fourth electronic message from the computer device of the occupant, wherein the fourth electronic message is transmitted according to at least one of the first communications protocol or the second communications protocol,
    wherein the fourth electronic message comprises the authorization.

14. The computer-implemented method of claim 13, wherein the authorization is for at least one of labor or materials associated with the predetermined task.

15. The computer-implemented method of claim 4, wherein causing at least the first portal between the exterior of the secure facility and the interior of the secure facility to be unlocked or opened further comprises:
    determining, by the intermediary device, a path between the first portal and the location within the interior of the secure facility.

16. The computer-implemented method of claim 15, wherein causing at least the first portal between the exterior of the secure facility and the interior of the secure facility to be unlocked or opened further comprises:
    identifying, by the intermediary device, at least a third portal not along the path; and
    causing, by the intermediary device, at least the third portal to be locked or closed.

17. The computer-implemented method of claim 15, further comprising:
    activating, by the intermediary device, at least one appliance within a vicinity of the path.

18. The computer-implemented method of claim 4, further comprising:
    identifying, by the intermediary device, an environmental condition associated with the predetermined task; and
    establishing, by the intermediary device, the environmental condition within the interior of the secure facility.

19. The computer-implemented method of claim 15, further comprising:

identifying, by the intermediary device, at least one imaging device including at least a portion of the path or the location within the interior of the secure facility within a field of view of the at least one imaging device; and operating, by the intermediary device, the at least one imaging device to capture imaging data regarding at least the portion of the path or the location.

20. The computer-implemented method of claim 4, further comprising:

determining, by the intermediary device, that the predetermined task is complete;

determining, by the intermediary device, that the worker has departed the secure facility;

causing, by the intermediary device, at least the first portal to be locked or closed;

generating, by the intermediary device, information regarding the completion of the predetermined task; and transmitting, by the intermediary device, a second electronic message to a computer device of an occupant of the secure facility, wherein the second electronic message comprises at least some of the information regarding the completion of the predetermined task, and wherein the second electronic message is transmitted according to the second communications protocol.

21. The computer-implemented method of claim 15, further comprising:

capturing imaging data by at least one imaging device, wherein the at least one imaging device includes at least a portion of the path or the location within the interior of the secure facility within a field of view of the at least one imaging device, wherein the at least one imaging device is associated with at least one of:
the intermediary device;
the worker; or
an autonomous mobile robot within the secure facility; and transmitting, by the intermediary device, a second electronic message to a computer device of an occupant of the secure facility, wherein the second electronic message comprises at least some of the information regarding the completion of the predetermined task, wherein the second electronic message comprises at least one of:
at least some of the imaging data; or
a link to at least some of the imaging data, and wherein the second electronic message is transmitted according to the second communications protocol.

22. An intermediary device comprising:

a housing having at least one computer processor, at least one transceiver and at least one data store disposed therein, wherein the intermediary device is configured for operation within a secure facility, wherein the at least one transceiver is configured to communicate according to at least:

a first communications protocol over at least a first network comprising at least a portion of the Internet; and a second communications protocol over a second network, wherein the second network is a wireless personal area network, and wherein the at least one computer processor is configured to at least:

receive, by the at least one transceiver, a first electronic message indicative of a task to be performed in association with the facility, wherein the first electronic message is received according to one of the first communications protocol or the second communications protocol;

generate an authenticator associated with the task;

transmit, by the at least one transceiver, a second electronic message comprising the authenticator to at least one service provider, wherein the second electronic message is transmitted according to the first communications protocol;

receive, by the at least one transceiver, a third electronic message from a mobile device of a worker associated with the service provider, wherein the third electronic message is received according to the second communications protocol;

determine that the third electronic message comprises the authenticator;

authenticate the worker based at least in part on the third electronic message;

transmit, by the at least one transceiver, a fourth electronic message to an electromechanical lock, wherein the fourth electronic message comprises an instruction to unlock a portal, and wherein the fourth electronic message is transmitted according to the second communications protocol; and grant access to the facility to the worker.

23. The intermediary device of claim 22, further comprising an imaging device including at least a portion of the entrance within a field of view, wherein the at least one computer processor is configured to at least:

in response to receiving the third electronic message, capture, by the imaging device, at least one image frame, and wherein authenticating the worker further comprises:
recognizing a face of the worker in the at least one image frame.

24. The intermediary device of claim 22, wherein the first communications protocol is a Wireless Fidelity protocol, and wherein the second communications protocol is a Bluetooth protocol.

25. The computer-implemented method of claim 15, wherein causing at least the first portal between the exterior of the secure facility and the interior of the secure facility to be unlocked or opened further comprises:

identifying, by the intermediary device, at least a second portal along the path; and causing, by the intermediary device, at least the second portal to be unlocked or opened.

* * * * *